(12) United States Patent
Fujiyama et al.

(10) Patent No.: US 12,415,478 B2
(45) Date of Patent: Sep. 16, 2025

(54) WIRELESS COMMUNICATION SYSTEM

(71) Applicant: Panasonic Intellectual Property Management Co., Ltd., Osaka (JP)

(72) Inventors: Jun Fujiyama, Kanagawa (JP); Jun Ogawa, Kanagawa (JP); Toshichika Hoya, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 103 days.

(21) Appl. No.: 18/532,958

(22) Filed: Dec. 7, 2023

(65) Prior Publication Data

US 2024/0101066 A1 Mar. 28, 2024

Related U.S. Application Data

(63) Continuation of application No. PCT/JP2021/021738, filed on Jun. 8, 2021.

(51) Int. Cl.
*B60R 25/102* (2013.01)
*B60R 25/24* (2013.01)
*H04W 4/40* (2018.01)

(52) U.S. Cl.
CPC ............ *B60R 25/102* (2013.01); *B60R 25/24* (2013.01); *H04W 4/40* (2018.02)

(58) Field of Classification Search
CPC ........ B60R 25/102; B60R 25/24; H04W 4/40; H04W 4/80; H04W 4/90
See application file for complete search history.

(56) References Cited

U.S. PATENT DOCUMENTS

| 2005/0068225 | A1 | 3/2005 | Inoue et al. |
| 2005/0271057 | A1 | 12/2005 | Kim et al. |
| 2006/0145836 | A1 | 7/2006 | Miyazaki |
| 2008/0012693 | A1 | 1/2008 | Shimomura |
| 2013/0214909 | A1 | 8/2013 | Meijers et al. |
| 2013/0217332 | A1 | 8/2013 | Altman et al. |

(Continued)

FOREIGN PATENT DOCUMENTS

| JP | 2002-269663 A | 9/2002 |
| JP | 2004-196058 A | 7/2004 |

(Continued)

OTHER PUBLICATIONS

International Search Report dated Aug. 3, 2021, for the corresponding International Patent Application No. PCT/JP2021/021738, 5 pages. (With English Translation).

(Continued)

*Primary Examiner* — An T Nguyen
(74) *Attorney, Agent, or Firm* — Seed Intellectual Property Law Group LLP

(57) ABSTRACT

When a vehicle and a smartphone are in a second communication state, the vehicle can operate, and then if the vehicle and the smartphone are not in the second communication state for a predetermined time or longer, and if a main switch of the vehicle detects a predetermined operation, an emergency advertising is transmitted from the vehicle. Thereby, the smartphone can be used as a key that can receive the emergency information from the vehicle. By enabling the smartphone to be used as a key for the vehicle, it is possible to popularize a smartphone that can be used as a key for the vehicle.

20 Claims, 62 Drawing Sheets

(56) References Cited

U.S. PATENT DOCUMENTS

| | | |
|---|---|---|
| 2013/0217333 A1 | 8/2013 | Sprigg et al. |
| 2013/0282438 A1 | 10/2013 | Hunter et al. |
| 2013/0297422 A1 | 11/2013 | Hunter et al. |
| 2014/0133656 A1 | 5/2014 | Wurster et al. |
| 2014/0254466 A1 | 9/2014 | Wurster et al. |
| 2014/0370879 A1 | 12/2014 | Redding et al. |
| 2015/0077229 A1 | 3/2015 | Augustinowicz |
| 2016/0344509 A1 | 11/2016 | Hayman |
| 2017/0070847 A1 | 3/2017 | Altman et al. |
| 2017/0105101 A1 | 4/2017 | Santavicca et al. |
| 2017/0142543 A1 | 5/2017 | Ossin et al. |
| 2017/0197583 A1* | 7/2017 | Izraeli .................. H04W 4/80 |
| 2017/0310849 A1 | 10/2017 | Hosoda et al. |
| 2019/0061692 A1* | 2/2019 | Bobay .................. B60R 25/33 |
| 2019/0092280 A1 | 3/2019 | Oesterling et al. |
| 2019/0116287 A1 | 4/2019 | Hosoda et al. |
| 2019/0202400 A1 | 7/2019 | Shimizu et al. |
| 2020/0186670 A1 | 6/2020 | Hosoda et al. |
| 2021/0264691 A1* | 8/2021 | Hirao .................. H04W 64/006 |
| 2022/0060601 A1 | 2/2022 | Hosoda et al. |
| 2022/0137620 A1* | 5/2022 | Wolf .................. B61L 25/028 701/2 |

FOREIGN PATENT DOCUMENTS

| | | |
|---|---|---|
| JP | 2005-098847 A | 4/2005 |
| JP | 2005-178666 A | 7/2005 |
| JP | 2005-348418 A | 12/2005 |
| JP | 2007-317122 A | 12/2007 |
| JP | 2008-037414 A | 2/2008 |
| JP | 4161816 B2 | 10/2008 |
| JP | 2009-193141 A | 8/2009 |
| JP | 2011-013745 A | 1/2011 |
| JP | 2012-066648 A | 4/2012 |
| JP | 2015-513838 A | 5/2015 |
| JP | 2015-145578 A | 8/2015 |
| JP | 2016-024688 A | 2/2016 |
| JP | 2016-066217 A | 4/2016 |
| JP | 2016-097824 A | 5/2016 |
| JP | 2017-005668 A | 1/2017 |
| JP | 2018-034658 A | 3/2018 |
| JP | 2019-133609 A | 8/2019 |
| JP | 2019-156084 A | 9/2019 |
| WO | 2020/137751 A1 | 7/2020 |

OTHER PUBLICATIONS

Panasonic, "Panasonic unveils Bluetooth tracker Seekit that ensure safety of your loved ones." Panasonic Corporation of India, Dec. 2018, 6 pages.

* cited by examiner

FIG. 9

| AD TYPE (0xFF) | AD DATA |
|---|---|
| | COMPANY IDENTIFIER CODE | EMERGENCY ADVERTISING INFORMATION |

| | EMERGENCY TYPE | OCCURRENCE DATE AND TIME |
|---|---|---|

| VALUE | EMERGENCY TYPE |
|---|---|
| 0x00 | NO ABNORMALITY |
| 0x01 | ONCE IMPACT ON VEHICLE IS DETECTED |
| 0x02 | PLURALITY OF TIMES OF IMPACTS ON VEHICLE ARE DETECTED |
| 0x03 | TILT OF VEHICLE IS DETECTED |
| 0x04 | GLOVE BOX IS OPENED |
| 0x05 | ACCELERATION DETECTED IN VEHICLE (MAY BE TRANSPORTING) |
| 0x06 | IG = ON WITHOUT AUTHENTICATION |
| 0x07 | STARTER IS STARTED WITHOUT AUTHENTICATION |
| 0x08 | WHEEL SPEED IS DETECTED WITHOUT AUTHENTICATION |

FIG. 10

| TYPE | CONTENT |
|---|---|
| NOTIFICATION DEVICE ID | IDS OF SMARTPHONE AND BICYCLE PARKING LOT BLUETOOTH UNIT |
| RECEPTION DATE AND TIME | DATE AND TIME AT WHICH NOTIFICATION DEVICE RECEIVES EMERGENCY ADVERTISING |
| VEHICLE ID | BLUETOOTH MAC ADDRESS USED WHEN VEHICLE ISSUES NOTIFICATION |
| LOCATION INFORMATION | GPS LOCATION INFORMATION POSSESSED BY NOTIFICATION DEVICE |
| EMERGENCY TYPE | EMERGENCY TYPE NOTIFIED BY VEHICLE |
| OCCURRENCE DATE AND TIME | OCCURRENCE DATE AND TIME NOTIFIED BY VEHICLE |

FIG. 11

| TYPE | CONTENT |
|---|---|
| RECEPTION DATE AND TIME | DATE AND TIME AT WHICH NOTIFICATION DEVICE RECEIVES EMERGENCY ADVERTISING |
| LOCATION INFORMATION | GPS LOCATION INFORMATION POSSESSED BY NOTIFICATION DEVICE |
| EMERGENCY TYPE | EMERGENCY TYPE NOTIFIED BY VEHICLE |
| OCCURRENCE DATE AND TIME | OCCURRENCE DATE AND TIME NOTIFIED BY VEHICLE |

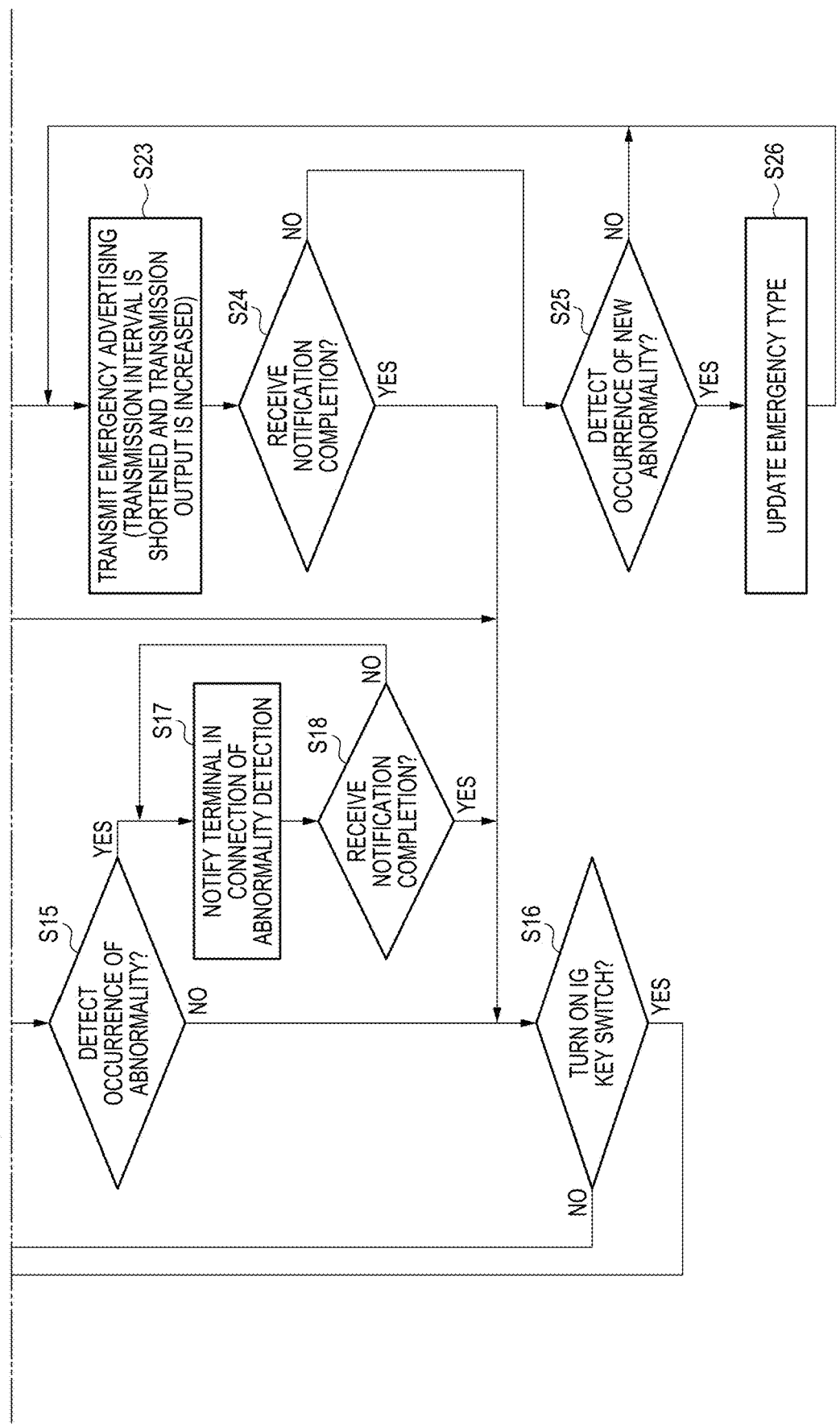
(FIG. 14 CONTINUED)

FIG. 21

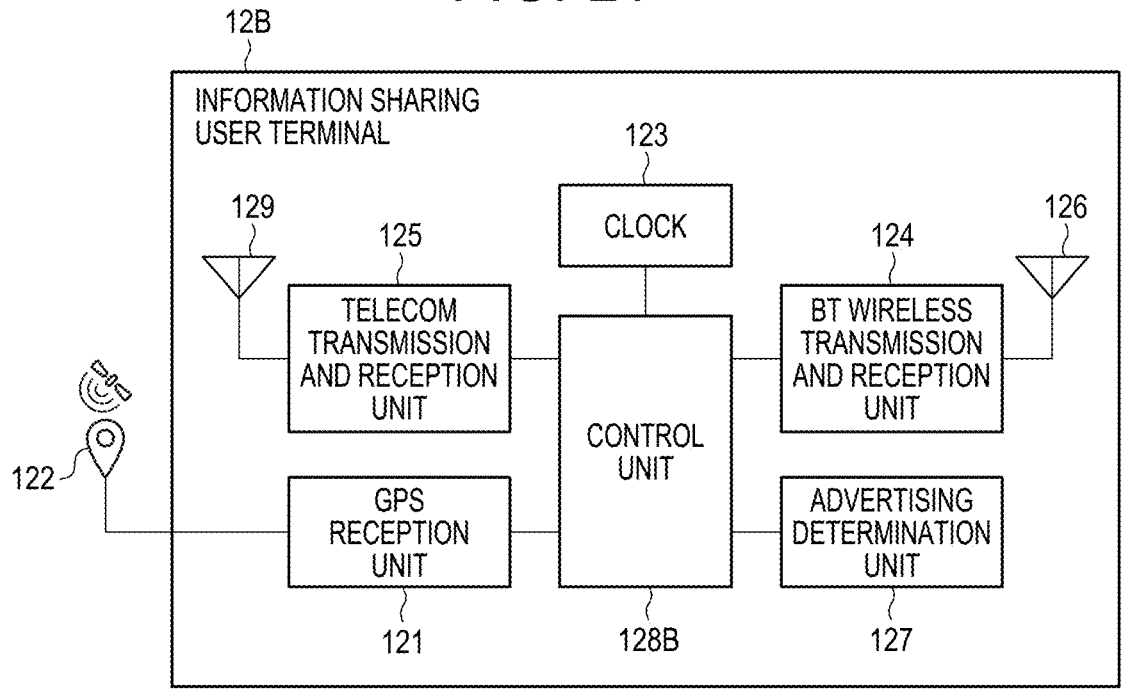

FIG. 22

| TYPE | CONTENT |
|---|---|
| NOTIFICATION DEVICE ID | ID OF SMARTPHONE |
| RECEPTION DATE AND TIME | DATE AND TIME AT WHICH NOTIFICATION DEVICE RECEIVES EMERGENCY ADVERTISING |
| VEHICLE ID | BLUETOOTH MAC ADDRESS USED WHEN VEHICLE ISSUES NOTIFICATION |
| LOCATION INFORMATION | GPS LOCATION INFORMATION POSSESSED BY NOTIFICATION DEVICE |
| RELIABILITY OF LOCATION INFORMATION | NUMBER OF TIMES AND TIME OF CONTROL (ENGINE RUNNING) AFTER DATA IS FIRST ACQUIRED |
| EMERGENCY TYPE | EMERGENCY TYPE NOTIFIED BY VEHICLE |
| OCCURRENCE DATE AND TIME | OCCURRENCE DATE AND TIME NOTIFIED BY VEHICLE |

FIG. 23

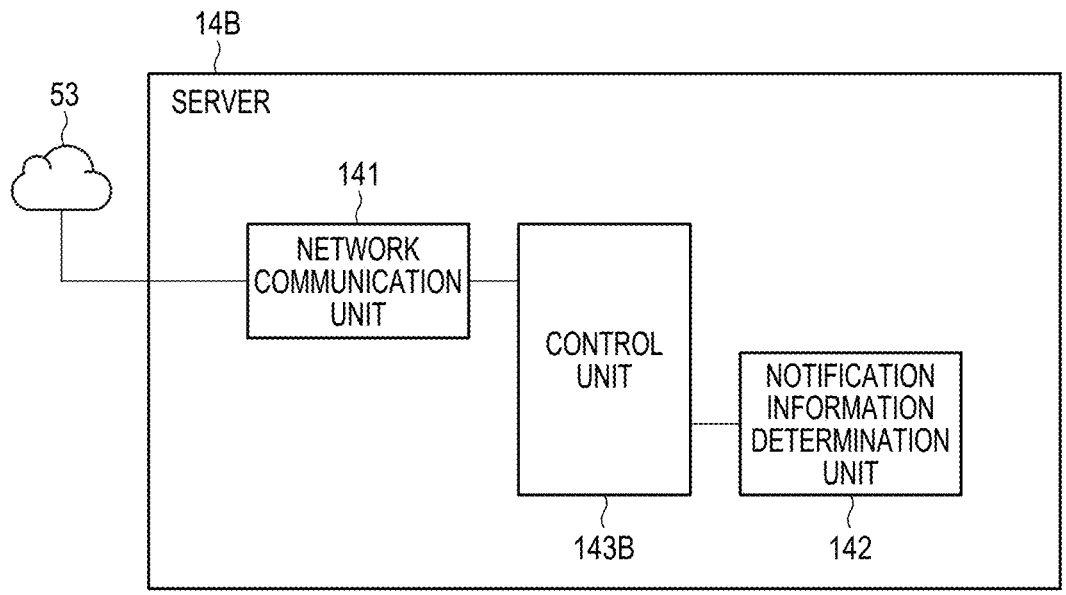

FIG. 24

| TYPE | CONTENT |
|---|---|
| RECEPTION DATE AND TIME | DATE AND TIME AT WHICH NOTIFICATION DEVICE RECEIVES EMERGENCY ADVERTISING |
| LOCATION INFORMATION | GPS LOCATION INFORMATION POSSESSED BY NOTIFICATION DEVICE |
| RELIABILITY OF LOCATION INFORMATION | NUMBER OF TIMES AND TIME OF CONTROL (ENGINE RUNNING) AFTER DATA IS FIRST ACQUIRED |
| EMERGENCY TYPE | EMERGENCY TYPE NOTIFIED BY VEHICLE |
| OCCURRENCE DATE AND TIME | OCCURRENCE DATE AND TIME NOTIFIED BY VEHICLE |

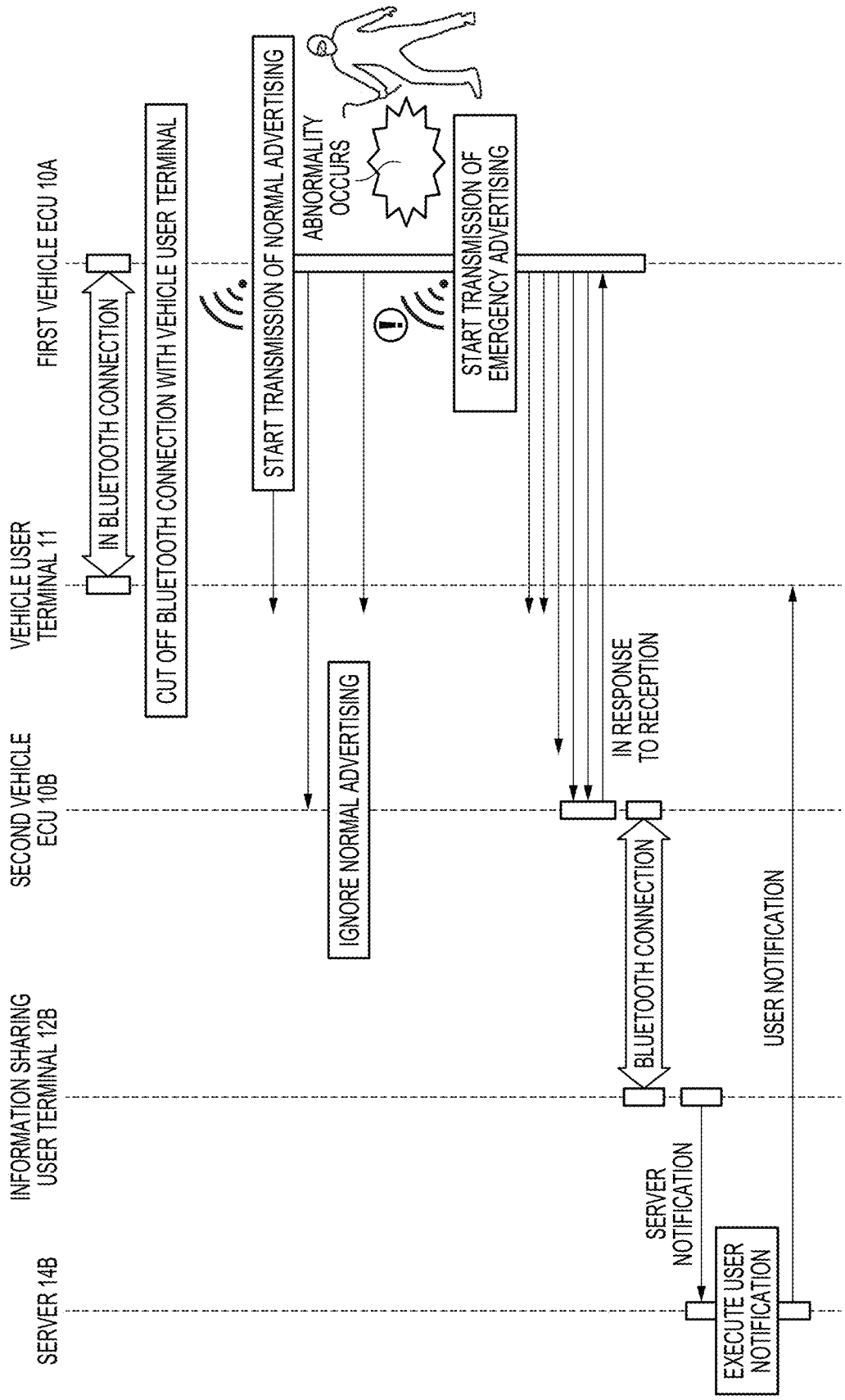

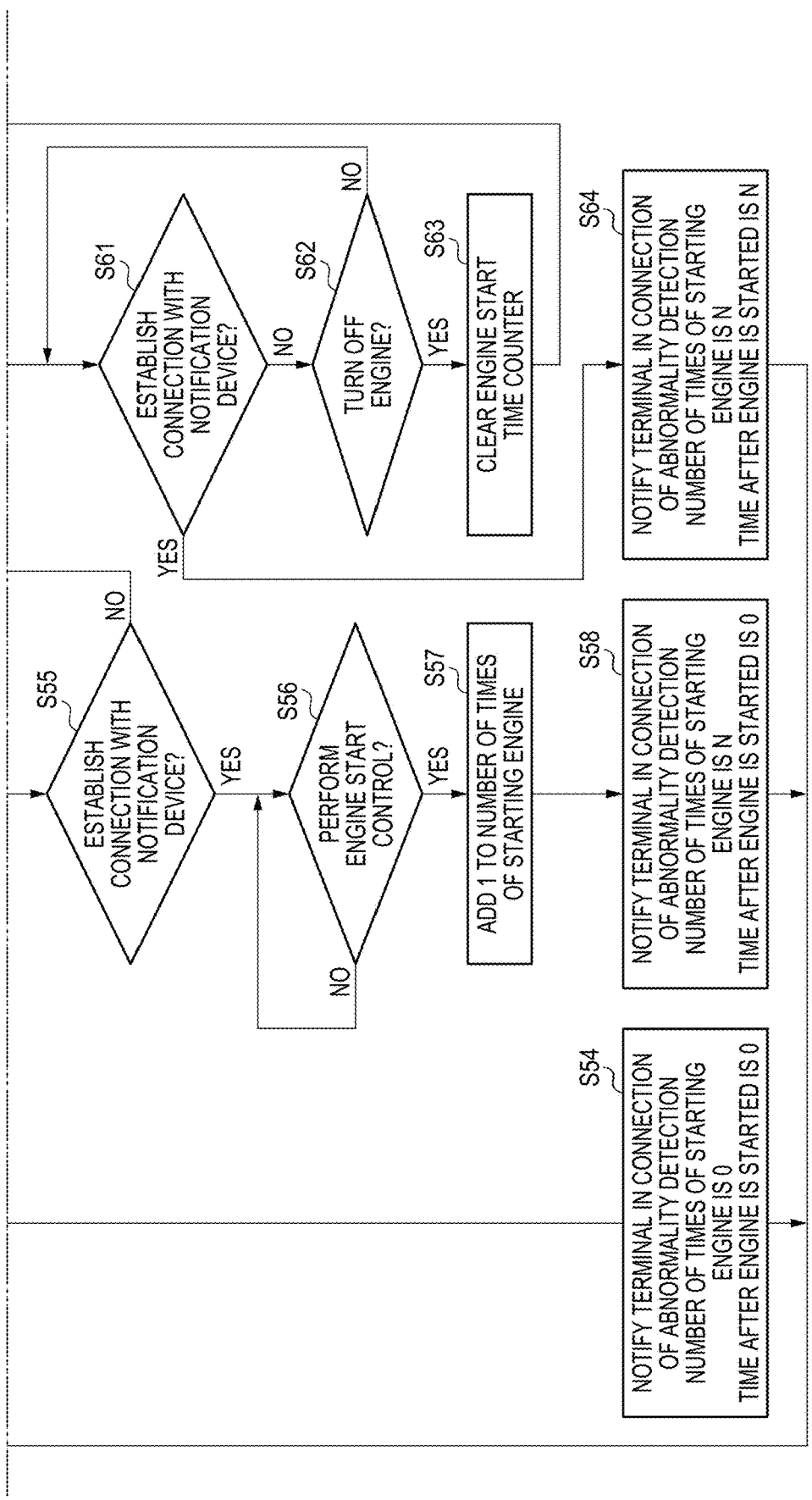

FIG. 33

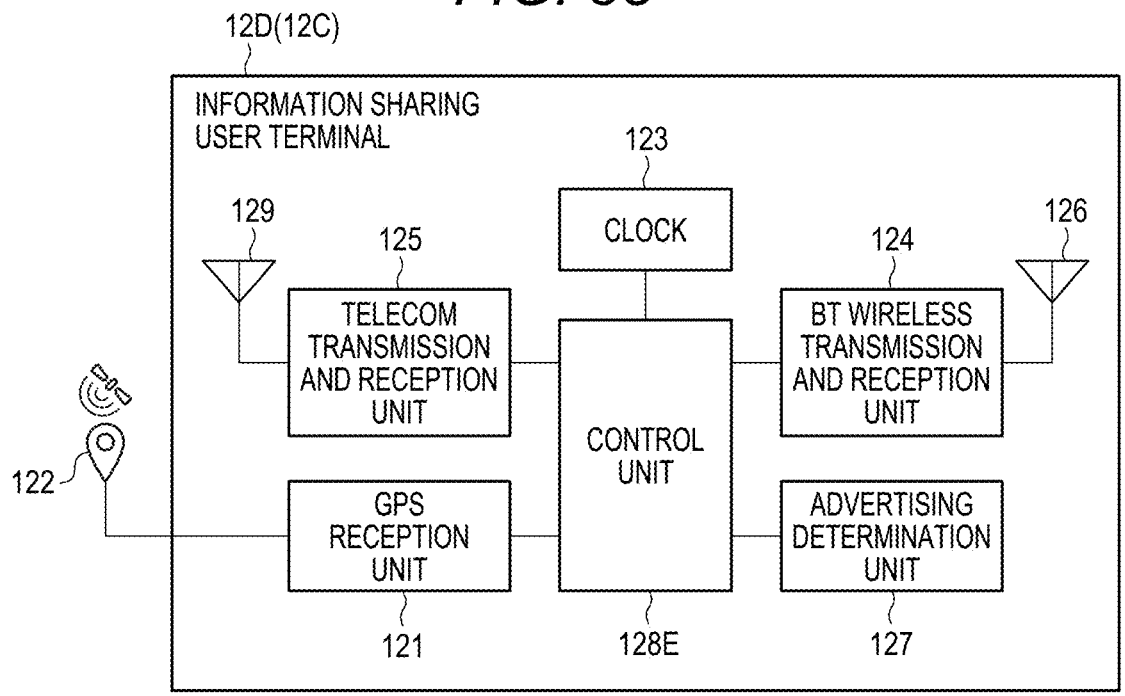

FIG. 34

| TYPE | CONTENT |
|---|---|
| NOTIFICATION DEVICE ID | ID OF SMARTPHONE |
| RECEPTION DATE AND TIME | DATE AND TIME AT WHICH NOTIFICATION DEVICE RECEIVES EMERGENCY ADVERTISING |
| VEHICLE ID | BLUETOOTH MAC ADDRESS USED WHEN VEHICLE ISSUES NOTIFICATION |
| LOCATION INFORMATION | GPS LOCATION INFORMATION POSSESSED BY NOTIFICATION DEVICE |
| ESTIMATED DISTANCE INFORMATION | INFORMATION ON ESTIMATED DISTANCE BETWEEN NOTIFICATION DEVICE AND STOLEN VEHICLE |
| EMERGENCY TYPE | EMERGENCY TYPE NOTIFIED BY VEHICLE |
| OCCURRENCE DATE AND TIME | OCCURRENCE DATE AND TIME NOTIFIED BY VEHICLE |

FIG. 35

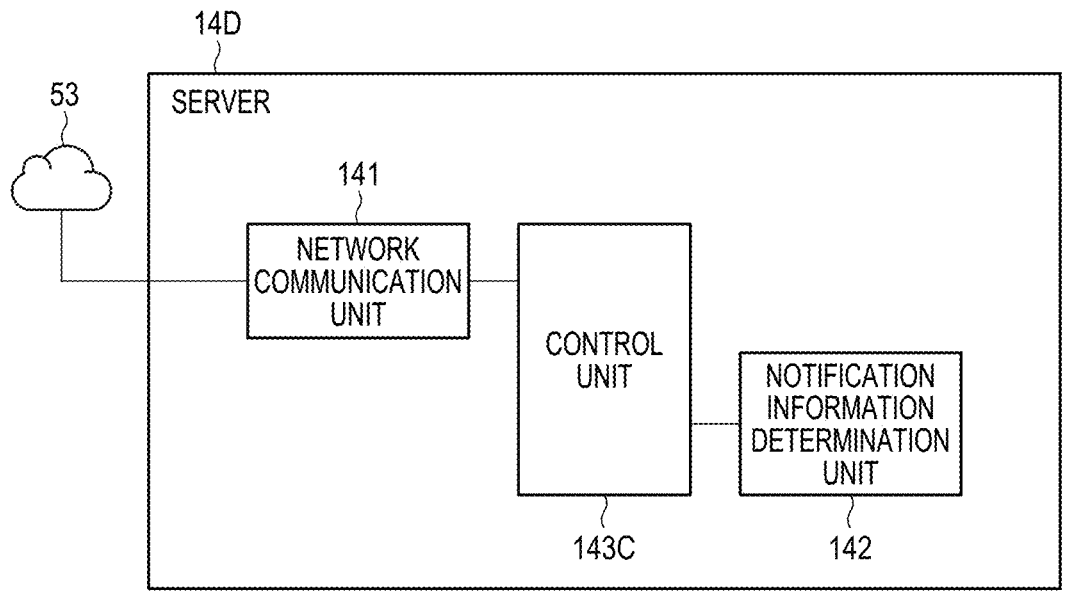

FIG. 36

| TYPE | CONTENT |
|---|---|
| RECEPTION DATE AND TIME | DATE AND TIME AT WHICH NOTIFICATION DEVICE RECEIVES EMERGENCY ADVERTISING |
| LOCATION INFORMATION | GPS LOCATION INFORMATION POSSESSED BY NOTIFICATION DEVICE |
| ESTIMATED DISTANCE INFORMATION | INFORMATION ON ESTIMATED DISTANCE BETWEEN NOTIFICATION DEVICE AND STOLEN VEHICLE |
| EMERGENCY TYPE | EMERGENCY TYPE NOTIFIED BY VEHICLE |
| OCCURRENCE DATE AND TIME | OCCURRENCE DATE AND TIME NOTIFIED BY VEHICLE |

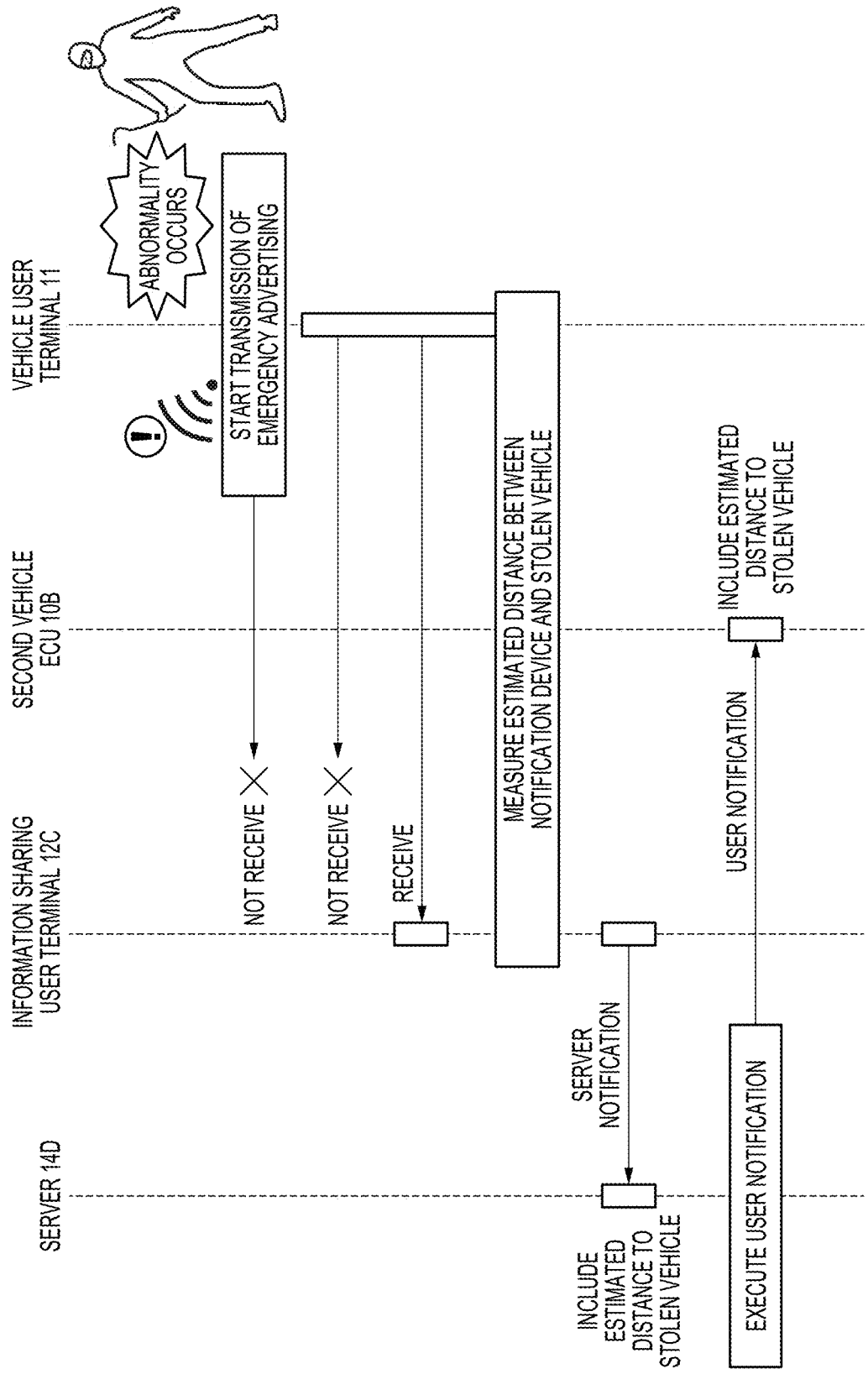

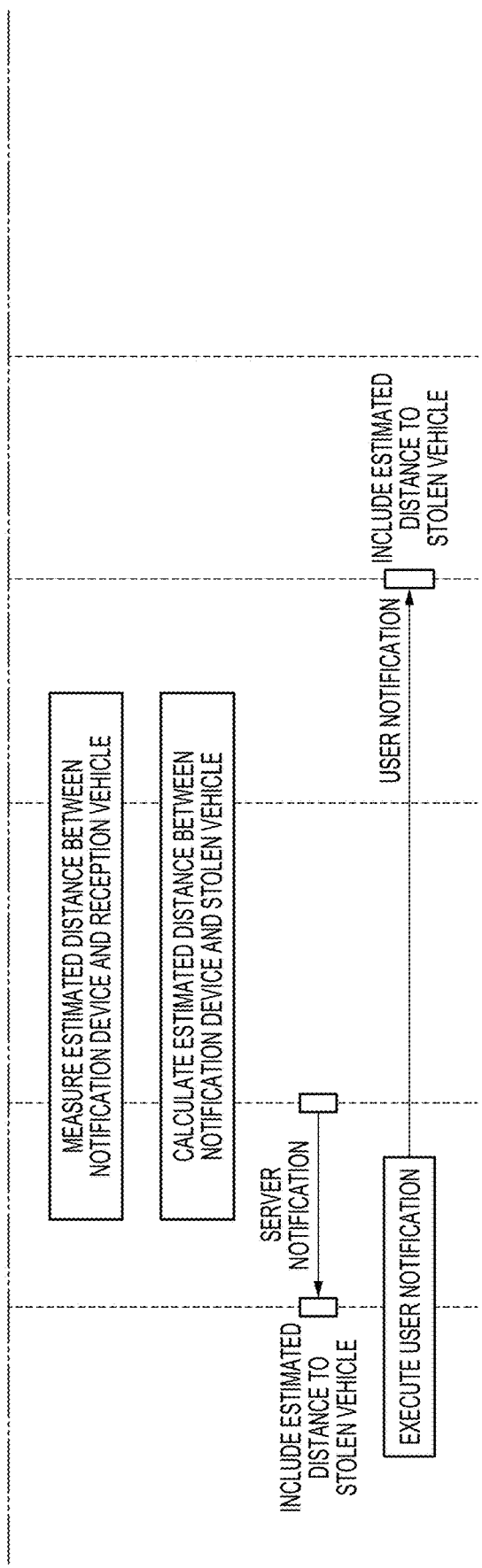

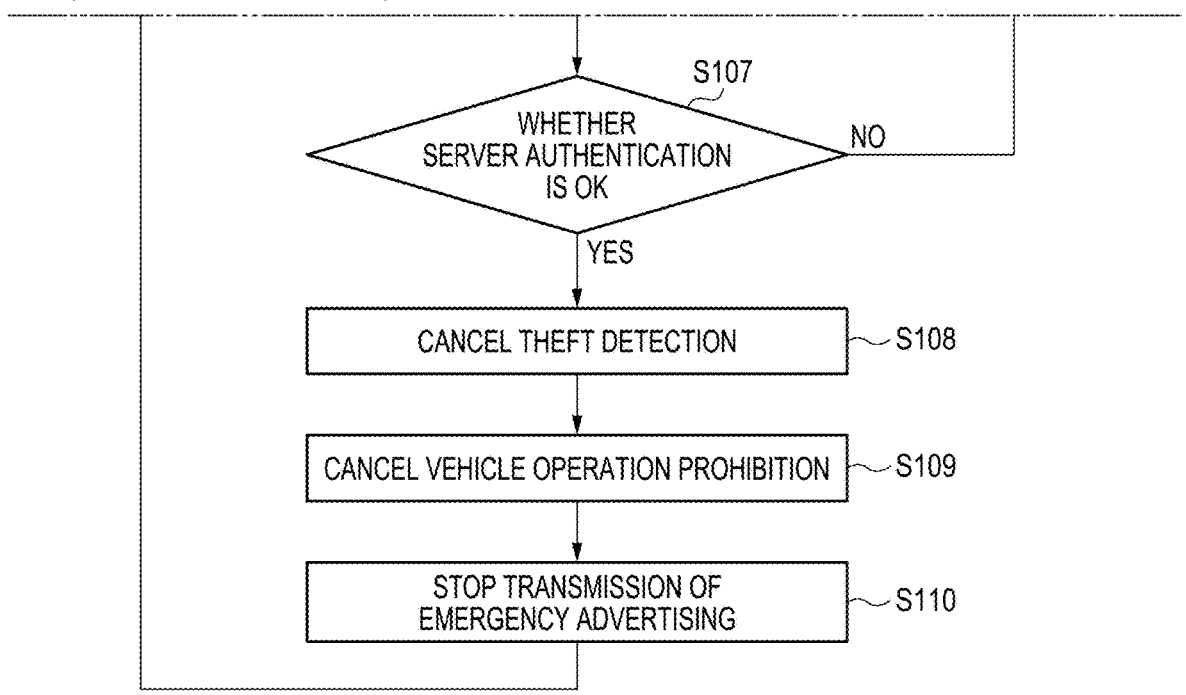

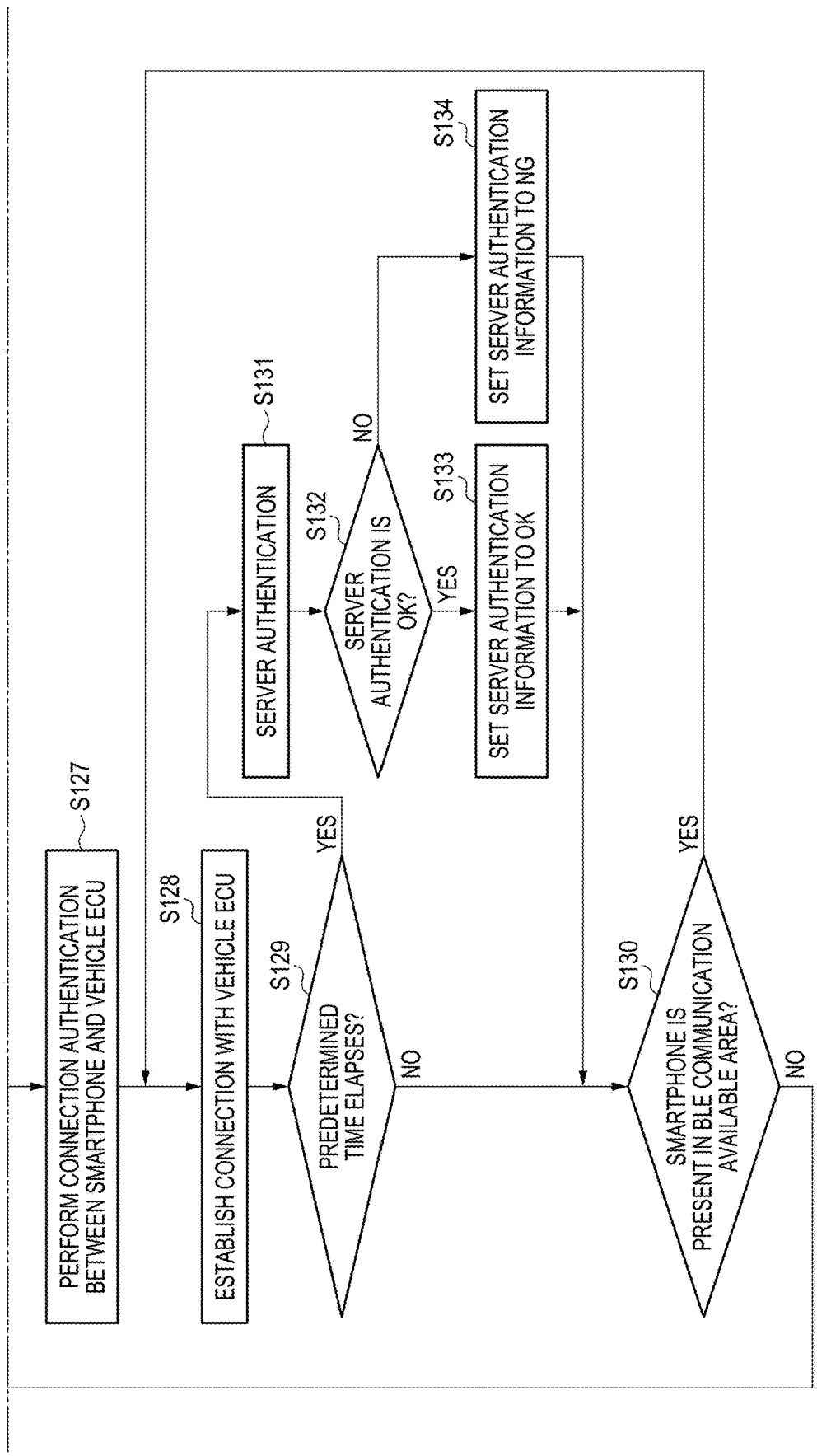

WIRELESS COMMUNICATION SYSTEM

CROSS-REFERENCE TO RELATED APPLICATIONS

This is a continuation of International Application No. PCT/JP2021/021738 filed on Jun. 8, 2021, the entire content of which is incorporated herein by reference.

TECHNICAL FIELD

The present disclosure relates to a wireless communication system suitable for use in a two-wheeled vehicle.

BACKGROUND ART

In recent years, a theft detection system that detects a theft of a vehicle has been developed. For example, if a theft detection system described in Patent Literature 1 determines that a vehicle that cannot communicate well with another vehicle equipped with a communication terminal may be a stolen vehicle, the theft detection system acquires location information of the vehicle and retains the location information in a server, thereby enabling tracking of the stolen vehicle.

A small electronic tag (transmitter) is known which uses Bluetooth (registered trademark), a short-range wireless communication standard, to link with a dedicated smartphone application to detect location information of belongings and prevent loss (see, for example, Non Patent Literature 1).

CITATION LIST

Patent Literature

Patent Literature 1: JP4161816B

Non-Patent Literature

Non Patent Literature 1: "Seekit (registered trademark)", [online], Panasonic Corporation of India, [Sep. 18, 2019], Internet <URL: https://www.seekit.panasonic.com/>

SUMMARY OF INVENTION

However, in a theft detection system that detects a stolen vehicle using wireless communication, gives location information, and retains the location information in a server to enable tracking of the stolen vehicle, if a communication method with a long communication distance, such as Bluetooth LE communication is used, there is a problem that it is difficult to actually find the stolen vehicle because an area where the stolen vehicle is assumed to be present is widened based on only the location information.

An object of the present disclosure is to provide a wireless communication system that can easily find a stolen vehicle even when a communication method with a long communication distance, such as Bluetooth LE communication, is used to detect the stolen vehicle.

A wireless communication system according to the present disclosure includes a vehicle including an operation unit and a first wireless communication circuit conforming to a first wireless method; a first wireless communication terminal which includes a second wireless communication circuit conforming to the first wireless method and available to communicate with the first wireless communication circuit; and a second wireless communication terminal which includes a third wireless communication circuit conforming to the first wireless method and available to communicate with the first wireless communication circuit, and a fourth wireless communication circuit conforming to a second wireless method different from the first wireless method. When the first wireless communication circuit of the vehicle and the second wireless communication circuit of the first wireless communication terminal are in a first communication state, the vehicle becomes operable. When the first wireless communication circuit of the vehicle and the third wireless communication circuit of the second wireless communication terminal are in a second communication state, the vehicle becomes operable. After the first wireless communication circuit of the vehicle and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit of the vehicle transmits a packet including emergency information.

According to the present disclosure, when the first wireless communication circuit of the vehicle and the third wireless communication circuit of the second wireless communication terminal are in a second communication state, the vehicle becomes operable. Further, after the first wireless communication circuit of the vehicle and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit of the vehicle transmits a packet including emergency information. Thus, the second wireless communication terminal can be used as a key that can receive the emergency information from the vehicle. By enabling the second wireless communication terminal to be used as a key for the vehicle, it is possible to popularize a smartphone that can be used as a key for the vehicle. Even if the first wireless communication terminal is lost or stolen, it is possible to use the second wireless communication terminal as a key.

In the wireless communication system according to the above structure, even when the first wireless communication circuit of the vehicle and the second wireless communication circuit of the first wireless communication terminal are in the first communication state, after the first wireless communication circuit of the vehicle and the third wireless communication circuit of the second wireless communication terminal enter into the second communication state, if the first wireless communication circuit and the third wireless communication circuit do not enter into the second communication state for the predetermined time or longer, and if the operation unit of the vehicle detects the predetermined operation, the first wireless communication circuit of the vehicle transmits the packet including the emergency information.

According to the present disclosure, even if the first wireless communication circuit of the vehicle and the second wireless communication circuit of the first wireless communication terminal are in the first communication state, and the vehicle is operable in the first communication state, when an abnormality occurs in the vehicle, the second wireless communication terminal can receive a packet containing emergency information transmitted from the first wireless communication circuit of the vehicle. Thereby, if the first wireless communication terminal is lost or stolen, the theft can be detected.

In the wireless communication system according to the above structure, the first wireless communication terminal does not include a wireless communication circuit conforming to the second wireless method.

According to the present disclosure, it is possible to use for a conventional electronic key as the first wireless communication terminal.

In the wireless communication system according to the above structure, the second wireless communication terminal is configured to stop at least the third wireless communication circuit from entering into the second communication state via the fourth wireless communication circuit.

According to the present disclosure, it is possible to disable the operation of the vehicle by using the second wireless communication terminal.

In the wireless communication system according to the above structure, the first wireless method is Bluetooth (registered trademark).

According to the present disclosure, since Bluetooth is used for the communication between the first wireless communication circuit of the vehicle and the third wireless communication circuit of the second wireless communication terminal, it is possible to notify the second wireless communication terminal of an abnormality in the vehicle without using a telematics service in the vehicle. Further, since there is no need to have a communication line or GPS function to use the telematics service, costs can be reduced.

In the wireless communication system according to the above structure, the second wireless method is cellular.

According to the present disclosure, when the second wireless communication terminal is within the range where cellular communication is possible, it is possible to receive emergency information from the vehicle via cellular communication.

In the wireless communication system according to the above structure, the second wireless communication terminal has at least one authentication function of password authentication, fingerprint authentication, and face authentication.

According to the present disclosure, it is possible to determine whether or not the person having the wireless commutation terminal is the authorized owner.

In the wireless communication system according to the above structure, in the authentication function of the second wireless communication terminal, if the authentication is successful, at least the third wireless communication circuit continues to be in the second communication state, and if the authentication fails, at least the third wireless communication circuit stops entering into the second communication state.

According to the present disclosure, use of the second wireless communication terminal can be prohibited to anyone other than the authorized owner.

In the wireless communication system according to the above structure, at least the second wireless communication terminal is registerable in the vehicle.

According to the present disclosure, since the second wireless communication terminal can be registered in the vehicle, it is possible to prohibit the use of wireless communication terminals other than the registered second wireless communication terminal.

In the wireless communication system according to the above structure, the first communication state and the second communication state are the same.

According to the present disclosure, since the communication state between the first wireless commutation circuit of the vehicle and the second wireless communication circuit of the first wireless communication terminal is the same as the communication state between the first wireless communication circuit of the vehicle and the third wireless communication circuit of the second wireless communication terminal, processing can be simplified.

A wireless communication device mountable on a vehicle having an operation unit according to the present disclosure includes a first wireless communication circuit conforming to a first wireless method. The wireless communication device is able to be communicated with a first wireless communication terminal, the first wireless communication terminal including a second wireless communication circuit conforming to the first wireless method and available to communicate with the first wireless communication circuit, the wireless communication device is able to be communicated with a second wireless communication terminal, the second wireless communication terminal including a third wireless communication circuit conforming to the first wireless method and available to communicate with the first wireless communication circuit, and a fourth wireless communication circuit conforming to a second wireless method different from the first wireless method. When the first wireless communication circuit and the second wireless communication circuit of the first wireless communication terminal are in a first communication state, the vehicle becomes operable. When the first wireless communication circuit and the third wireless communication circuit of the second wireless communication terminal are in a second communication state, the vehicle becomes operable. After the first wireless communication circuit and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit transmits a packet including emergency information.

According to the present disclosure, when the first wireless communication circuit and the third wireless communication circuit of the second wireless communication terminal are in a second communication state, the vehicle becomes operable. After the first wireless communication circuit and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit transmits a packet including emergency information. Therefore, it is possible to use the second wireless communication terminal as a key that can receive emergency information from the vehicle. Further, by using a smartphone as the second wireless communication terminal, it is possible to popularize a smartphone that can be used as a key for the vehicle.

In the wireless communication device according to the above structure, even when the first wireless communication circuit and the second wireless communication circuit of the first wireless communication terminal are in the first communication state, after the first wireless communication circuit and the third wireless communication circuit of the second wireless communication terminal enter into the second communication state, if the first wireless communication circuit and the third wireless communication circuit do not enter into the second communication state for the predetermined time or longer, and if the operation unit of the vehicle detects the predetermined operation, the first wireless communication circuit transmits the packet including the emergency information.

According to the present disclosure, even if the first wireless communication circuit of the vehicle and the second wireless communication circuit of the first wireless communication terminal are in the first communication state, and the vehicle is operable in the first communication state, when an abnormality occurs in the vehicle, the second wireless communication terminal can receive a packet containing emergency information transmitted from the first wireless communication circuit of the vehicle. Thereby, if the first wireless communication terminal is lost or stolen, the theft can be detected.

In the wireless communication device according to the above structure, the first wireless communication terminal does not include a wireless communication circuit conforming to the second wireless method.

According to the present disclosure, it is possible to use for a conventional electronic key as the first wireless communication terminal.

In the wireless communication device according to the above structure, the second wireless communication terminal is configured to stop at least the third wireless communication circuit from entering into the second communication state via the fourth wireless communication circuit.

According to the present disclosure, it is possible to disable the operation of the vehicle by using the second wireless communication terminal.

In the wireless communication device according to the above structure, the first wireless method is Bluetooth (registered trademark).

According to the present disclosure, Bluetooth is used for the communication between the first wireless communication circuit of the vehicle and the third wireless communication circuit of the second wireless communication terminal. Therefore, it is possible to notify the second wireless communication terminal of an abnormality in the vehicle without using a telematics service in the vehicle. Further, since there is no need to have a communication line or GPS function to use the telematics service, costs can be reduced.

In the wireless communication device according to the above structure, the second wireless method is cellular.

According to the present disclosure, when the second wireless communication terminal is within the range where cellular communication is possible, it is possible to receive emergency information from the vehicle via cellular communication.

In the wireless communication device according to the above structure, the second wireless communication terminal has at least one authentication function of password authentication, fingerprint authentication, and face authentication.

According to the present disclosure, it is possible to determine whether or not the person having the wireless commutation terminal is the authorized owner.

In the wireless communication device according to the above structure, in the authentication function of the second wireless communication terminal, if the authentication is successful, at least the third wireless communication circuit continues to be in the second communication state, and if the authentication fails, at least the third wireless communication circuit stops entering into the second communication state.

According to the present disclosure, use of the second wireless communication terminal can be prohibited to anyone other than the authorized owner.

In the wireless communication device according to the above structure, at least the second wireless communication terminal is registerable in the vehicle.

According to the present disclosure, since the second wireless communication terminal can be registered in the vehicle, it is possible to prohibit the use of wireless communication terminals other than the registered second wireless communication terminal.

In the wireless communication device according to the above structure, the first communication state and the second communication state are the same.

According to the present disclosure, since the communication state between the first wireless commutation circuit of the vehicle and the second wireless communication circuit of the first wireless communication terminal is the same as the communication state between the first wireless communication circuit of the vehicle and the third wireless communication circuit of the second wireless communication terminal, processing can be simplified.

According to the present disclosure, expensive parts such as acceleration sensors are not required, and security can be improved while allowing the vehicle to be operated using just a smartphone.

BRIEF DESCRIPTION OF DRAWINGS

FIG. 9 is a diagram showing a data structure of AD Type: 0xFF of the advertising packet of Bluetooth used in the wireless communication system according to the first embodiment;

FIG. 10 is a diagram showing an example of server notification information notified to a server device of the wireless communication system according to the first embodiment;

FIG. 11 is a diagram showing an example of user notification information notified to a vehicle user terminal of the wireless communication system according to the first embodiment;

FIG. 21 is a block diagram showing a schematic configuration of an information sharing user terminal of the wireless communication system according to the second embodiment;

FIG. 22 is a diagram showing an example of server notification information transmitted to a server from a telecom wireless transmission and reception unit of the information sharing user terminal of the wireless communication system according to the second embodiment;

FIG. 23 is a block diagram showing a schematic configuration of the server of the wireless communication system according to the second embodiment;

FIG. 24 is a diagram showing an example of user notification information transmitted to a vehicle user terminal from a network communication unit of the server of the wireless communication system according to the second embodiment;

FIG. 25 is a sequence diagram for illustrating operations of the first vehicle ECU, the second vehicle ECU, the vehicle user terminal, the information sharing user terminal, the server of the wireless communication system according to the second embodiment in normal times and in an emergency;

FIG. 33 is a block diagram showing a schematic configuration of the information sharing user terminal of the wireless communication system according to the third embodiment;

FIG. 34 is a diagram showing an example of server notification information transmitted to a server from a telecom wireless transmission and reception unit of the information sharing user terminal of the wireless communication system according to the third embodiment;

FIG. 35 is a block diagram showing a schematic configuration of the server of the wireless communication system according to the third embodiment;

FIG. 36 is a diagram showing an example of user notification information transmitted to a vehicle user terminal from a network communication unit of the server of the wireless communication system according to the third embodiment;

FIG. 37 is a sequence diagram for illustrating operations of the second vehicle ECU, the vehicle user terminal, the information sharing user terminal, and the server when an abnormality occurs in the wireless communication system according to the third embodiment;

DESCRIPTION OF EMBODIMENTS

Hereinafter, embodiments specifically disclosing a wireless communication system according to the present disclosure will be described in detail with reference to the drawings as appropriate. However, unnecessarily detailed descriptions may be omitted. For example, detailed descriptions of well-known matters and redundant descriptions of substantially the same configuration may be omitted. This is to avoid the following description from being unnecessarily redundant and facilitate understanding of those skilled in the art. The accompanying drawings and the following description are provided for those skilled in the art to fully understand the present disclosure, and are not intended to limit the subject matters described in the claims.

Hereinafter, preferred embodiments for carrying out the present disclosure will be described in detail with reference to the drawings.

First Embodiment

Figure 1:
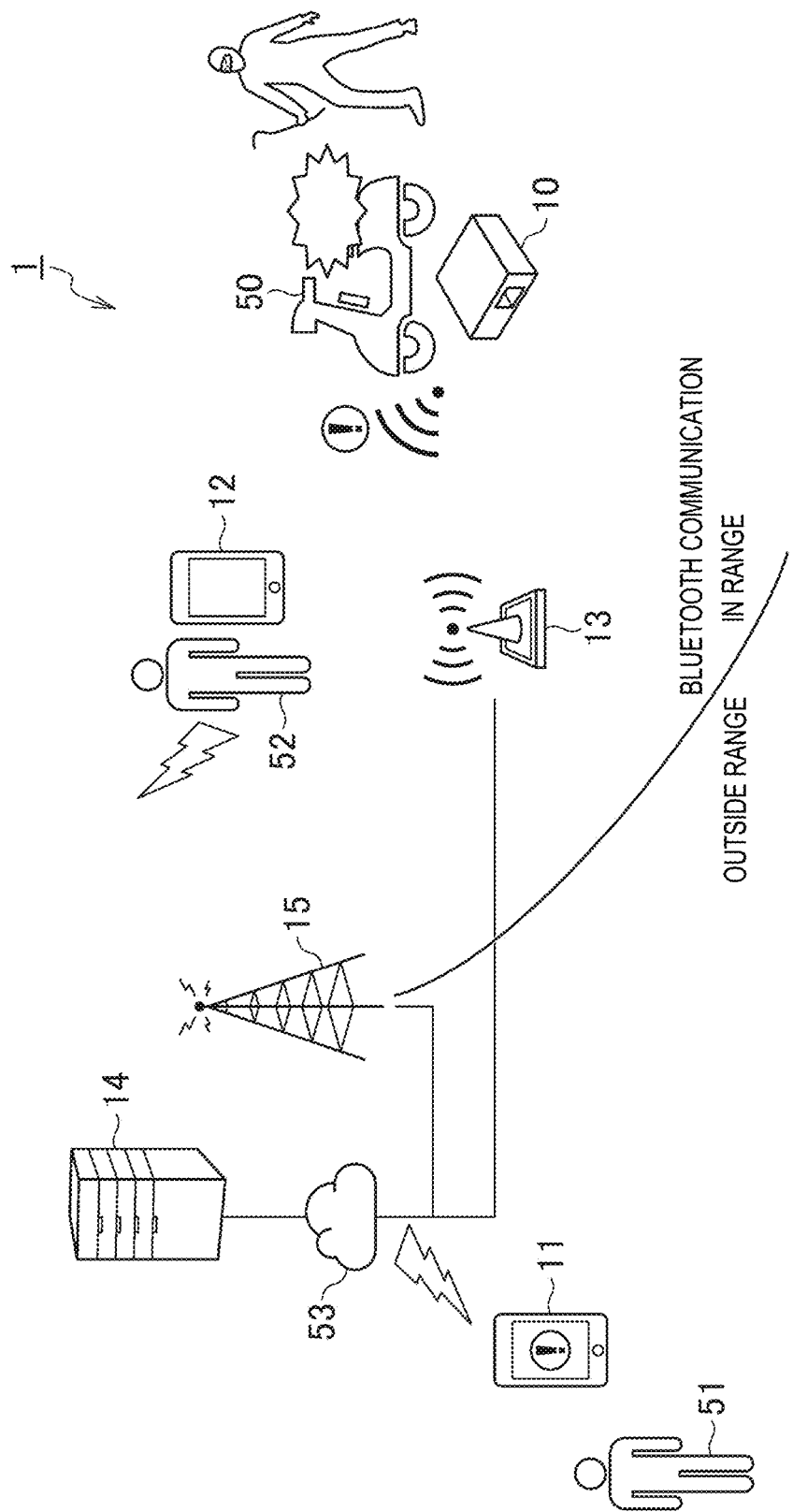
FIG. 1 is a diagram showing an aspect of using a wireless communication system according to a first embodiment.

Hereinafter, a wireless communication system according to a first embodiment will be described with reference to FIGS. 1 to 17. FIG. 1 is a diagram showing an aspect of using a wireless communication system 1 according to the first embodiment. As shown in FIG. 1, the wireless communication system 1 according to the first embodiment includes a vehicle electronic control unit (ECU, wireless communication device) 10 mounted on a vehicle 50, a vehicle user terminal (wireless communication terminal) 11 owned by a user 51 of the vehicle 50, an information sharing user terminal (wireless communication terminal) 12 owned by a user 52 who shares information with the user 51 of the vehicle 50, a bicycle parking lot Bluetooth (registered trademark) unit (fixed base station) 13 provided in a bicycle parking lot and connected by wire to a cloud 53, a server 14 connected by wire to the cloud 53, and a telecom base station (mobile base station) 15 connected by wire to the cloud 53. The information sharing user terminal 12 and the bicycle parking lot Bluetooth unit 13 are respectively notification devices. Identification information is given to the vehicle ECU 10. The identification information can also be considered as identification information of the vehicle 50. The identification information is information uniquely determined by the vehicle ECU, and may be, for example, a MAC address.

The vehicle ECU 10, the information sharing user terminal 12, and the bicycle parking lot Bluetooth unit 13 each have a Bluetooth communication function, and Bluetooth communication is performed between the vehicle ECU 10 and the information sharing user terminal 12 and between the vehicle ECU 10 and the bicycle parking lot Bluetooth unit 13. The information sharing user terminal 12 has a cellular communication function or a WiFi (registered trademark) communication function in addition to the Bluetooth communication function. The vehicle user terminal 11 also has a cellular communication function or the WiFi communication function in addition to the Bluetooth communication function.

A smartphone is suitable for the vehicle user terminal 11 and the information sharing user terminal 12 of the wireless communication system 1 according to the first embodiment. Although the wireless communication system 1 according to the first embodiment is applied to the two-wheeled vehicle (motorcycle) 50, the wireless communication system 1 can of course also be applied to a four-wheeled vehicle.

Next, respective configurations of the vehicle ECU 10, the vehicle user terminal 11, the information sharing user terminal 12, the bicycle parking lot Bluetooth unit 13, and the server 14 of the wireless communication system 1 according to the first embodiment will be described.

Figure 2:
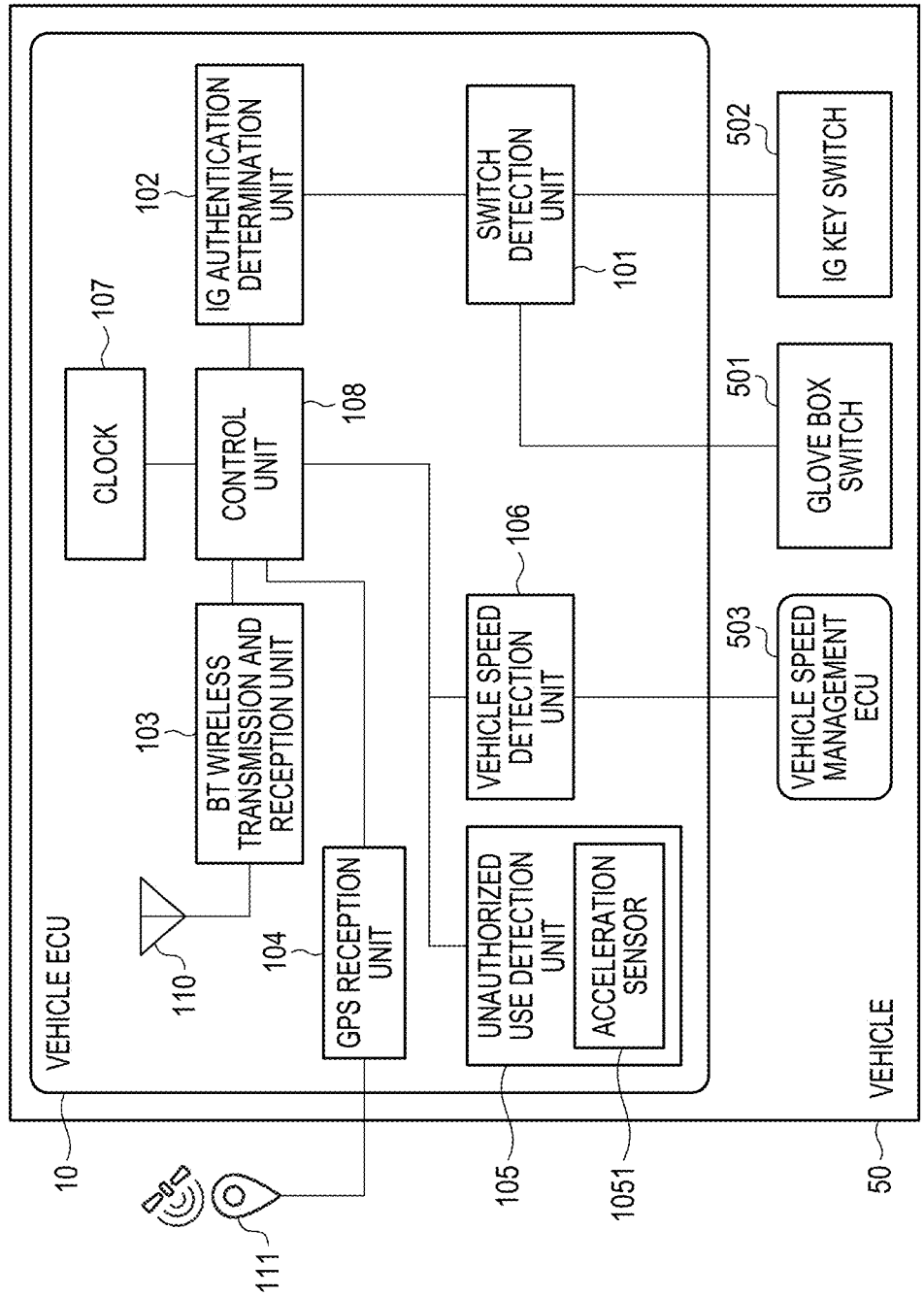
FIG. 2 is a block diagram showing a schematic configuration of a part of a vehicle and a schematic configuration of a vehicle ECU of the wireless communication system according to the first embodiment.

FIG. 2 is a block diagram showing a schematic configuration of a part of the vehicle 50 and a schematic configuration of the vehicle ECU 10. In FIG. 2, the vehicle ECU 10 includes a switch detection unit 101, an IG authentication determination unit 102, a BT wireless transmission and reception unit 103, a GPS reception unit 104, an unauthorized use detection unit (unauthorized use detection circuit) 105, a vehicle speed detection unit 106, a clock 107, a control unit 108, and antennas 110 and 111. The switch detection unit 101 detects at least ON/OFF of a glove box switch 501 and ON/OFF of an IG KEY switch 502. The glove box switch 501 is a switch that detects opening and closing of a glove box (not shown) mounted on the vehicle 50, and is turned on when the glove box (not shown) is opened and turned off when the glove box is closed. The IG KEY switch 502 is a switch for starting/stopping an engine of the vehicle 50 and turning on/off an electrical system.

The IG authentication determination unit 102 performs IG authentication determination with respect to a key (not shown) inserted into the IG KEY switch 502. An IG authentication determination result of the IG authentication determination unit 102 is taken into the control unit 108. The BT wireless transmission and reception unit 103 performs wireless communication conforming to a Bluetooth standard. The antenna 110 for Bluetooth communication is connected to the BT wireless transmission and reception unit 103. The BT wireless transmission and reception unit 103 is controlled by the control unit 108. The BT wireless transmission and reception unit 103 and the antenna 110 correspond to a first antenna. The vehicle ECU 10 has one antenna 110, but may have a plurality thereof.

The GPS reception unit 104 receives a positioning signal transmitted from a global positioning system (GPS) satellite and outputs a second latitude and longitude. The antenna 111 for GPS reception is connected to the GPS reception unit 104. The second latitude and longitude output from the GPS reception unit 104 is taken into the control unit 108.

The unauthorized use detection unit 105 includes an acceleration sensor 1051 and detects an abnormality including a theft of the vehicle 50. That is, when the acceleration sensor 1051 detects an abnormal vibration in the vehicle 50, the unauthorized use detection unit 105 detects an abnormality including a theft. The unauthorized use detection unit 105 repeatedly performs the detection. A detection result of the unauthorized use detection unit 105 is taken into the control unit 108. The vehicle speed detection unit 106 detects a vehicle speed from vehicle speed information managed by a vehicle speed management ECU 503 mounted on the vehicle 50. A detection result of the vehicle speed detection unit 106 is taken into the control unit 108. The clock 107 outputs a second time indicating a current date and time. The second time output from the clock 107 is taken into the control unit 108.

The control unit 108 controls each unit of the device, and includes a central processing unit (CPU) (not shown), a read only memory (ROM) storing a program for operating the CPU, and a random access memory (RAM) used for an operation of the CPU. The IG authentication determination unit 102, the BT wireless transmission and reception unit 103, the GPS reception unit 104, the unauthorized use detection unit 105, the vehicle speed detection unit 106, and the clock 107 operate under the control of the control unit 108. If an abnormality including a theft occurs in the vehicle 50, the control unit 108 issues an emergency notification to the vehicle user terminal 11 of the vehicle user 51.

If the unauthorized use detection unit 105 detects unauthorized use (that is, if an abnormality including a theft occurs in the vehicle 50), the BT wireless transmission and reception unit 103 transmits an advertising packet of Bluetooth including identification information of the vehicle 50, emergency information, the second time, and the second latitude and longitude from the antenna 110. In this case, the second time is a time at which the unauthorized use detection unit 105 last detects the unauthorized use. The advertising packet of Bluetooth including the identification information of the vehicle 50, the emergency information, the second time, and the second latitude and longitude is received by the information sharing user terminal 12 and the bicycle parking lot Bluetooth unit 13. The advertising packet of Bluetooth including the identification information of the vehicle 50, the emergency information, the second time, and the second latitude and longitude is called a first advertising packet or emergency advertising.

The first advertising packet transmitted from the vehicle ECU 10 includes at least the identification information of the vehicle 50 and the emergency information. That is, it is unnecessary to include the second time and the second latitude and longitude, and it is sufficient to include the identification information of the vehicle 50 and the emergency information. It is desirable that the first advertising packet is not transmitted only once, but is transmitted twice or more.

If the unauthorized use detection unit 105 does not detect the unauthorized use, the BT wireless transmission and reception unit 103 does not transmit the first advertising packet including the emergency information, but transmits an advertising packet that does not include the emergency information. The advertising packet that does not include the emergency information is called a second advertising packet or normal advertising. The second advertising packet may not be transmitted only once, but may be transmitted twice or more.

When the number of times of transmission of each of the first advertising packet and the second advertising packet is twice or more, it is desirable to make a transmission interval (first transmission interval) of the first advertising packet shorter than a transmission interval (second transmission interval) of the second advertising packet.

When a voltage of a battery (not shown) mounted on the vehicle 50 becomes lower than a predetermined value, it is desirable to make the first transmission interval of the first advertising packet shorter than the second transmission interval of the second advertising packet. That is, the first transmission interval of the first advertising packet is made shorter than that before the voltage of the battery drops. Notification omission can be reduced by shortening the first transmission interval of the first advertising packet that notifies an emergency. If the battery voltage becomes lower than the predetermined value, the transmission of the second advertising packet may be stopped, and at the same time, the second advertising packet may be taken out. The matter that the transmission of the second advertising packet is stopped also means increasing the transmission interval to infinite. The battery may be a vehicle drive battery mounted on the vehicle 50 or a button battery within the vehicle ECU 10.

If the battery voltage becomes lower than the predetermined value, a countermeasure may be performed in such an order that at first, only the second advertising packet is taken out, and if the battery voltage further drops thereafter, the first advertising packet is taken out, and if the battery voltage drops further thereafter, the transmission of the second advertising packet is stopped.

In the transmission of the first advertising packet, it is desirable to make an electric field strength of a radio wave that transmits the packet greater than an electric field strength of a radio wave that transmits the second advertising packet.

Accordingly, by increasing the number of times of the transmission of the first advertising packet, shortening the transmission interval, or increasing the electric field strength of the radio wave, a notification at a time of an emergency can be made more reliable. Power saving can be achieved by taking out the second advertising packet or stopping the transmission.

Figure 3:
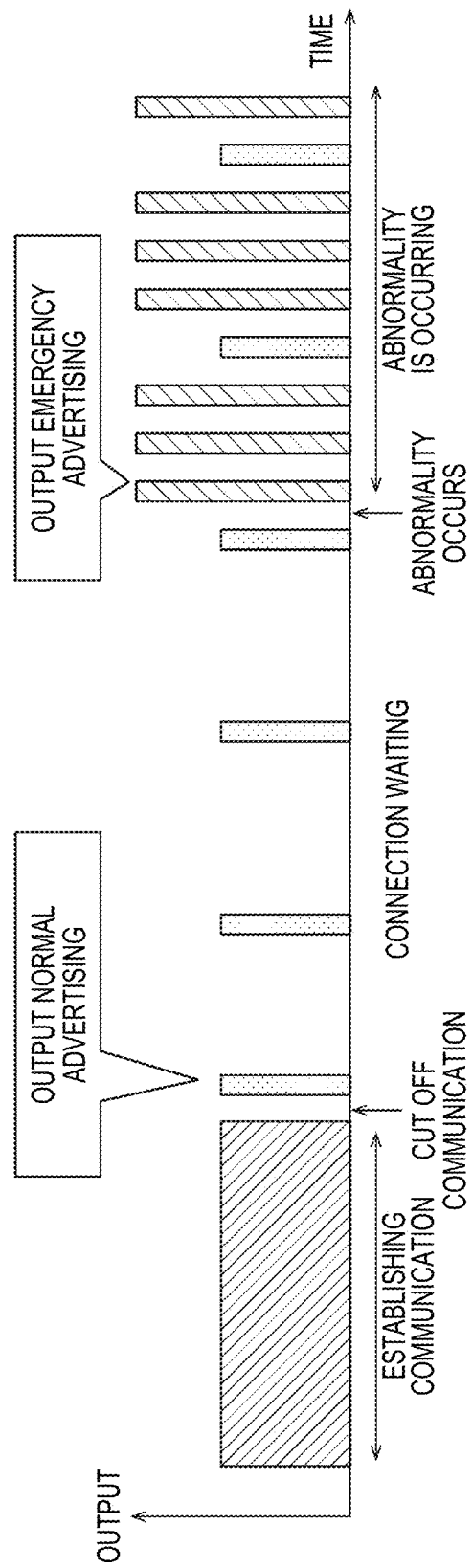
FIG. 3 is a diagram showing output waveforms of a first advertising packet and a second advertising packet transmitted from the vehicle ECU of the wireless communication system according to the first embodiment.
Figure 4:
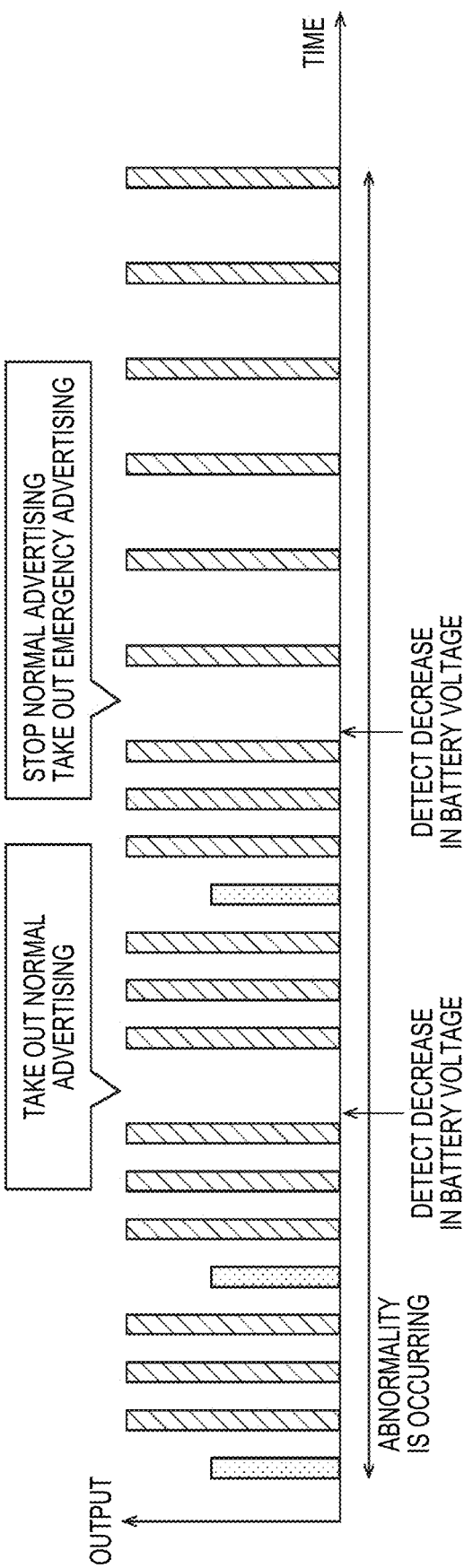
FIG. 4 is a diagram showing output waveforms of the first advertising packet and the second advertising packet transmitted from the vehicle ECU of the wireless communication system according to the first embodiment.

FIGS. 3 and 4 are diagrams showing output waveforms of the first advertising packet and the second advertising packet. In FIG. 3, when communication between the vehicle ECU 10 and the vehicle user terminal 11 is cut off while the communication is being established by Bluetooth, the vehicle ECU 10 starts the transmission of the second advertising packet (normal advertising). The normal advertising is transmitted at a predetermined interval, and enters into a connection waiting state. If an abnormality such as a theft occurs in the vehicle 50 in this state, the transmission of the first advertising packet (emergency advertising) is started from that time. The transmission interval of the emergency advertising is shorter than the transmission interval of the normal advertising, and the transmission is performed within the transmission interval of the normal advertising.

Next, in FIG. 4, when a decrease in the battery voltage of the battery (not shown) of the vehicle 50 is detected while the abnormality occurring, the normal advertising is taken out. Then, when the battery voltage further drops, the transmission of the normal advertising is stopped, and the emergency advertising is taken out.

Figure 5:
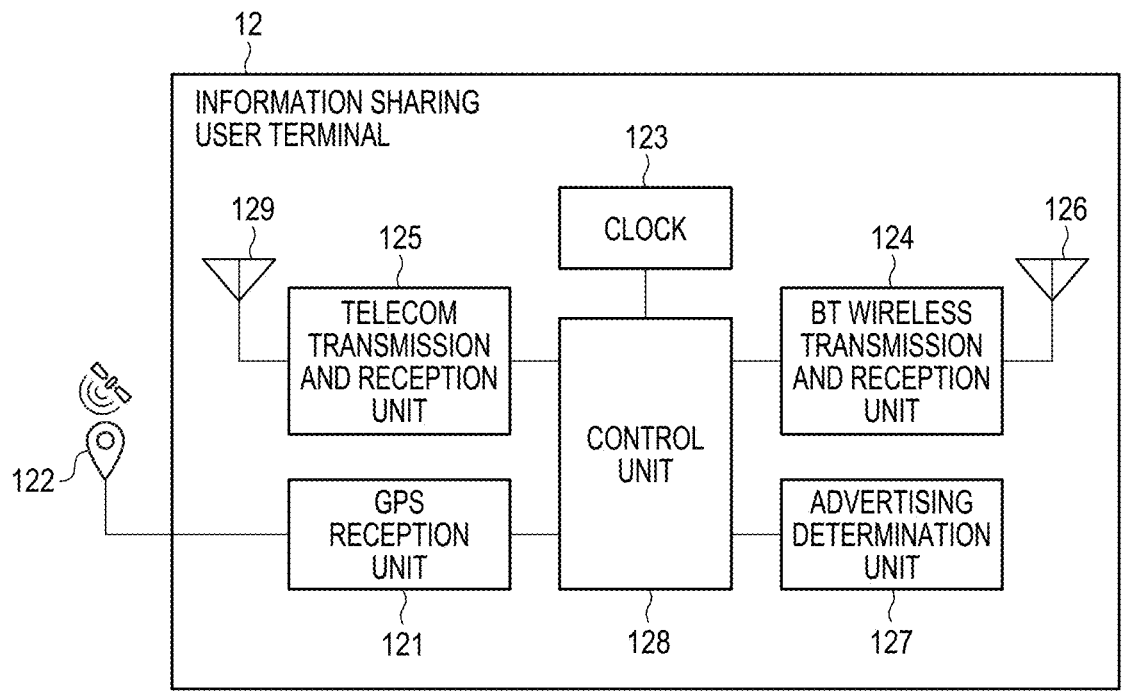
FIG. 5 is a block diagram showing a schematic configuration of an information sharing user terminal of the wireless communication system according to the first embodiment.

FIG. 5 is a block diagram showing a schematic configuration of the information sharing user terminal 12. In FIG. 5, the information sharing user terminal 12 acts as an intermediary to send an emergency notification transmitted from the vehicle ECU 10 to the vehicle user terminal 11 if an abnormality including a theft occurs in the vehicle 50. The information sharing user terminal 12 includes a GPS reception unit (first location information detection circuit) 121, an antenna 122, a clock (first clock) 123, a BT wireless transmission and reception unit 124, a telecom transmission and reception unit 125, antennas 126 and 129, an advertising determination unit 127, and a control unit 128.

The GPS reception unit 121 receives a positioning signal transmitted from the GPS satellite and outputs a first latitude and longitude. The antenna 122 for GPS reception is connected to the GPS reception unit 121. The clock 123 outputs a first time indicating a current date and time. The BT wireless transmission and reception unit 124 performs wireless communication conforming to a Bluetooth standard.

The antenna 126 for Bluetooth communication is connected to the BT wireless transmission and reception unit 124.

The BT wireless transmission and reception unit 124 receives an advertising packet of Bluetooth via the antenna 126. The BT wireless transmission and reception unit 124 outputs the received advertising packet to the control unit 128. The telecom transmission and reception unit 125 performs cellular wireless communication. The antenna 129 for cellular communication is connected to the telecom transmission and reception unit 125. The advertising determination unit 127 determines whether the advertising packet of Bluetooth received by the BT wireless transmission and reception unit 124 is a normal advertising or an emergency advertising, and outputs the result to control unit 128.

The control unit 128 controls each unit of the device, and includes a CPU (not shown), a ROM storing a program for operating the CPU, and a RAM used in an operation of the CPU. The ROM also stores an application for sharing vehicle information. The GPS reception unit 121, the clock 123, the BT wireless transmission and reception unit 124, the telecom transmission and reception unit 125, and the advertising determination unit 127 operate under the control of the control unit 128. The BT wireless transmission and reception unit 124 and the antenna 126 correspond to a second antenna. The telecom transmission and reception unit 125 and the antenna 129 correspond to a third antenna. The information sharing user terminal 12 includes one antenna 126 and one antenna 129, but may include a plurality thereof.

The control unit 128 adds the first latitude and longitude and the first time to the advertising packet received by the BT wireless transmission and reception unit 124, and transmits the obtained packet from the telecom transmission and reception unit 125 to the telecom base station 15 via the antenna 129. If the advertising packet of Bluetooth received by the BT wireless transmission and reception unit 124 is the first advertising packet, the packet includes the emergency information, and if the advertising packet of Bluetooth is the second advertising packet, no emergency information is included. If the advertising packet received by the BT wireless transmission and reception unit 124 includes the second latitude and longitude and the second time, the information is also included and transmitted to the telecom base station 15.

Figure 6:
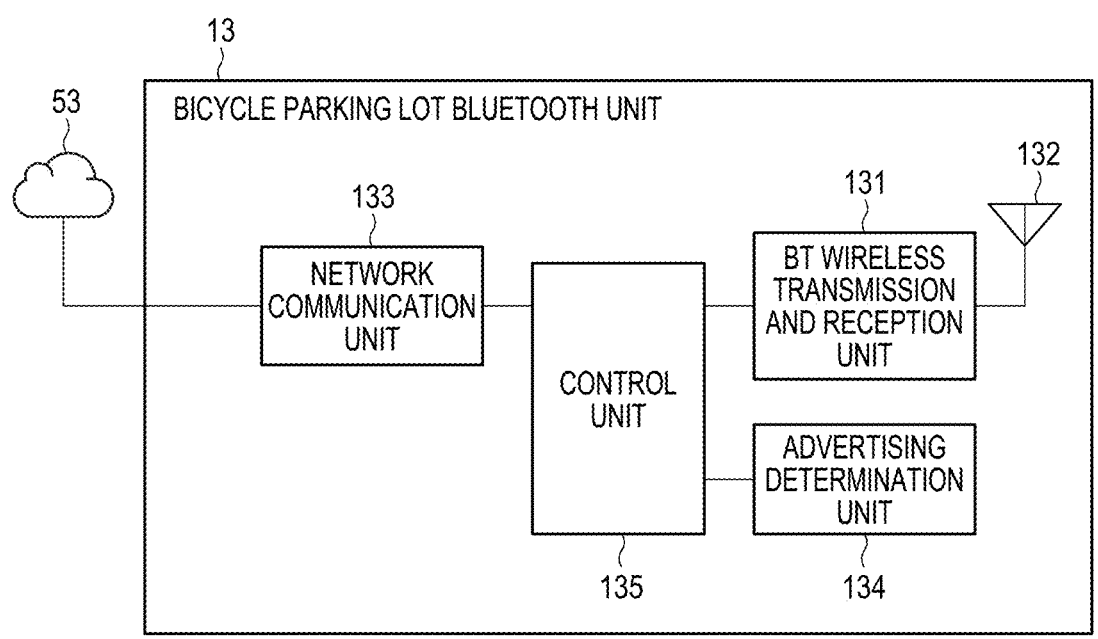
FIG. 6 is a block diagram showing a schematic configuration of a bicycle parking lot Bluetooth unit of the wireless communication system according to the first embodiment.

FIG. 6 is a block diagram showing a schematic configuration of the bicycle parking lot Bluetooth unit 13. In FIG. 6, the bicycle parking lot Bluetooth unit 13 includes a BT wireless transmission and reception unit 131, an antenna 132, a network communication unit 133, an advertising determination unit 134, and a control unit 135. The BT wireless transmission and reception unit 131 performs wireless communication conforming to a Bluetooth standard. The antenna 132 for Bluetooth communication is connected to the BT wireless transmission and reception unit 131.

The network communication unit 133 connects to the cloud 53 and communicates with the server 14. The advertising determination unit 134 determines whether the advertising packet of Bluetooth received by the BT wireless transmission and reception unit 131 is a normal advertising or an emergency advertising, and outputs the result. In this case, if the advertising packet of Bluetooth received by the BT wireless transmission and reception unit 131 is the first advertising packet, the advertising packet of Bluetooth is an emergency advertising, and if the advertising packet of Bluetooth is the second advertising packet, the advertising packet of Bluetooth is a normal advertising.

The control unit 135 controls each unit of the device, and includes a CPU (not shown), a ROM storing a program for operating the CPU, and a RAM used in an operation of the CPU. The BT wireless transmission and reception unit 131, the network communication unit 133, and the advertising determination unit 134 operate under the control of the control unit 135. From the determination result of the advertising determination unit 134, if the advertising packet received by the BT wireless transmission and reception unit 131 is the first advertising packet, the control unit 135 transmits identification information of the vehicle 50 and emergency information from the network communication unit 133 to the server 14 via the cloud 53, and if the advertising packet is the second advertising packet, the control unit 135 transmits the identification information of the vehicle 50 from the network communication unit 133 to the server 14 via the cloud 53. If the advertising packet includes the second latitude and longitude and the second time, the information is also included and transmitted to the server 14. The bicycle parking lot Bluetooth unit 13 has one antenna 132, but may have a plurality thereof.

Figure 7:
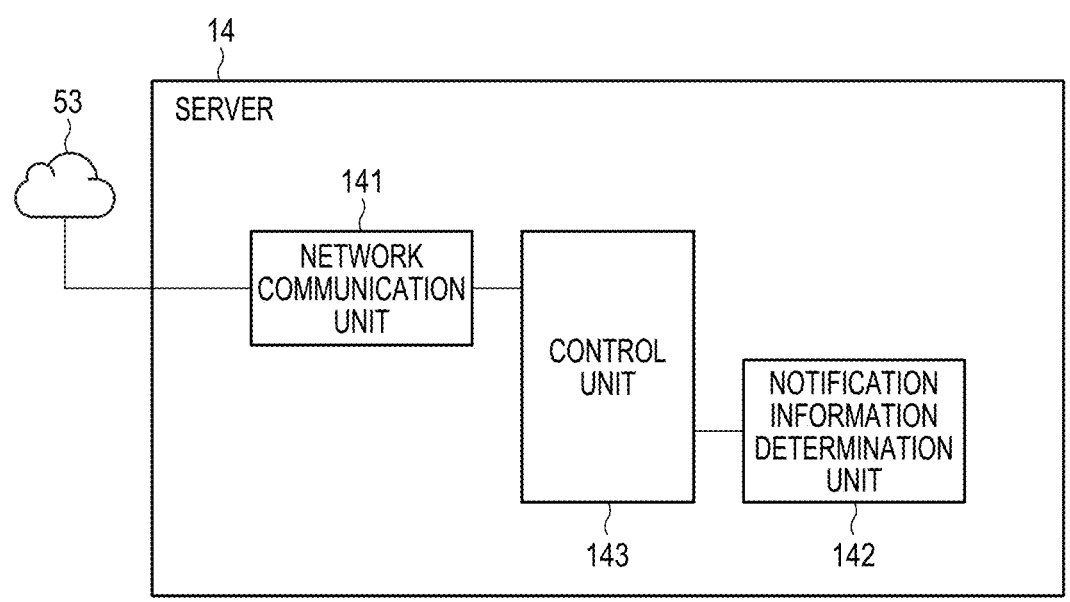
FIG. 7 is a block diagram showing a schematic configuration of a server of the wireless communication system according to the first embodiment.

FIG. 7 is a block diagram showing a schematic configuration of the server 14. In FIG. 7, the server 14 includes a network communication unit 141, a notification information determination unit 142, and a control unit 143. The network communication unit 141 connects to the cloud 53 and communicates with the vehicle user terminal 11. The notification information determination unit 142 determines whether the notification is a normal notification or an emergency notification based on information received by the network communication unit 141. If the information received by the network communication unit 141 is the identification information of the vehicle 50 and the emergency information, the emergency is determined, and if no emergency information of the vehicle 50 is present, the notification is determined as the normal notification.

The control unit 143 controls each unit of the device, and includes a CPU (not shown), a ROM storing a program for operating the CPU, a RAM used in an operation of the CPU, and a large-capacity storage device (not shown) such as a hard disk for storing data. The network communication unit 141 and the notification information determination unit 142 operate under the control of the control unit 143.

When the information of the vehicle 50 is received by the network communication unit 141, the control unit 143 outputs the information to the notification information determination unit 142 and stores the information in the storage device (not shown). Here, if the information received by the network communication unit 141 is from the information sharing user terminal 12, the first and second latitudes and longitudes and the first and second times are stored in addition to the identification information and the emergency information. If the information received by the network communication unit 141 is from the bicycle parking lot Bluetooth unit 13, the second latitude and longitude and the second time are stored in addition to the identification information and the emergency information. In response to acquiring the information output from the control unit 143, the notification information determination unit 142 determines whether the notification is a normal notification or an emergency notification based on the information, and outputs the result to the control unit 143. In the case of the identification information of the vehicle 50 and the emergency information, the control unit 143 determines the result as an emergency, and issues the emergency notification to the vehicle user terminal 11 of the emergency, and in the case of the identification information of the vehicle 50, the control unit 143 issues the normal notification to the vehicle user terminal 11. Although WiFi communication is used for notification from the server 14 to the vehicle user terminal 11, cellular communication may also be used.

Next, the advertising packet of Bluetooth will be described.

Emergency advertising transmission information uses an AD Type: 0xFF Manufacture Specific parameter of advertising data defined by Bluetooth SIG.

Figure 8:
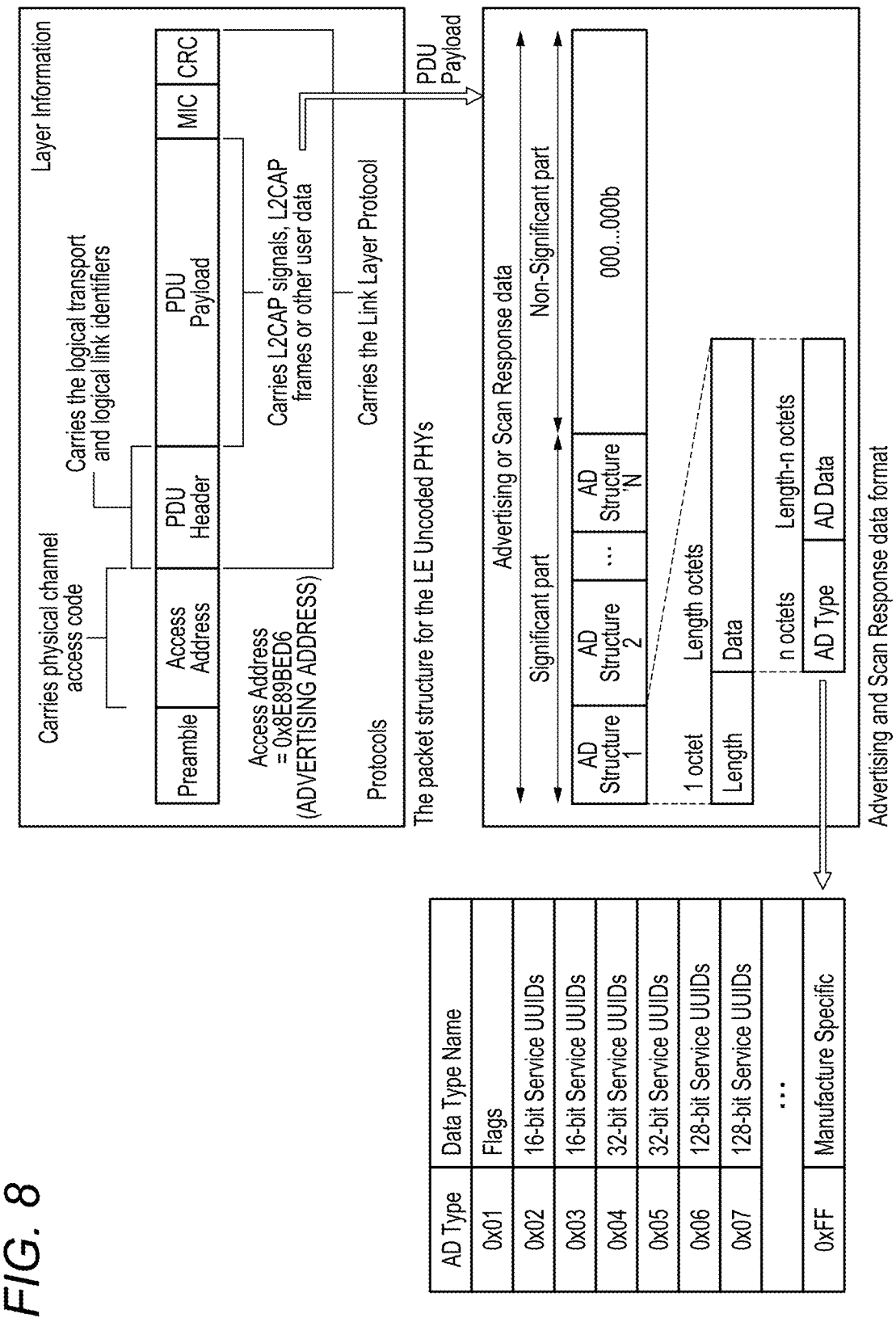
FIG. 8 is a diagram showing a packet structure of LE Uncoded PHYs of an advertising packet of Bluetooth used in the wireless communication system according to the first embodiment.

FIG. 8 is a diagram showing a packet structure of LE Uncoded PHYs. In FIG. 8, the AD Type and AD Data of PDU Payload in the packet structure are used for the emergency advertising transmission information. That is, the AD Type: 0xFF Manufacture Specific parameter of the advertising data defined by Bluetooth SIG is used.

FIG. 9 is a diagram showing a data structure of an AD Type: 0xFF. In the AD Type: 0xFF shown in FIG. 9, a 2-byte Company Identifier Code is defined, and data that follows can be defined independently by a vendor. In the wireless communication system 1 according to the present embodiment, emergency advertising information that includes an "emergency type" and an "occurrence date and time" is defined. Regarding the "emergency type", for example, definitions include 0x00: no abnormality, and include that 0x01: once impact on vehicle is detected, 0x02: a plurality of times of impacts on vehicle are detected, 0x03: tilt of vehicle is detected, 0x04: glove box is opened, 0x05: acceleration detected in vehicle (may be transporting), 0x06: IG=ON without authentication, 0x07: starter is started without authentication, and 0x08: wheel speed is detected without authentication.

When the unauthorized use detection unit 105 of the vehicle ECU 10 detects that an abnormality occurs in the vehicle 50, the unauthorized use detection unit 105 transmits emergency advertising information in which the emergency type and the occurrence date and time are set according to a level of the abnormality. The advertising information is also combined with a vendor-specific UUID predefined for an emergency notification device, and the information sharing user terminal 12 and the bicycle parking lot Bluetooth unit 13, which are notification devices, determine whether the emergency notification device is a device (vehicle ECU 10) corresponding to the emergency notification based on the UUID.

The information sharing user terminal 12 or the bicycle parking lot Bluetooth unit 13 which receives the emergency advertising information gives a reception date and time, location information, and an ID (for example, a Bluetooth MAC address) for identifying the vehicle 50 to the emergency advertising information, transmits the obtained information to the server 14.

FIG. 10 is a diagram showing an example of server notification information. As shown in FIG. 10, the server notification information includes a "type" and a "content". The "type" includes a "notification device ID", a "reception date and time", a "vehicle ID", "location information", an "emergency type", and an "occurrence date and time". The "notification device ID" includes an ID of the information sharing user terminal 12 and an ID of the bicycle parking lot Bluetooth unit 13. The "reception date and time" is a date and time at which the notification device (information sharing user terminal 12, bicycle parking lot Bluetooth unit 13) receives the emergency advertising information. The "vehicle ID" is a Bluetooth MAC address used when the vehicle 50 (vehicle ECU 10) issues a notification. The "location information" is GPS location information possessed by the notification device. The "emergency type" and the "occurrence date and time" are transmitted from the vehicle ECU 10.

The server 14 confirms that the "notification device ID" and the "vehicle ID" of the received server notification information are IDs registered in advance, and issues the user notification.

FIG. 11 is a diagram showing an example of user notification information. As shown in FIG. 11, the user notification information includes a "type" and a "content". The "type" includes a "reception date and time", "location information", an "emergency type", and an "occurrence date and time". The "reception date and time" is a date and time at which the notification device (information sharing user terminal 12, bicycle parking lot Bluetooth unit 13) receives the emergency advertising information. The "location information" is GPS location information possessed by the notification device. The "emergency type" and the "occurrence date and time" are transmitted from the vehicle ECU 10.

Figure 12:
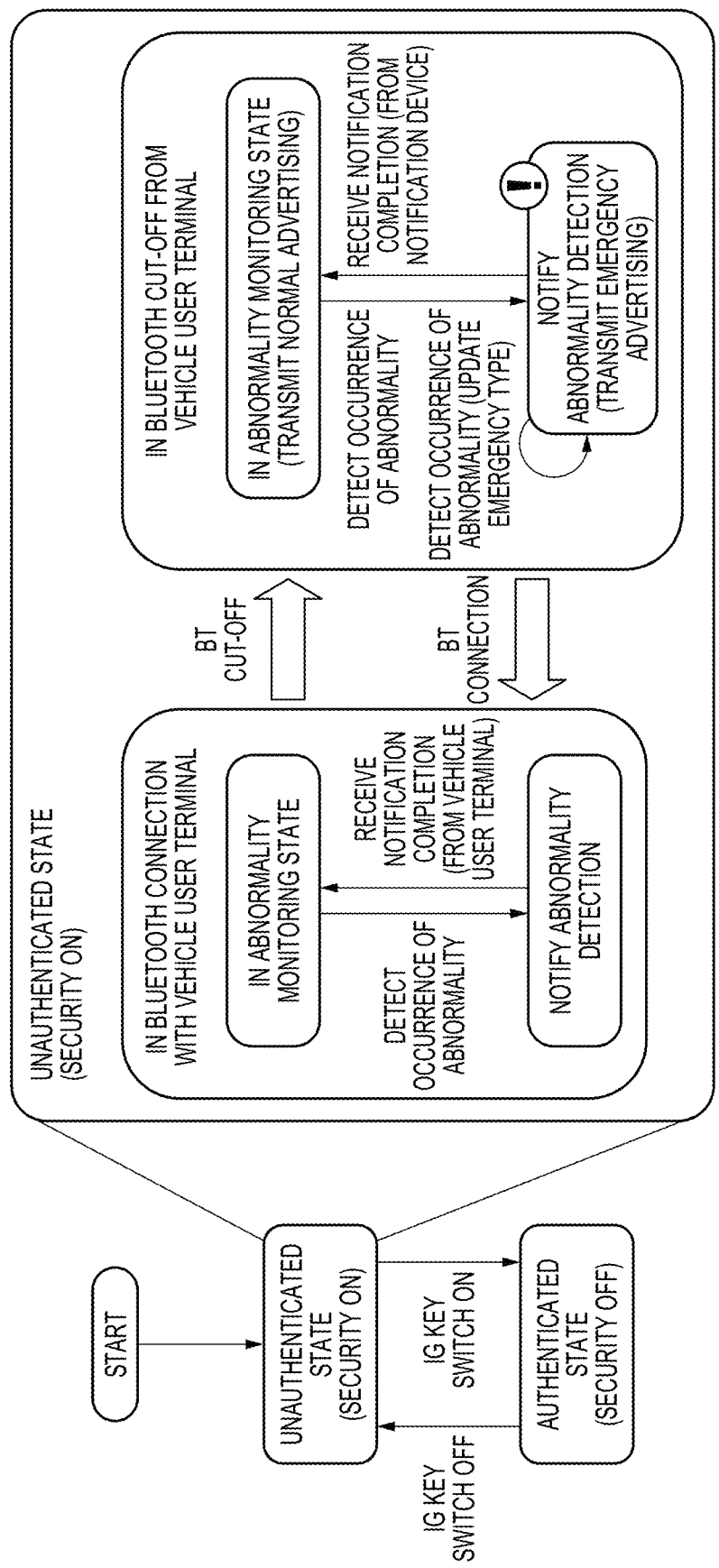
FIG. 12 is a diagram showing an overview of an operation of the vehicle ECU of the wireless communication system according to the first embodiment.

FIG. 12 is a diagram showing an overview of an operation of the vehicle ECU 10. In FIG. 12, the vehicle ECU 10 transitions between an unauthenticated state and an authenticated state according to ON/OFF of the IG KEY switch 502. That is, when the IG KEY switch 502 is turned from ON to OFF, the vehicle ECU 10 transitions to the unauthenticated state (security ON), and when the IG KEY switch 502 is turned from OFF to ON, the vehicle ECU 10 transitions to the authenticated state (security OFF). When the vehicle ECU 10 is in the unauthenticated state (security ON) and cannot connect to the vehicle user terminal 11 via Bluetooth, the vehicle ECU 10 enters into an abnormality monitoring state. That is, when the vehicle user terminal 11 moves out of a Bluetooth communication range of the vehicle ECU 10, the connection between the vehicle ECU 10 and the vehicle user terminal 11 by Bluetooth communication is cut off. The vehicle ECU 10 transmits the normal advertising in the abnormality monitoring state.

If the vehicle ECU 10 detects occurrence of an abnormality in the abnormality monitoring state, the vehicle ECU 10 issues an emergency notification. The emergency advertising is transmitted during abnormality detection. After issuing the emergency notification, if the vehicle ECU 10 detects occurrence of an abnormality again, the vehicle ECU 10 issues an emergency notification and transmits the emergency advertising. In this case, if a content of the abnormality is different from the previous time, the emergency type is updated. For example, if the previous time is "once impact to the vehicle" and the current time is "glove box is opened", the emergency type changes, and thus, the emergency type updates.

Figure 13:
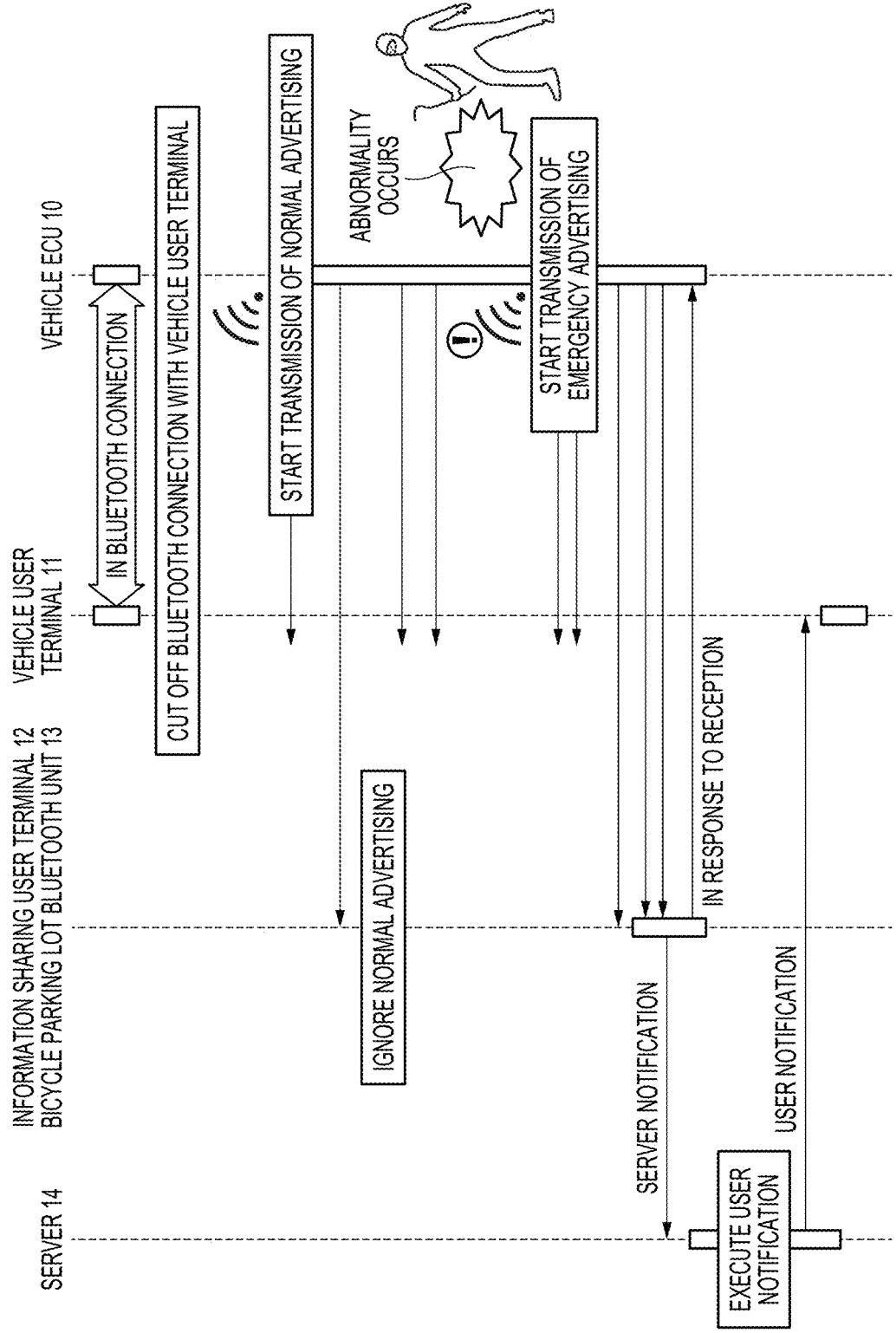
FIG. 13 is a sequence diagram for illustrating operations of the vehicle ECU, the vehicle user terminal, the information sharing user terminal, and the bicycle parking lot Bluetooth unit of the wireless communication system according to the first embodiment in normal times and in an emergency.

FIG. 13 is a sequence diagram for illustrating operations of the vehicle ECU 10, the vehicle user terminal 11, the information sharing user terminal 12, and the bicycle parking lot Bluetooth unit 13 in normal times and in an emergency. In FIG. 13, when the vehicle user terminal 11 is within the Bluetooth communication range of the vehicle ECU 10, the vehicle user terminal 11 and the vehicle ECU 10 are connected via Bluetooth. In this state, when the vehicle user 51 moves away from the vehicle 50 and the vehicle user terminal 11 moves out of the Bluetooth communication range of the vehicle ECU 10, the Bluetooth connection between the vehicle user terminal 11 and the vehicle ECU 10 is cut off.

When the Bluetooth connection with the vehicle user terminal 11 is cut off, the vehicle ECU 10 starts the transmission of the second advertising packet (normal advertising). During the transmission of the second advertising packet, the information sharing user terminal 12 and the bicycle parking lot Bluetooth unit 13, which are notification devices, ignore the information. In this state, if an abnormality occurs in the vehicle 50, the vehicle ECU 10 starts the transmission of the first advertising packet (emergency advertising). When the information sharing user terminal 12 and the bicycle parking lot Bluetooth unit 13 receive the first advertising packet, the information sharing user terminal 12 and the bicycle parking lot Bluetooth unit 13 respond to the reception from the vehicle ECU 10 and further issue a server notification to the server 14. The server 14 that receives the server notification executes a user notification and notifies the vehicle user terminal 11 that an abnormality occurs in the vehicle 50.

Figure 14:
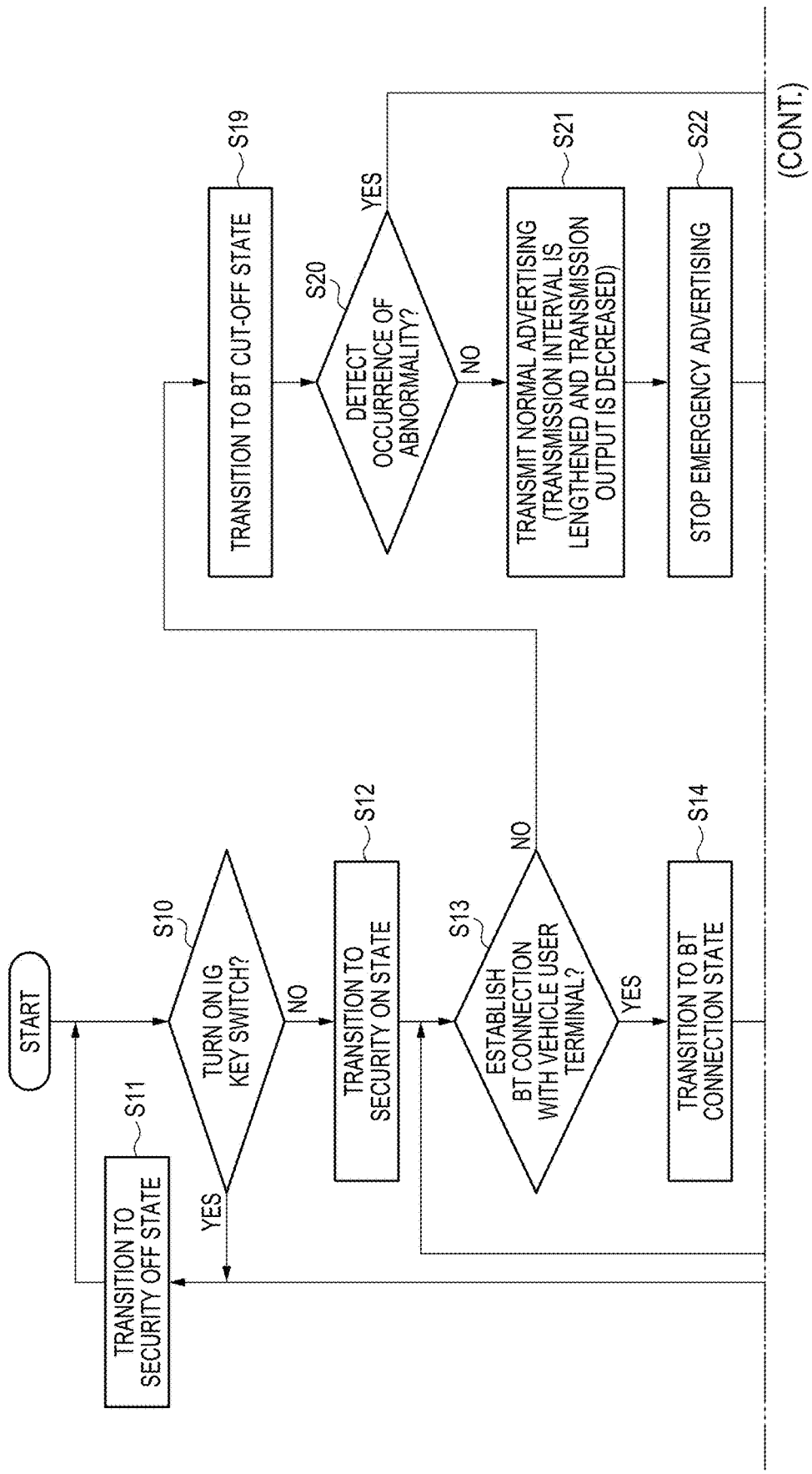
FIG. 14 is a flowchart for illustrating an operation regarding an emergency notification of the vehicle ECU of the wireless communication system according to the first embodiment.

FIG. 14 is a flowchart for illustrating an operation regarding the emergency notification of the vehicle ECU 10 of vehicle 50. The operation of the vehicle 50 is the operation of the vehicle ECU 10, so that the subject is not the vehicle 50 but the vehicle ECU 10. In FIG. 14, the vehicle ECU 10 first determines whether the IG KEY switch 502 is turned on (step S10), if the vehicle ECU 10 determines that the IG KEY switch 502 is turned on (if "YES" in step S10), the vehicle ECU 10 transitions to a security OFF state (step S11). That is, since the user 51 of the vehicle 50 starts using the vehicle 50, the security is released. The security OFF state continues until the IG KEY switch 502 is turned off. If the vehicle ECU 10 determines that the IG KEY switch 502 is not turned on (if "NO" in step S10), the vehicle ECU 10 transitions to a security ON state (step S12). That is, since the user 51 of the vehicle 50 stops using the vehicle 50, the security is started.

After transitioning to the security ON state, the vehicle ECU 10 first determines whether the Bluetooth connection is established with the vehicle user terminal 11 (step S13), if the vehicle ECU 10 determines that the Bluetooth connection is established (if "YES" in step S13), the vehicle ECU 10 transitions to a Bluetooth connection state (step S14). After the vehicle ECU 10 transitions to the Bluetooth connection state with the vehicle user terminal 11, the vehicle ECU 10 determines whether occurrence of an abnormality is detected (step S15). If the vehicle ECU 10 determines that occurrence of an abnormality is not detected (if "NO" in step S15), the vehicle ECU 10 determines whether the IG KEY switch 502 is turned on (step S16). If the vehicle ECU 10 determines that the IG KEY switch 502 is not turned on (if "NO" in step S16), the vehicle ECU 10 returns to the process in step S13, and determines whether the Bluetooth connection is established with the vehicle user terminal 11. On the other hand, if the vehicle ECU 10 determines that the IG KEY switch 502 is turned on (if "YES" in step S16), the vehicle ECU 10 returns to the process in step S11, and transitions to the security OFF state.

If the vehicle ECU 10 determines in step S15 that occurrence of an abnormality is detected (if "YES" in step S15), the vehicle ECU 10 notifies a terminal in connection (for example, the vehicle user terminal 11) of the abnormality detection (step S17). After notifying the terminal in connection of the abnormality detection, the vehicle ECU 10 determines whether notification completion is received (step S18), and if the vehicle ECU 10 determines that the notification completion is not received (if "NO" in step S18), the vehicle ECU 10 returns to the process in step S17 and notifies the abnormality detection. On the other hand, if the vehicle ECU 10 determines that the notification completion is received (if "YES" in step S18), the vehicle ECU 10 returns to the process in step S16, and determines whether the IG KEY switch 502 is turned on.

If the vehicle ECU 10 determines in step S13 that the Bluetooth connection is not established with the vehicle user terminal 11 (if "NO" in step S13), the vehicle ECU 10 transitions to a Bluetooth cut-off state (step S19). After transitioning to the Bluetooth cut-off state with the vehicle user terminal 11, the vehicle ECU 10 determines whether occurrence of an abnormality is detected (step S20).

If the vehicle ECU 10 determines that occurrence of an abnormality is not detected (if "NO" in step S20), the vehicle ECU 10 transmits the normal advertising (second advertising packet) (step S21). In this case, the transmission interval is lengthened and a transmission output is decreased. The vehicle ECU 10 starts the transmission of the normal advertising and then stops the transmission of the emergency advertising (first advertising packet) (step S22). Here, when the determination in step S20 is made for the first time, even if the process in step S22 is performed, it is meaningless because no emergency advertising is transmitted before, but when the determination in step S20 is made for the second time or more, the emergency advertising may be transmitted before, and thus, if the determination in step S20 is "NO", after starting the transmission of the normal advertising, the transmission of emergency advertising is stopped.

After performing the process in step S22, the vehicle ECU 10 returns to step S16 and determines whether the IG KEY switch 502 is turned on. If the vehicle ECU 10 determines in step S20 that occurrence of an abnormality is detected (if "YES" in step S20), the vehicle ECU 10 transmits the emergency advertising (step S23). In this case, the transmission interval is shortened and the transmission output is increased.

After starting the transmission of the emergency advertising, the vehicle ECU 10 determines whether the notification completion is received (step S24). If the vehicle ECU 10 determines that the notification completion is received (if "YES" in step S24), the vehicle ECU 10 returns to the process in step S16, and determines whether the IG KEY switch 502 is turned on. On the other hand, if the vehicle ECU 10 determines that the notification completion is not received (if "NO" in step S24), the vehicle ECU 10 determines whether occurrence of a new abnormality is detected (step S25). If the vehicle ECU 10 determines that occurrence of a new abnormality is not detected (if "NO" in step S25), the vehicle ECU 10 returns to the process in step S23, and transmits the emergency advertising. On the other hand, if the vehicle ECU 10 determines that occurrence of a new abnormality is detected (if "YES" in step S25), the vehicle ECU 10 updates the emergency type (step S26). Then, the vehicle ECU 10 returns to the process in step S23, and transmits an emergency advertising with the updated emergency type.

Figure 15:
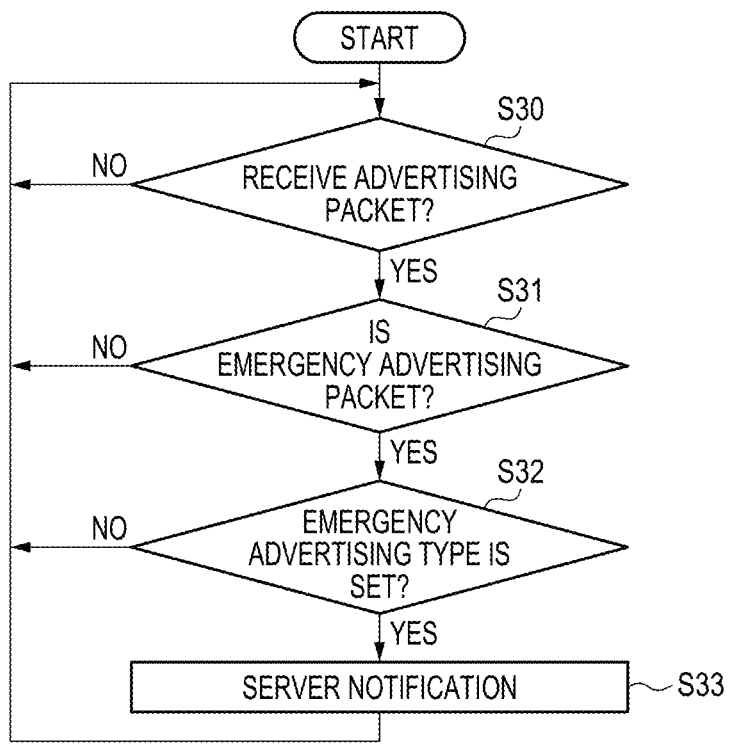
FIG. 15 is a flowchart for illustrating an operation at a time of an emergency notification of the information sharing user terminal of the wireless communication system according to the first embodiment.

FIG. 15 is a flowchart for illustrating an operation at a time of an emergency notification of the information sharing user terminal 12. The operation of the information sharing user terminal 12 is an operation of the control unit 128, but the subject is not the control unit 128 but the information sharing user terminal 12. In FIG. 15, the information sharing user terminal 12 first determines whether the advertising packet is received (step S30), and if the information sharing user terminal 12 determines that the advertising packet is not received (if "NO" in step S30), the information sharing user terminal 12 repeats the determination until the advertising packet is received. If the information sharing user terminal 12 determines that the advertising packet is received (if "YES" in step S30), the information sharing user terminal 12 determines whether the received advertising packet is the first advertising packet (emergency advertising) (step S31). If the information sharing user terminal 12 determines that the received advertising packet is not the first advertising packet (if "NO" in step S31), the information sharing user terminal 12 repeats the determination until the first advertising packet is received.

On the other hand, if the information sharing user terminal 12 determines that the received advertising packet is the first advertising packet (if "YES" in step S31), the information sharing user terminal 12 determines whether an emergency advertising type is set (step S32). If the information sharing user terminal 12 determines that the emergency advertising type is not set (if "NO" in step S32), the information sharing user terminal 12 repeats the determination until the emergency advertising type is set. On the other hand, if the information sharing user terminal 12 determines that the emergency advertising type is set (if "YES" in step S32), the information sharing user terminal 12 notifies the server 14 of the emergency advertising (step S33).

Figure 16:
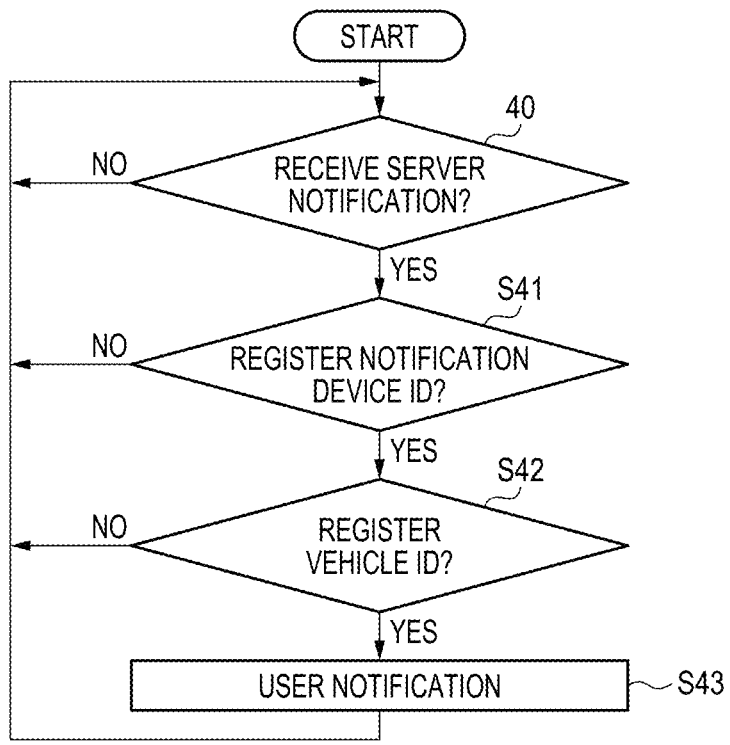
FIG. 16 is a flowchart for illustrating an operation at a time of an emergency notification of the server of the wireless communication system according to the first embodiment.

FIG. 16 is a flowchart for illustrating an operation of the server 14 at the time of the emergency notification. The operation of the server 14 is an operation of the control unit 143, but the subject is not the control unit 143 but the server 14. In FIG. 16, the server 14 first determines whether the server notification is received (step S40), and if the server 14 determines that the server notification is not received (if "NO" in step S40), the server 14 repeats the determination until the server notification is received. If the server 14 determines that the server notification is received (if "YES" in step S40), the server 14 determines whether the notification device ID is registered (step S41).

If the server 14 determines that the notification device ID is not registered (if "NO" in step S41), the server 14 returns to the process in step S40. On the other hand, if the server 14 determines that the notification device ID is registered (if "YES" in step S41), the server 14 determines whether the vehicle ID is registered (step S42). If the server 14 determines that the vehicle ID is not registered (if "NO" in step S42), the server 14 returns to the process in step S40. On the other hand, if the server 14 determines that the vehicle ID is registered (if "YES" in step S42), the server 14 performs the user notification (step S43) and returns to the process in step S40.

Figure 17:
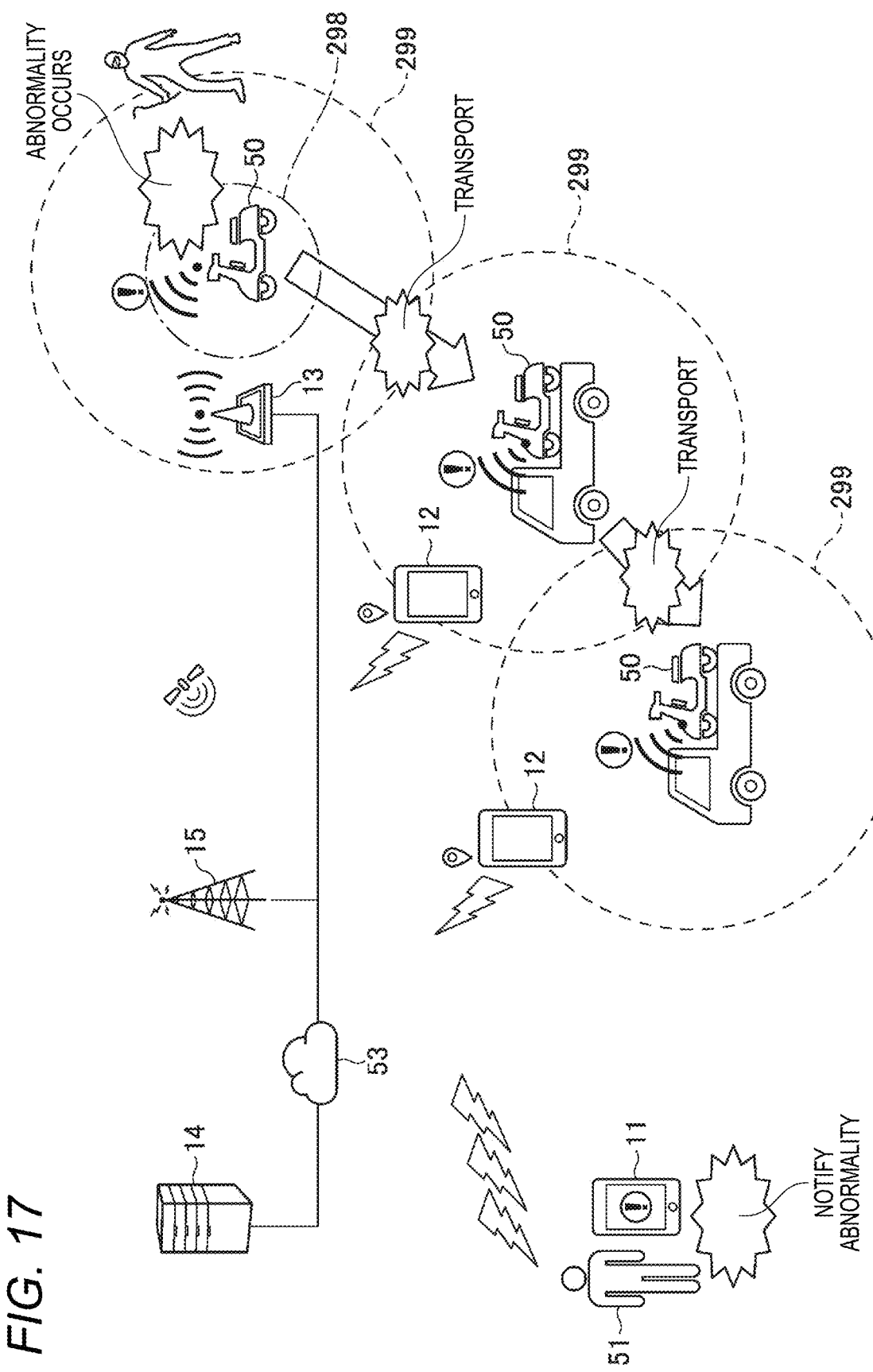
FIG. 17 is a diagram showing how the wireless communication system according to the first embodiment tracks a stolen vehicle.

FIG. 17 is a diagram showing how the vehicle 50 is tracked when the vehicle 50 is stolen. In FIG. 17, a reference numeral 298 indicates a communication range of the normal advertising transmitted from the vehicle ECU 10 of the vehicle 50, and a reference numeral 299 indicates a communication range of the emergency advertising transmitted from the vehicle ECU 10 of the vehicle 50. If an abnormality occurs in the vehicle 50, the emergency advertising (first advertising packet) is transmitted. When a theft occurs, the bicycle parking lot Bluetooth unit 13 is within the communication range 299 of the emergency advertising, and thus, the first advertising packet is received by the bicycle parking lot Bluetooth unit 13 and transmitted to the server 14 via a wired line.

Since an installation location of the bicycle parking lot Bluetooth unit 13 is known, a location where the theft occurs can be obtained. When transportation of the vehicle 50 is started by a truck or the like and the information sharing user terminal 12 is present in the middle of transportation, the first advertising packet is received by the information sharing user terminal 12 and transmitted to the server 14 via the cellular communication or the WiFi communication. Thereafter, in the same manner, each time the first advertising packet is received by the information sharing user terminal 12, the first advertising packet is transmitted to the server 14 via the cellular communication or the WiFi communication. The first advertising packet received by the server 14 is transmitted to the vehicle user terminal 11 via the cellular communication or the WiFi communication.

As described above, in the wireless communication system 1 according to the first embodiment, if the unauthorized use detection unit 105 provided in the vehicle 50 detects that an abnormality occurs in the vehicle 50, the first advertising packet to which emergency information is added is transmitted from the vehicle 50 to the information sharing user terminal 12, and the vehicle user terminal 11 is notified of an abnormality in the vehicle 50 from the information sharing user terminal 12 via the server 14, and thus, the abnormality in the vehicle 50 can be notified to the vehicle user terminal 11 without using a telematics service in the vehicle 50. Since there is no need to have a communication line or a GPS function to use the telematics service, costs can be reduced. That is, it is possible to notify an abnormality including a theft in the vehicle 50 at a low cost and with low power consumption, and is suitable for a two-wheeled vehicle such as a scooter.

In the wireless communication system 1 according to the first embodiment, the advertising packet of Bluetooth is used to transmit the identification information of the vehicle 50, the emergency information, and the like, but other types of packets may be used.

Any communication other than Bluetooth may be used to transmit the identification information of the vehicle 50, emergency information, and the like.

Second Embodiment

Next, a wireless communication system according to a second embodiment will be described.

A wireless communication system 2 according to the second embodiment transmits a first advertising packet to which emergency information is added from a vehicle when an abnormality occurs in the vehicle, and then notifies another vehicle (equipped with a vehicle ECU that can detect an abnormality) in a surrounding area, and notifies a vehicle user terminal of the abnormality and a current location of the vehicle from an information sharing user terminal (smartphone) paired with another vehicle ECU via a server. In a method of directly notifying the information sharing user terminal from the vehicle ECU, if no information sharing user terminal is present near the vehicle ECU, the abnormality cannot be notified, and the notification can be made at a timing when another information sharing user terminal is in close proximity, and thus, the notification is delayed.

The wireless communication system 2 according to the second embodiment can increase a chance of being able to notify an abnormality in the vehicle, and thus, it is possible to prevent the delay in notifying the vehicle user as much as possible. By increasing the number of another vehicle ECUs that are the same as the vehicle ECU and can detect an abnormality, an area where a theft can be detected expands, and even if a vehicle is stolen from a bicycle parking lot or the like where no information sharing user terminal is present nearby, it is possible to detect the theft at an early stage. By using the information sharing user terminal, connection to the server does not require the vehicle ECU to have a function to use a telematics service, and thus, it is possible to notify an abnormality in a vehicle such as a theft at a low cost and with low power consumption, and it is suitable for a two-wheeled vehicle such as a scooter.

Figure 18:
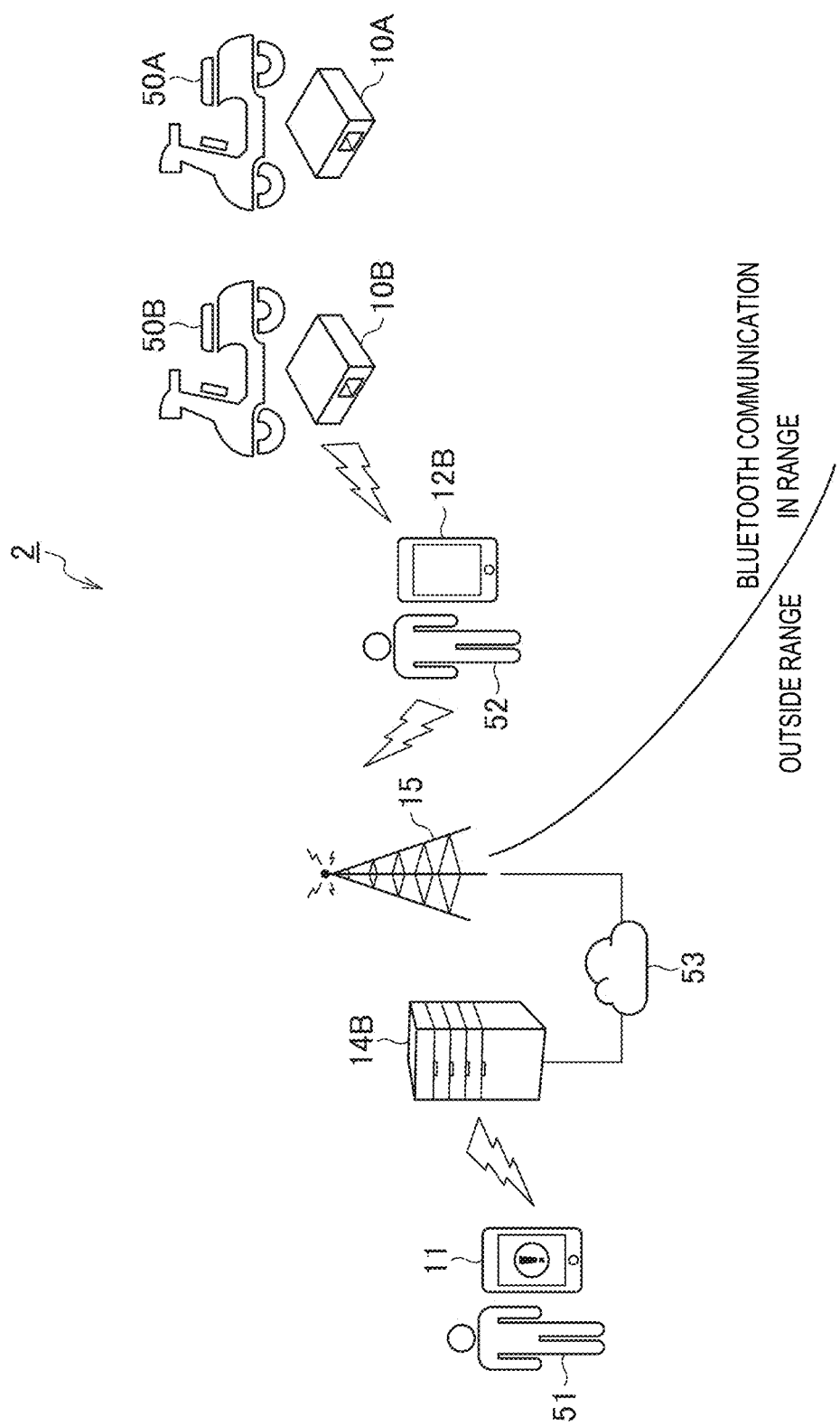
FIG. 18 is a diagram showing an aspect of using a wireless communication system according to a second embodiment.

Hereinafter, the wireless communication system according to the second embodiment will be described below with reference to FIGS. 18 to 28. FIG. 18 is a diagram showing an aspect of using the wireless communication system 2 according to the second embodiment. In FIG. 18, the same reference numerals are given to components that are common to the components of the wireless communication system 1 according to the first embodiment described above. In FIG. 18, the wireless communication system 2 according to the second embodiment includes a first vehicle ECU 10A mounted on a first vehicle 50A, a second vehicle ECU (wireless communication device) 10B mounted on a second vehicle 50B, a vehicle user terminal (wireless communication terminal, smartphone) 11 owned by the user 51 of the first vehicle 50A, an information sharing user terminal (wireless communication terminal, smartphone) 12B owned by the user 52 who shares information with the user 51 of the first vehicle 50A, a server 14B connected by wire to the cloud 53, and the telecom base station (mobile base station) 15 connected by wire to the cloud 53. Identification information is given to the first vehicle ECU 10A and the second vehicle ECU 10B. The identification information can also be regarded as identification information of the first vehicle 50A and identification information of the second vehicle 50B. The identification information is information that is uniquely determined by the first vehicle ECU 10A and the second vehicle ECU 10B, and may be, for example, a MAC address. In FIG. 18, the second vehicle 50B is shown as another vehicle other than the first vehicle 50A, but it is assumed that there is at least one vehicle equipped with the same second vehicle ECU 10B as that of the second vehicle 50B.

The first vehicle ECU 10A, the second vehicle ECU 10B, the vehicle user terminal 11, and the information sharing user terminal 12B each have a Bluetooth (registered trademark) communication function, and Bluetooth communication is available between the first vehicle ECU 10A and the information sharing user terminal 12B, between the first vehicle ECU 10A and the second vehicle ECU 10B, between the second vehicle ECU 10B and the information sharing user terminal 12B, between the first vehicle ECU 10A and the vehicle user terminal 11, and between the second vehicle ECU 10B and the vehicle user terminal 11. The vehicle user terminal 11 and the information sharing user terminal 12B have a cellular communication function or a WiFi (registered trademark) communication function in addition to the Bluetooth communication function. Although the wireless communication system 2 according to the second embodiment is applied to the two-wheeled vehicle (motorcycle) 50A, the wireless communication system 2 can of course also be applied to a four-wheeled vehicle.

Next, respective configurations of the first and second vehicle ECUs 10A and 10B, the vehicle user terminal 11, the information sharing user terminal 12B, and the server 14B of the wireless communication system 2 according to the second embodiment will be described.

Figure 19:
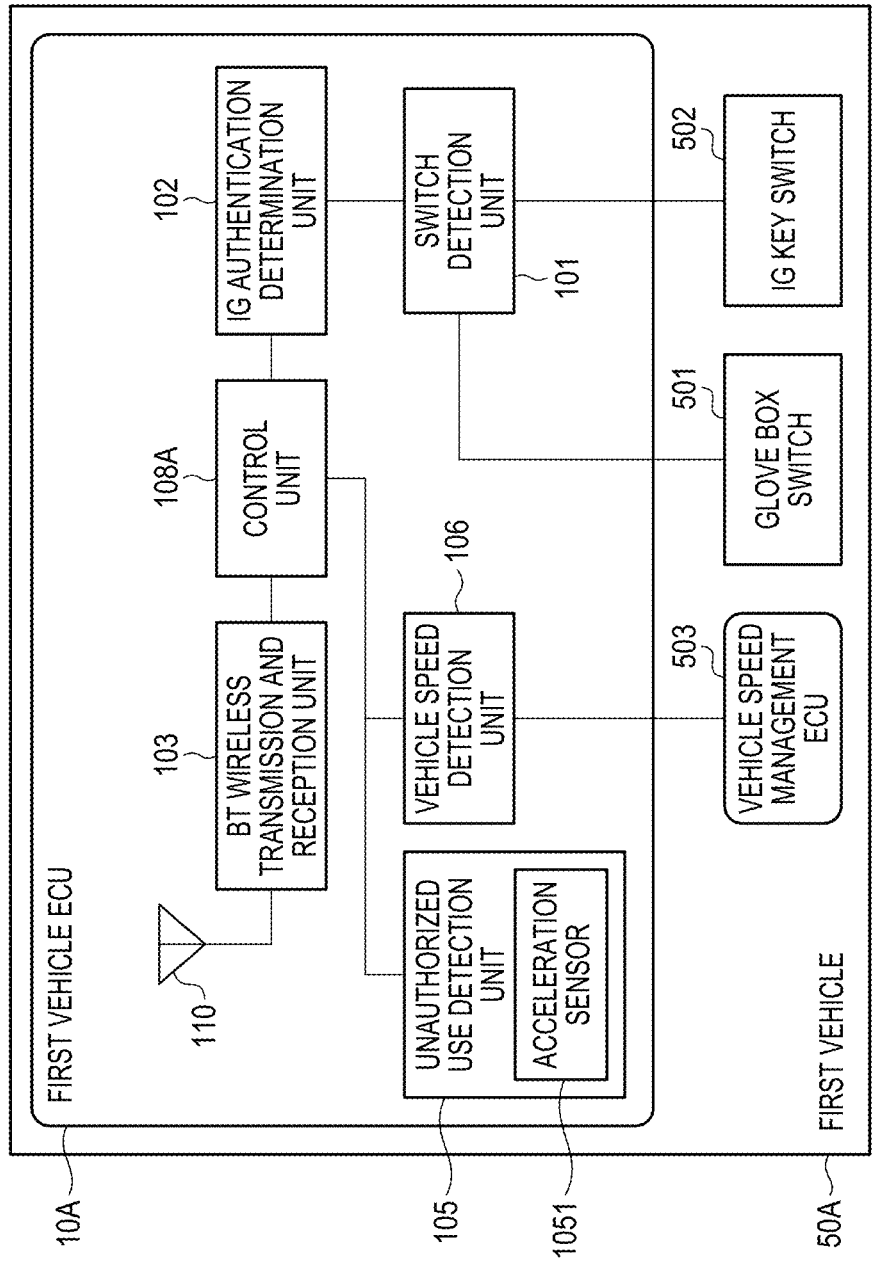
FIG. 19 is a block diagram showing a schematic configuration of a part of a first vehicle and a schematic configuration of a first vehicle ECU of the wireless communication system according to the second embodiment.

FIG. 19 is a block diagram showing a schematic configuration of a part of the first vehicle 50A and a schematic configuration of the first vehicle ECU 10A. In FIG. 19, the same reference numerals are given to components that are common to the components of the vehicle ECU 10 shown in FIG. 2. The first vehicle ECU 10A includes the switch detection unit 101, the IG authentication determination unit 102, the BT wireless transmission and reception unit 103, the unauthorized use detection unit (unauthorized use detection circuit) 105, the vehicle speed detection unit 106, a control unit 108A, and the antenna 110. The BT wireless transmission and reception unit 103 and the antenna 110 correspond to a first antenna.

The control unit 108A controls each unit of the device, and includes a CPU (not shown), a ROM storing a program for operating the CPU, and a RAM used in an operation of the CPU. The IG authentication determination unit 102, the BT wireless transmission and reception unit 103, the unauthorized use detection unit 105, and the vehicle speed detection unit 106 operate under the control of the control unit 108A.

When an abnormality including a theft occurs in the first vehicle 50A, the control unit 108A performs an emergency notification process on the vehicle user terminal 11 of the vehicle user 51. That is, if the unauthorized use detection unit 105 detects unauthorized use (that is, if an abnormality including a theft occurs in the first vehicle 50A), the control unit 108A transmits an advertising packet of Bluetooth including identification information of the vehicle 50A and emergency information from the BT wireless transmission and reception unit 103 via the antenna 110. Various kinds of control related to transmission, such as the number of times of transmission of the advertising packet, a transmission interval, and an electric field strength of a transmitted radio wave, are the same as the control in the vehicle ECU 10 shown in FIG. 2, and are as described with reference to FIGS. 3 and 4.

Figure 20:
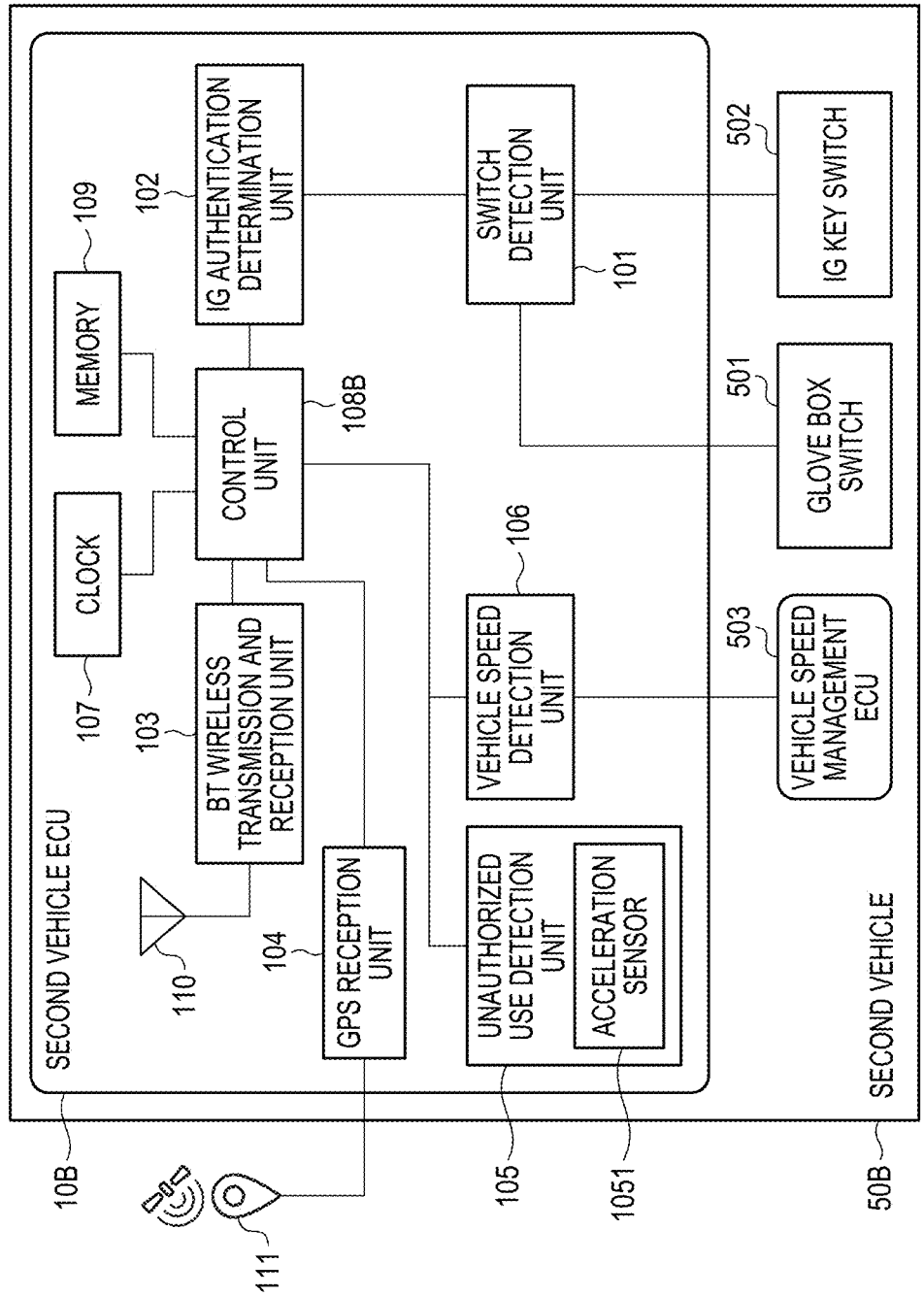
FIG. 20 is a block diagram showing a schematic configuration of a part of a second vehicle and a schematic configuration of a second vehicle ECU of the wireless communication system according to the second embodiment.

FIG. 20 is a block diagram showing a schematic configuration of a part of the second vehicle 50B and a schematic configuration of the second vehicle ECU 10B. In FIG. 19, the same reference numerals are given to components that are common to the components of the vehicle ECU 10 shown in FIG. 2. The second vehicle ECU 10B includes the switch detection unit 101, the IG authentication determination unit 102, the BT wireless transmission and reception unit 103, the GPS reception unit 104, the unauthorized use detection unit 105, the vehicle speed detection unit 106, the clock (second clock) 107, a control unit 108B, a memory (memory circuit) 109, and the antenna 110. The GPS reception unit 104 acquires the second latitude and longitude. The clock 107 acquires the second time. The memory 109 stores at least identification information of the first vehicle 50A.

The control unit 108B controls each unit of the device, and includes a CPU (not shown), a ROM storing a program for operating the CPU, and a RAM used in an operation of the CPU. The IG authentication determination unit 102, the BT wireless transmission and reception unit 103, the GPS reception unit 104, the unauthorized use detection unit 105, the vehicle speed detection unit 106, the clock 107, and the memory 109 operate under the control of the control unit 108B.

If the unauthorized use detection unit 105 detects unauthorized use (that is, if an abnormality including a theft occurs in the second vehicle 50B), the control unit 108B transmits an advertising packet of Bluetooth including identification information of the second vehicle 50B and emergency information from the BT wireless transmission and reception unit 103 via the antenna 110. The advertising packet of Bluetooth including the emergency information is the first advertising packet. The transmission control on the advertising packet performed by the control unit 108B is the same as the transmission control performed by the vehicle ECU 10 shown in FIG. 2, and is as described with reference to FIGS. 3 and 4.

If the BT wireless transmission and reception unit 103 receives an advertising packet of Bluetooth including the identification information of the first vehicle 50A and the emergency information via the antenna 110, the control unit 108B transmits a predetermined packet of Bluetooth including the identification information of the first vehicle 50A, the emergency information, the second time, and the second latitude and longitude via the antenna 110. The predetermined packet only needs to include at least the identification information of the first vehicle 50A and the emergency information. The predetermined packet is a packet that is transmitted without specifying a communication partner. The predetermined packet is defined as a third advertising packet (normal advertising, corresponding to the second advertising packet). The third advertising packet is transmitted twice or more.

FIG. 21 is a block diagram showing a schematic configuration of the information sharing user terminal 12B. In FIG. 21, the same reference numerals are given to components that are common to the components of the information sharing user terminal 12 shown in FIG. 5. The information sharing user terminal 12B includes the GPS reception unit (first location information detection circuit) 121, the BT wireless transmission and reception unit 124, the telecom transmission and reception unit 125, the advertising determination unit 127, the clock (first clock) 123, and the antennas 122, 126, and 129. The GPS reception unit 121 acquires the first latitude and longitude. The clock 123 acquires the first time. The BT wireless transmission and reception unit 124 is capable of wireless communication with the second vehicle 50B conforming to the Bluetooth standard. The antenna 129 can be used for cellular communication. The BT wireless transmission and reception unit 124 and the antenna 126 correspond to the third antenna. The telecom transmission and reception unit 125 and the antenna 129 correspond to a fourth antenna.

A control unit 128B controls each unit of the device, and includes a CPU (not shown), a ROM storing a program for operating the CPU, and a RAM used in an operation of the CPU. The GPS reception unit 121, the clock 123, the BT wireless transmission and reception unit 124, the telecom transmission and reception unit 125, and the advertising determination unit 127 operate under the control of the control unit 128B.

If the BT wireless transmission and reception unit 124 receives the predetermined packet of Bluetooth including the identification information of the first vehicle 50A, the emergency information, the second time, and the second latitude and longitude via the antenna 126, the control unit 128B transmits the identification information of the first vehicle 50A, the emergency information, the second time, and the second latitude and longitude from the telecom transmission and reception unit 125 via the antenna 129. The transmission only needs to include at least the identification information of the first vehicle 50A and the emergency information.

FIG. 22 is a diagram showing server notification information transmitted to the server 14B from the telecom transmission and reception unit 125 of the information sharing user terminal 12B. As shown in FIG. 22, the server notification information generated by the telecom transmission and reception unit 125 is obtained by adding a "reliability of location information" to the server notification information generated by the telecom transmission and reception unit 125 of the wireless communication system 1 according to the first embodiment described above. The reliability of the location information is the number of times and a time of control (engine running) after the data is first acquired. The "engine running" is control for starting the engine. The "time" is a time required from the start of the engine to the notification of the abnormality detection to the terminal in connection.

FIG. 23 is a block diagram showing a schematic configuration of the server 14B. In FIG. 23, the same reference numerals are given to components that are common to the components of the server 14 shown in FIG. 7. The server 14B includes the network communication unit 141, the notification information determination unit 142, and a control unit 143B. FIG. 24 is a diagram showing user notification information transmitted to the vehicle user terminal 11 from the network communication unit 141 of the server 14B. As shown in FIG. 24, the user notification information is obtained by adding the "reliability of location information" to the user notification information of the wireless communication system 1 according to the first embodiment described above. The reliability of the location information is the number of times and a time of control (control for starting the engine, engine running) after the data is first acquired.

FIG. 25 is a sequence diagram for illustrating operations of the first vehicle ECU 10A, the second vehicle ECU 10B, the vehicle user terminal 11, the information sharing user terminal 12B, and the server 14B in normal times and in an emergency. In FIG. 25, when the vehicle user terminal 11 is within a Bluetooth communication range of the first vehicle ECU 10A, the vehicle user terminal 11 and the first vehicle ECU 10A are connected via Bluetooth. In this state, when the vehicle user 51 moves away from the first vehicle 50A and the vehicle user terminal 11 moves out of the Bluetooth communication range of the first vehicle ECU 10A, the Bluetooth connection between the vehicle user terminal 11 and the first vehicle ECU 10A is cut off.

When the Bluetooth connection with the vehicle user terminal 11 is cut off, the first vehicle ECU 10A starts the transmission of the third advertising packet. The second vehicle ECU 10B ignores the information while the third advertising packet is being transmitted. In this state, if an abnormality occurs in the first vehicle 50A, the first vehicle ECU 10A starts the transmission of the first advertising packet (emergency advertising).

If the second vehicle ECU 10B receives the first advertising packet, the second vehicle ECU 10B responds to the reception from the first vehicle ECU 10A, and further establishes the Bluetooth connection with the information sharing user terminal 12B. The information sharing user terminal 12B establishing the Bluetooth connection with the second vehicle ECU 10B issues a server notification to the server 14B. The server 14B that receives the server notification executes a user notification and notifies the vehicle user terminal 11 that an abnormality occurs in the first vehicle 50A.

Next, operations regarding the emergency notification of the first vehicle ECU 10A and the second vehicle ECU 10B will be described. However, the operation regarding the emergency notification of the first vehicle ECU 10A is similar to the operation regarding the emergency notification of the vehicle ECU 10 of the wireless communication system 1 according to the first embodiment described above, and thus, a description is omitted here, and only the operation of the second vehicle ECU 10B is described.

Figure 26:
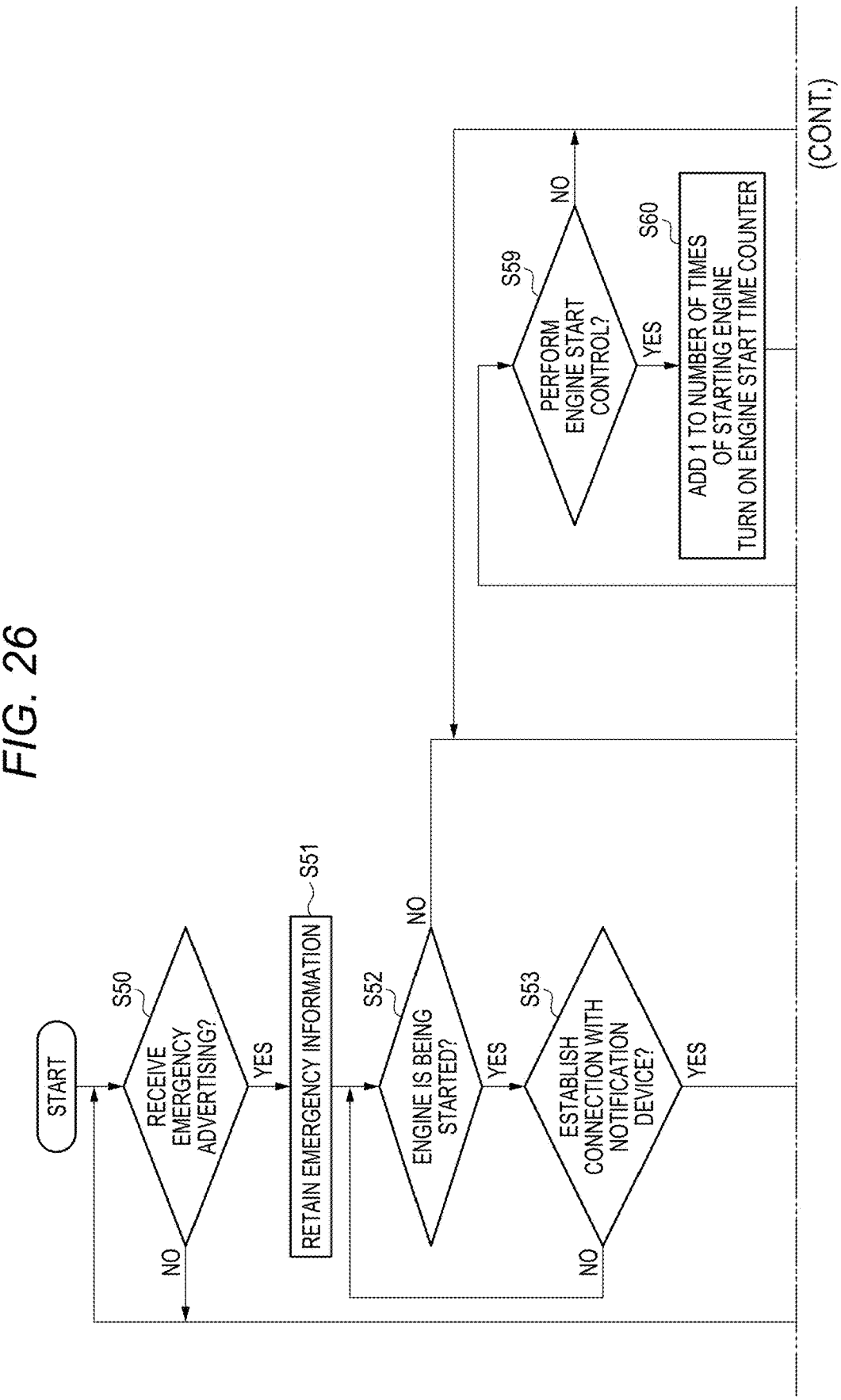
FIG. 26 is a flowchart for illustrating an operation regarding an emergency notification of the second vehicle ECU of the wireless communication system according to the second embodiment.

FIG. 26 is a flowchart for illustrating the operation regarding the emergency notification of the second vehicle ECU 10B. The present process includes a process of adding the reliability of the location information to each of the server notification information shown in FIG. 22 and the user notification information shown in FIG. 24. The control unit 108B is provided with a counter (not shown) for counting the number of times of starting the engine and a counter (not shown) for counting a time after the engine is started. The operation of the second vehicle 50B is an operation of the control unit 108B, but a subject is not the control unit 108B but the second vehicle ECU 10B.

In FIG. 26, the second vehicle ECU 10B first determines whether the emergency advertising is received (step S50), and if the second vehicle ECU 10B determines that the emergency advertising is not received (if "NO" in step S50), the second vehicle ECU 10B repeats the present process until the second vehicle ECU 10B determines that the emergency advertising is received. If the second vehicle ECU 10B determines that the emergency advertising is received (if "YES" in step S50), the second vehicle ECU 10B retains the emergency information (step S51).

After retaining the emergency information, the second vehicle ECU 10B determines whether an engine of the vehicle 50B is being started (step S52). If the second vehicle ECU 10B determines that the engine of the vehicle 50B is being started (if "YES" in step S52), the second vehicle ECU 10B determines whether the Bluetooth connection is established with the notification device, that is, the information sharing user terminal 12B (step S53). If the second vehicle ECU 10B determines that the Bluetooth connection is not established with the information sharing user terminal 12B (if "NO" in step S53), the second vehicle ECU 10B returns to step S52, and if the second vehicle ECU 10B determines that the Bluetooth connection is established with the information sharing user terminal 12B (if "YES" in step S53), the second vehicle ECU 10B notifies the terminal in Bluetooth connection, that is, the information sharing user terminal 12B of the abnormality detection (step S54). In this case, the number of times of starting the engine is "0" and the time after the engine is started is "0". That is, since the engine is being started, the number of times of starting the engine is "0". After notifying the information sharing user terminal 12B of the abnormality detection, the second vehicle ECU 10B returns to the process in step S50.

If the second vehicle ECU 10B determines in step S52 that the engine is not started (if "NO" in step S52), the second vehicle ECU 10B determines whether the Bluetooth connection is established with the notification device, that is, the information sharing user terminal 12B (step S55). If the second vehicle ECU 10B determines that the Bluetooth connection is established with the information sharing user terminal 12B (if "YES" in step S55), the second vehicle ECU 10B determines whether the engine start control on the vehicle 50B is performed (step S56), and if the second vehicle ECU 10B determines that the engine start control is not performed (if "NO" in step S56), the second vehicle ECU 10B repeats the present process until the engine start control is performed.

If the second vehicle ECU 10B determines that the engine start control is performed (if "YES" in step S56), the second vehicle ECU 10B adds "1" to the number of times of starting the engine (step S57). That is, when the engine is started while the engine is in a stop state, the number of times of starting the engine becomes a value in which "1" is added. Next, the second vehicle ECU 10B notifies the terminal in Bluetooth connection, that is, the information sharing user terminal 12B of the abnormality detection (step S58). In this case, the number of times of starting the engine is "n" and the time after the engine is started is "0". After notifying the information sharing user terminal 12B of the abnormality detection, the second vehicle ECU 10B returns to the process in step S50.

If the second vehicle ECU 10B determines in step S55 described above that the Bluetooth connection is not established with the notification device, that is, the information sharing user terminal 12B (if "NO" in step S55), the second vehicle ECU 10B determines whether the engine start control is performed (step S59), and if the second vehicle ECU 10B determines that the engine start control is not performed (if "NO" in step S59), the second vehicle ECU 10B returns to step S55. If the second vehicle ECU 10B determines in step S59 that the engine start control is performed (if "YES" in step S59), "1" is added to the number of times of starting the engine, and an engine start time counter is turned "ON" (step S60).

After turning the engine start time counter "ON" in step S60, the second vehicle ECU 10B determines whether the Bluetooth connection is established with the notification device, that is, the information sharing user terminal 12B (step S61), and if the second vehicle ECU 10B determines that the Bluetooth connection is established with the information sharing user terminal 12B (if "YES" in step S61), the second vehicle ECU 10B notifies the terminal in Bluetooth connection, that is, the information sharing user terminal 12B of the abnormality detection (step S64). In this case, the number of times of starting the engine is "n" and the time after the engine is started is "n". After notifying the information sharing user terminal 12B of the abnormality detection, the second vehicle ECU 10B returns to the process in step S50.

If the second vehicle ECU 10B determines in step S61 described above that the Bluetooth connection is not established with the notification device, that is, the information sharing user terminal 12B (if "NO" in step S61), the second vehicle ECU 10B determines whether the engine is turned off (step S62). If the second vehicle ECU 10B determines that the engine is not turned off (if "NO" in step S62), the second vehicle ECU 10B returns to step S61, and if the second vehicle ECU 10B determines that the engine is turned off (if "YES" in step S62), the second vehicle ECU 10B clears the engine start time counter (step S63), and returns to step S55.

Next, the operation of the information sharing user terminal 12B will be described. The operation of the server 14B is the same as the operation of the server 14 of the wireless communication system 1 according to the first embodiment described above, and thus, descriptions thereof will be omitted.

Figure 27:
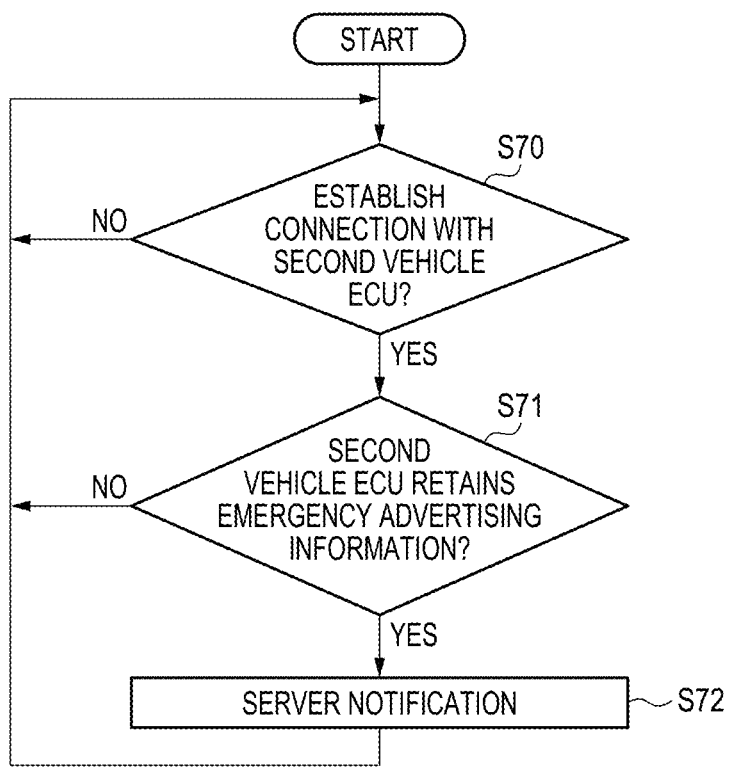
FIG. 27 is a flowchart for illustrating the operation of the information sharing user terminal of the wireless communication system according to the second embodiment.

FIG. 27 is a flowchart for illustrating the operation of the information sharing user terminal 12B. The operation of the information sharing user terminal 12B is an operation of the control unit 128B, but the subject is not the control unit 128B but the information sharing user terminal 12B. In FIG. 27, the information sharing user terminal 12B first determines whether the Bluetooth connection is established with the second vehicle ECU 10B (step S70), and if the information sharing user terminal 12B determines that the Bluetooth connection is not established with the second vehicle ECU 10B (if "NO" in step S70), the information sharing user terminal 12B repeats the present process until the Bluetooth connection is established with the second vehicle ECU 10B.

If the information sharing user terminal 12B determines that the Bluetooth connection is established with the second vehicle ECU 10B (if "YES" in step S70), the information sharing user terminal 12B determines whether the second vehicle ECU 10B retains the emergency advertising information (step S71). If the information sharing user terminal 12B determines that the second vehicle ECU 10B does not retain the emergency advertising information (if "NO" in step S71), the information sharing user terminal 12B returns to step S70, and if the information sharing user terminal 12B determines that the second vehicle ECU 10B retains the emergency advertising information (if "YES" in step S71), the information sharing user terminal 12B notifies the server 14B of the emergency advertising information (step S72). After notifying the server 14B of the emergency advertising information, the process returns to step S70.

Figure 28:
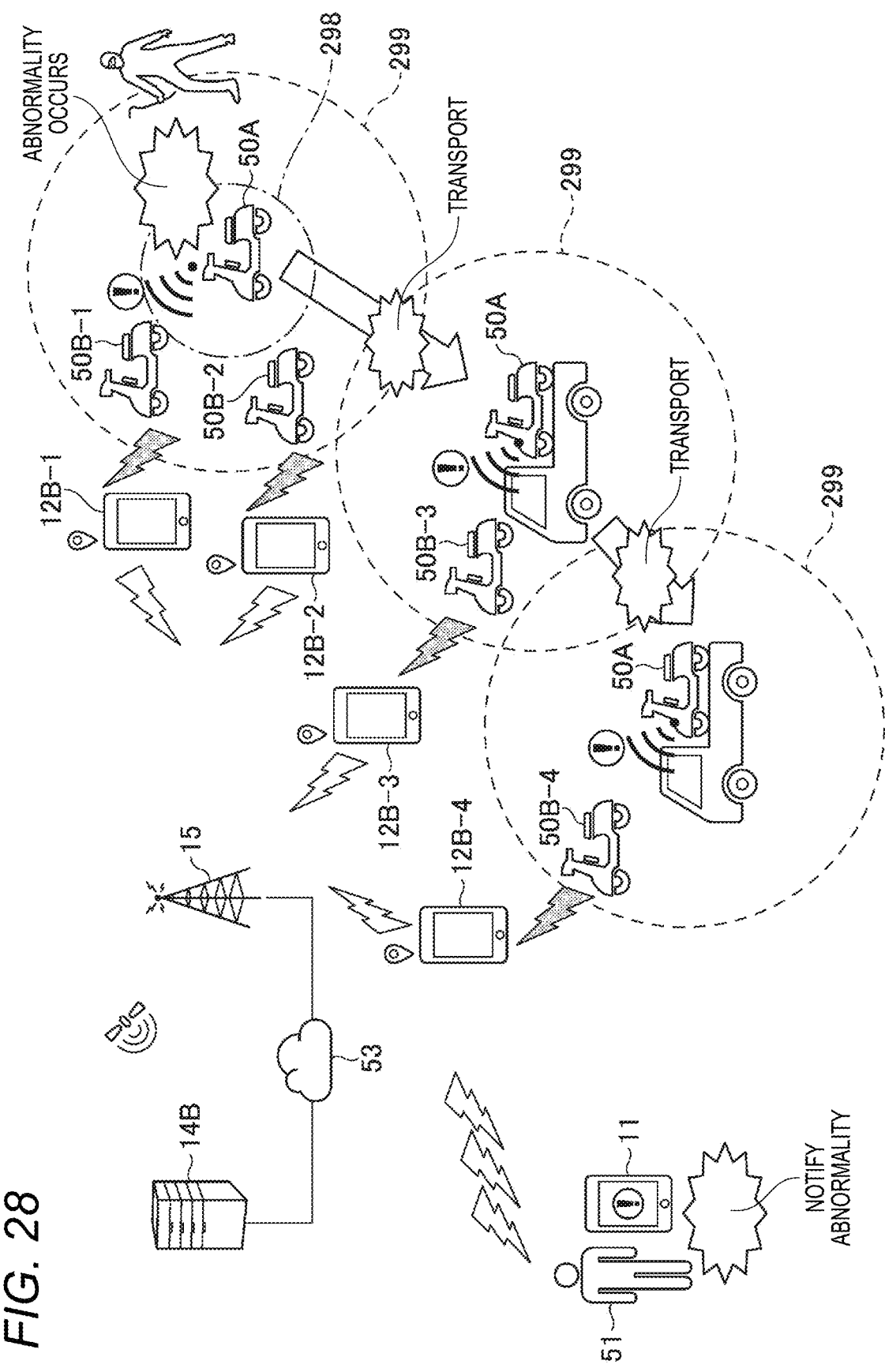
FIG. 28 is a diagram showing how the first vehicle of the wireless communication system according to the second embodiment is tracked when the first vehicle is stolen.

FIG. 28 is a diagram showing how the first vehicle 50A is tracked when the first vehicle 50A is stolen. In FIG. 28, the reference numeral 298 indicates a communication range of the normal advertising transmitted from the first vehicle ECU 10A of the first vehicle 50A, and the reference numeral 299 indicates a communication range of the emergency advertising transmitted from the first vehicle ECU 10A of the first vehicle 50A. If an abnormality occurs in the first vehicle 50A, the emergency advertising (first advertising packet) is transmitted from the vehicle ECU 10A. If another vehicles such as a second vehicle 50B-1 and a third vehicle 50B-2 are present within the communication range of the emergency advertising when a theft occurs, the emergency advertising is received by these vehicles 50B-1 and 50B-2 and transmitted by Bluetooth. If the emergency advertising transmitted from the second vehicle 50B-1 and the third vehicle 50B-2 is received by information sharing user terminals 12B-1 and 12B-2, identification information of the first vehicle 50A, emergency information, and the like included in the emergency advertising are transmitted from these terminals 12B-1 and 12B-2 via the cellular communication. Since a current location of each of the second vehicle 50B-1 and the third vehicle 50B-2 is obtained, the location where the theft occurs can be acquired.

If the transportation of the first vehicle 50A is started by a truck or the like, and a new vehicle (referred to as a fourth vehicle 50B-3) is present in the middle of the transportation, the emergency advertising is received by the fourth vehicle 50B-3 and transmitted by Bluetooth. If the emergency advertising transmitted from the fourth vehicle 50B-3 is received by a new information sharing user terminal (referred to as an information sharing user terminal 12B-3), identification information of the first vehicle 50A, emergency information, and the like included in the emergency advertising are transmitted from the new information sharing user terminal via the cellular communication. Since the current location is acquired by the fourth vehicle 50B-3, the location in the middle of transportation can be acquired.

Thereafter, in the same way, if a new vehicle (referred to as a fifth vehicle 50B-4) is present in the middle of the transportation of the first vehicle 50A, the fifth vehicle 50B-4 receives the emergency advertising, and then transmits the emergency advertising via Bluetooth. If the emergency advertising transmitted from the fifth vehicle 50B-4 is received by a new information sharing user terminal (referred to as an information sharing user terminal 12B-4), identification information of the first vehicle 50A, emergency information, and the like included in the emergency advertising are transmitted from the new information sharing user terminal via the cellular communication. Since the current location is acquired by the fifth vehicle 50B-4, the location in the middle of transportation can be acquired.

The identification information of the first vehicle 50A, the emergency information, and the like transmitted by the cellular communication from the information sharing user terminal 12B-1 to the information sharing user terminal 12B-4 are transmitted to the server 14B via a wired line, and are transmitted from the server 14B to the vehicle user terminal 11 of the vehicle 50A.

As described above, in the wireless communication system 2 according to the second embodiment, if the unauthorized use detection unit 105 provided in the first vehicle 50A detects that an abnormality occurs in the first vehicle 50A, the first advertising packet to which the emergency information is added is transmitted from the first vehicle 50A to notify the second vehicle 50B presenting nearby, and the information sharing user terminal 12B paired with the second vehicle 50B notifies the vehicle user terminal 11 of the abnormality in the first vehicle 50A via the server 14B, and thus, the vehicle user terminal 11 can be notified of the abnormality in the first vehicle 50A without using the telematics service. Since there is no need to have a communication line or a GPS function to use the telematics service, an increase in the cost can be kept to a minimum. A chance of being able to notify an abnormality in the first vehicle 50A is increased, and thus, it is possible to prevent the delay in notifying the vehicle user as much as possible. By increasing the number of another vehicles, other than the second vehicle 50B, which are the same as the first vehicle ECU 50A and can detect an abnormality, an area where a theft can be detected expands, and even if a vehicle is stolen from a bicycle parking lot or the like where the information sharing user terminal 12B is not present nearby, it is possible to detect the theft at an early stage. That is, it is possible to notify an abnormality including a theft in the first vehicle 50A with low cost and low power consumption, and is suitable for a two-wheeled vehicle such as a scooter.

Third Embodiment

Next, a wireless communication system according to a third embodiment will be described.

A wireless communication system 3 according to the third embodiment is configured such that an advertising packet of Bluetooth (registered trademark) to which emergency information (predetermined information) is added is transmitted from a stolen vehicle (stolen vehicle), at least the emergency information and a distance to the stolen vehicle is transmitted to the server if an information sharing user terminal (smartphone) receives the advertising packet, and when the information sharing user terminal is not present in an area where the advertising packet transmitted from the stolen vehicle can be received, and another vehicle (relay vehicle) that can receive the advertising packet is present, the another vehicle transmits at least the emergency information, a distance (first distance) to the information sharing user terminal paired with the another vehicle, and the distance (second distance) to the stolen vehicle to the server via the information sharing user terminal. In the measurement of the distance, the Bluetooth communication and/or ultra wide band (UWB) ranging technology is used.

Figure 29:
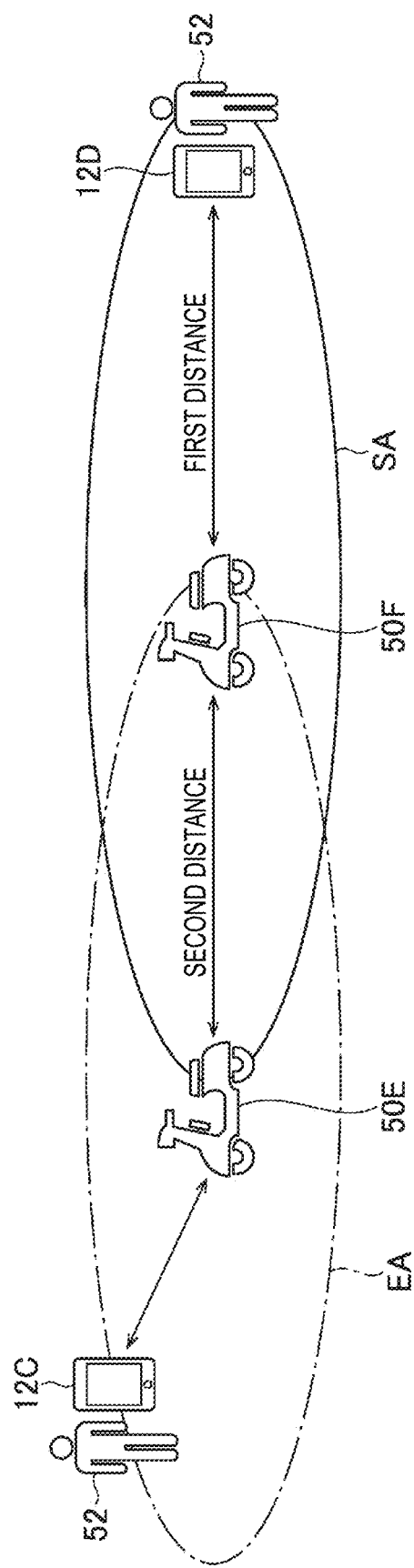
FIG. 29 is a diagram showing an overview of operations of a stolen vehicle, a relay vehicle, and information sharing user terminal in a wireless communication system according to a third embodiment.

FIG. 29 is a diagram showing an overview of operations of a second vehicle (stolen vehicle) 50E, a first vehicle (relay vehicle) 50F, and an information sharing user terminal 12C or 12D in the wireless communication system 3 according to the third embodiment. In FIG. 29, when an abnormality occurs in the second vehicle 50E, the advertising packet of Bluetooth to which the emergency information is added is transmitted. This advertising packet reaches an emergency advertising area EA, and if the information sharing user terminal 12C is present within the emergency advertising area EA, the information sharing user terminal 12C receives the advertising packet. By receiving the advertising packet, the information sharing user terminal 12C acquires a distance to the second vehicle 50E, and transmits at least the acquired distance and the emergency information from the second vehicle 50E to the server.

On the other hand, if the information sharing user terminal 12C is not present in the emergency advertising area EA and the first vehicle 50F is present therein, the first vehicle 50F receives the advertising packet from the second vehicle 50E. By receiving the advertising packet, the first vehicle 50F acquires a distance to the information sharing user terminal 12D that is paired with the first vehicle 50F and is present in a smartphone connection area SA, and the distance to the second vehicle 50E, and transmits at least the acquired the first and second distances and the emergency information from the second vehicle 50E to the server via the information sharing user terminal 12D.

As described above, when using a communication method with a long communication distance such as Bluetooth LE communication, if only the location information is used, an area where the stolen vehicle is assumed to be present becomes wider, and it is assumed to be difficult to actually find the stolen vehicle. The wireless communication system 3 according to the third embodiment acquires the distance between the stolen vehicle and the information sharing user terminal, the distance between the information sharing user terminal and the relay vehicle, and the distance between the stolen vehicle and the relay vehicle, and thus, a range of the area where the stolen vehicle is assumed to be present can be estimated, and the stolen vehicle can be easily found.

Figure 30:
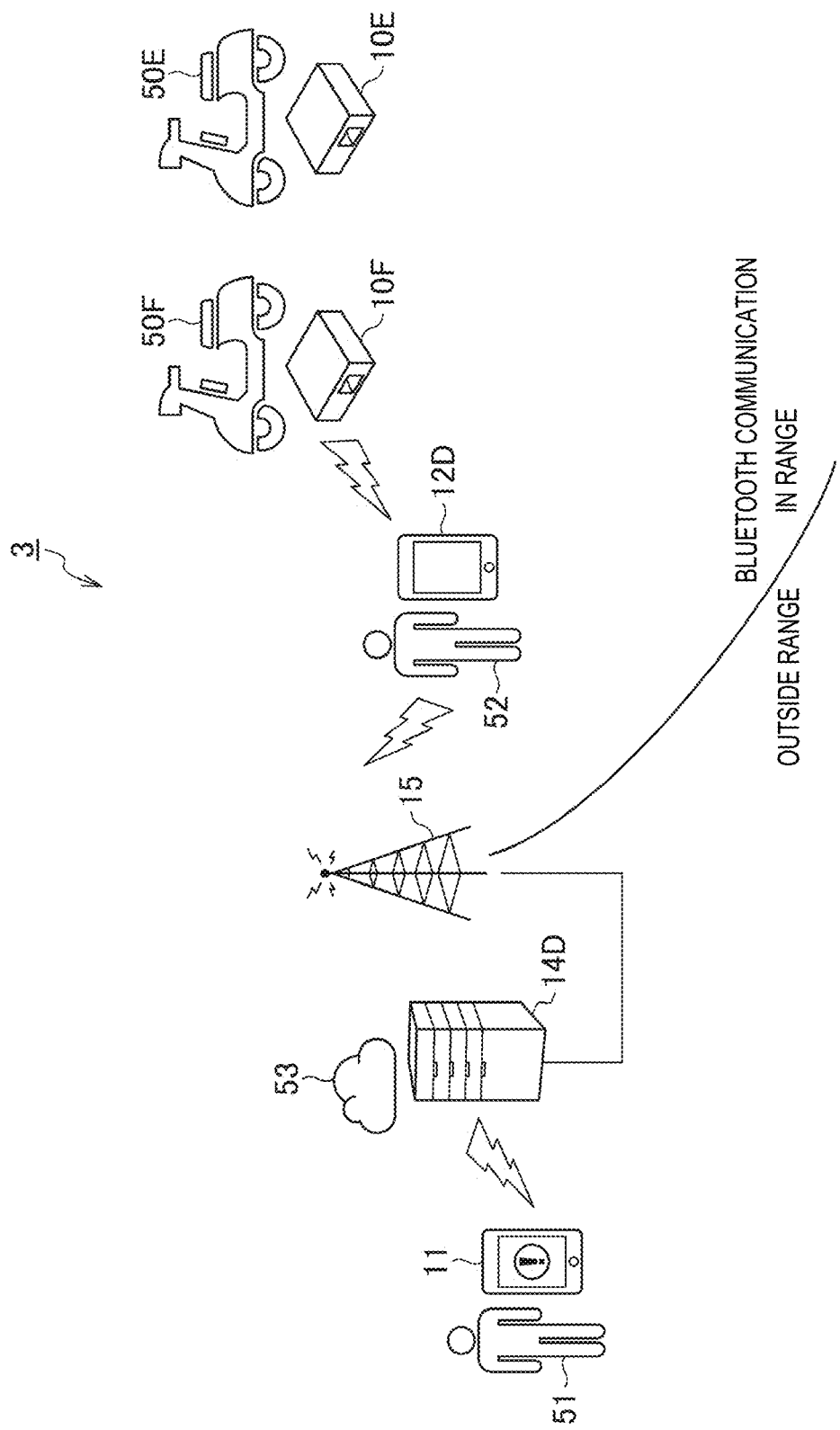
FIG. 30 is a diagram showing an aspect of using the wireless communication system according to the third embodiment.

Hereinafter, the wireless communication system according to the third embodiment will be described below with reference to FIGS. 30 to 42. FIG. 30 is a diagram showing an aspect of using the wireless communication system 3 according to the third embodiment. In FIG. 18, the same reference numerals are given to components that are common to the components of the wireless communication system 1 according to the first embodiment described above. In FIG. 30, the wireless communication system 3 according to the third embodiment includes a second vehicle ECU 10E mounted on the second vehicle 50E, a first vehicle ECU 10F mounted on the first vehicle 50F, the vehicle user terminal (wireless communication terminal, smartphone) 11 owned by the user 51 of the second vehicle 50E, the information sharing user terminal (wireless communication terminal, smartphone) 12D owned by the user 52 who shares information with the user 51 of the second vehicle 50E, a server 14D connected by wire to the cloud 53, and the telecom base station (mobile base station) 15 connected by wire to the cloud 53.

Identification information is provided to the second vehicle ECU 10E and the first vehicle ECU 10F. The identification information can also be regarded as identification information of the second vehicle 50E and identification information of the first vehicle 50F. The identification information is information that is uniquely determined by the second vehicle ECU 10E and the first vehicle ECU 10F, and may be, for example, a MAC address. In FIG. 30, the first vehicle 50F is shown as another vehicle other than the second vehicle 50E, and it is assumed that there is at least one vehicle equipped with the first vehicle ECU 10F same as that of the first vehicle 50F.

The second vehicle ECU 10E, the first vehicle ECU 10F, the vehicle user terminal 11, and the information sharing user terminal 12D each have a Bluetooth communication function, and Bluetooth communication is available between the second vehicle ECU 10E and the information sharing user terminal 12D, between the second vehicle ECU 10E and the first vehicle ECU 10F, between the first vehicle ECU 10F and the information sharing user terminal 12D, between the second vehicle ECU 10E and the vehicle user terminal 11, and between the first vehicle ECU 10F and the vehicle user terminal 11. The vehicle user terminal 11 and the information sharing user terminal 12C have a cellular communication function or a WiFi (registered trademark) communication function in addition to the Bluetooth communication function. Although the wireless communication system 3 according to the third embodiment is applied to the two-wheeled vehicle (motorcycle) 50E, the wireless communication system 3 can of course also be applied to a four-wheeled vehicle.

Next, respective configurations of the first and second vehicle ECUs 10F and 10E, the vehicle user terminal 11, the information sharing user terminal 12D, and the server 14D of the wireless communication system 3 according to the third embodiment will be described.

Figure 31:
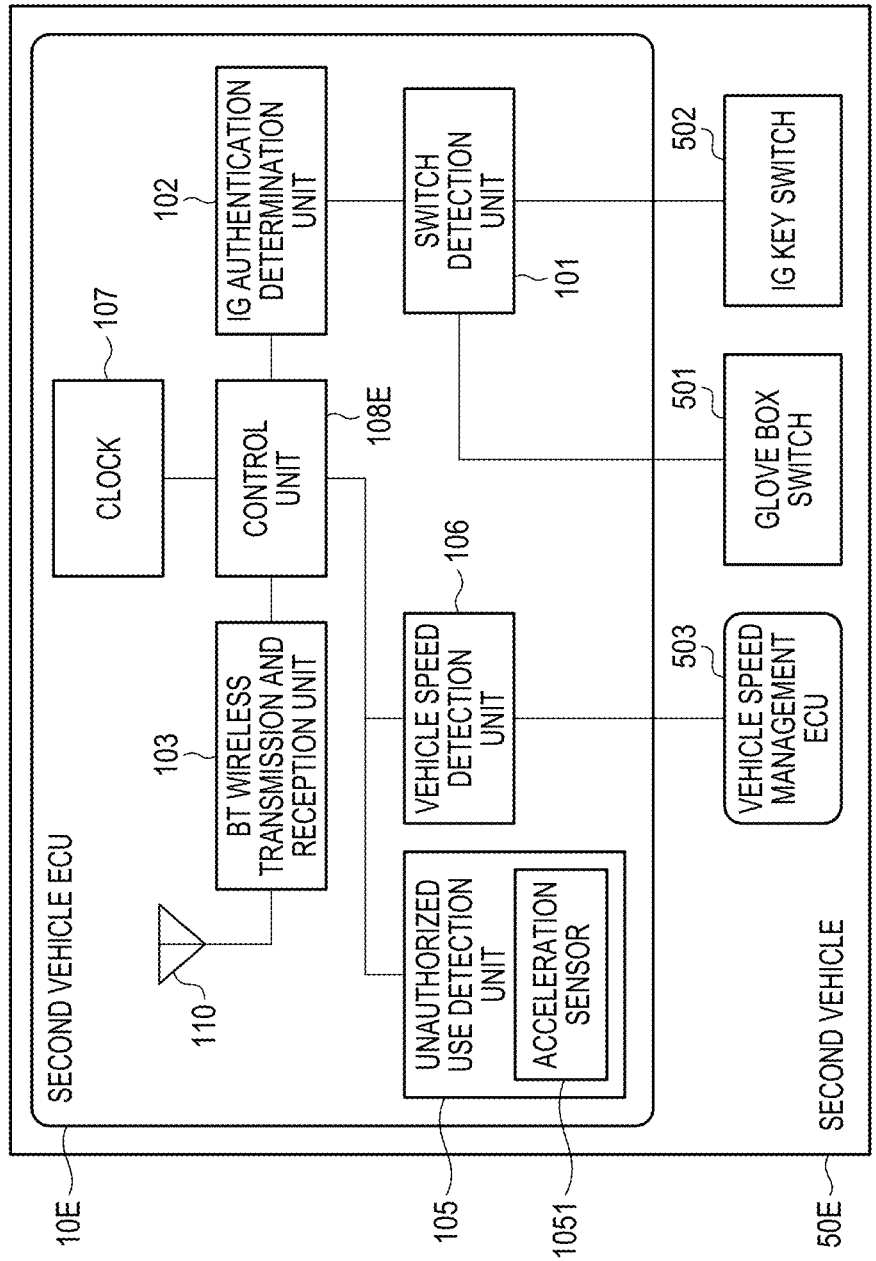
FIG. 31 is a block diagram showing a schematic configuration of a part of a second vehicle and a schematic configuration of a second vehicle ECU in the wireless communication system according to the third embodiment.

FIG. 31 is a block diagram showing a schematic configuration of a part of the second vehicle 50E and a schematic configuration of the second vehicle ECU 10E. In FIG. 31, the same reference numerals are given to components that are common to the components of the first vehicle ECU 10A shown in FIG. 19. The second vehicle ECU 10E includes the switch detection unit 101, the IG authentication determination unit 102, the BT wireless transmission and reception unit (second wireless communication circuit) 103, the unauthorized use detection unit (unauthorized use detection circuit) 105, the vehicle speed detection unit 106, the clock (clock circuit) 107, a control unit 108E, and the antenna 110. The unauthorized use detection unit 105 includes an acceleration sensor 1051. The clock 107 acquires a time.

The control unit 108E controls each unit of the device, and includes a CPU (not shown), a ROM storing a program for operating the CPU, and a RAM used in an operation of the CPU. The IG authentication determination unit 102, the BT wireless transmission and reception unit 103, the unauthorized use detection unit 105, the vehicle speed detection unit 106, and the clock 107 operate under the control of the control unit 108E.

When an abnormality including a theft occurs in the second vehicle 50E, the control unit 108E performs an emergency notification process on the vehicle user terminal 11 of the vehicle user 51. That is, if the unauthorized use detection unit 105 detects unauthorized use (that is, if an abnormality including a theft occurs in the second vehicle 50E), the control unit 108E transmits an advertising packet of Bluetooth including identification information of the second vehicle 50E and emergency information (second information) from the BT wireless transmission and reception unit 103 via the antenna 110. Various kinds of control related to transmission, such as the number of times of transmission of the advertising packet, a transmission interval, and an electric field strength of a transmitted radio wave, are the same as the control in the vehicle ECU 10 shown in FIG. 2, and are as described with reference to FIGS. 3 and 4.

Figure 32:
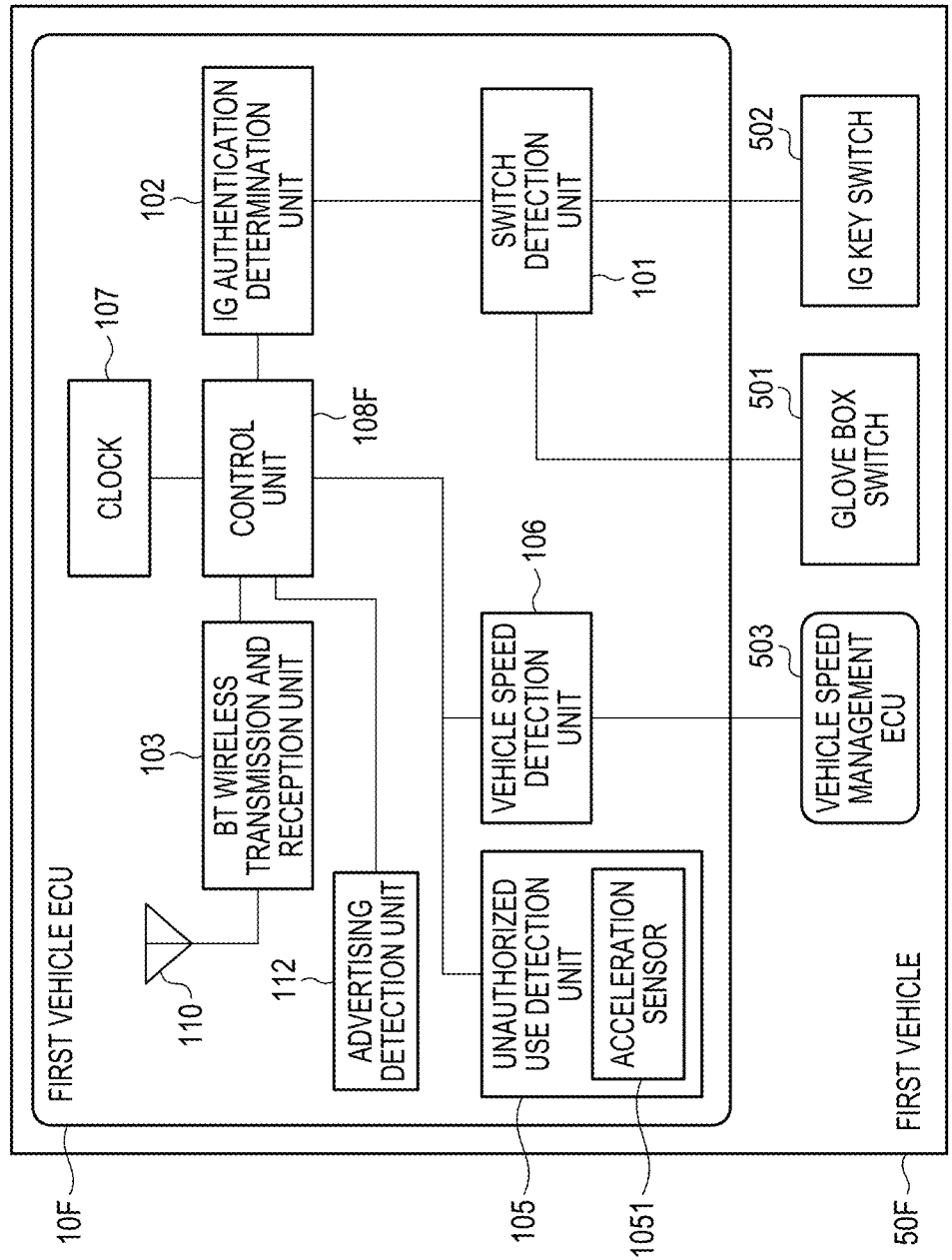
FIG. 32 is a block diagram showing a schematic configuration of a part of a first vehicle and a schematic configuration of a first vehicle ECU in the wireless communication system according to the third embodiment.

FIG. 32 is a block diagram showing a schematic configuration of a part of the first vehicle 50F and a schematic configuration of the first vehicle ECU 10F. In FIG. 32, the same reference numerals are given to components that are common to the components of the second vehicle ECU 10B shown in FIG. 20. The first vehicle ECU 10F includes the switch detection unit 101, the IG authentication determination unit 102, the BT wireless transmission and reception unit (first wireless communication circuit) 103, the unauthorized use detection unit 105, the vehicle speed detection unit 106, the clock (clock circuit) 107, a control unit 108F, the antenna 110, and an advertising detection unit 112. The clock 107 acquires a time. The advertising detection unit 112 detects an advertising packet from a received signal of the BT wireless transmission and reception unit 103.

The control unit 108F controls each unit of the device, and includes a CPU (not shown), a ROM storing a program for operating the CPU, and a RAM used in an operation of the CPU. The IG authentication determination unit 102, the BT wireless transmission and reception unit 103, the unauthorized use detection unit 105, the vehicle speed detection unit 106, the clock 107, and the advertising detection unit 112 operate under the control of the control unit 108F.

If the unauthorized use detection unit 105 detects unauthorized use (that is, if an abnormality including a theft occurs in the first vehicle 50F), the control unit 108F transmits an advertising packet of Bluetooth including identification information of the first vehicle 50F and emergency information (predetermined information, first information) from the BT wireless transmission and reception unit 103 via the antenna 110. The transmission control on the advertising packet performed by the control unit 108F is the same as the transmission control performed by the vehicle ECU 10 shown in FIG. 2, and is as described with reference to FIGS. 3 and 4.

That is, if the BT wireless transmission and reception unit 103 receives the advertising packet of Bluetooth including the identification information of the second vehicle 50E and the emergency information (second information) via the antenna 110, the control unit 108F repeatedly measures an estimated distance to the second vehicle 50E. A time at which the last advertising packet is received and the estimated distance (second distance) to the second vehicle 50E are held. Then, if the control unit 108F detects that the notification device, that is, the information sharing user terminal 12D enters a communication area, the control unit 108F establishes the Bluetooth connection with the information sharing user terminal 12D and measures an estimated distance (first distance) to the information sharing user terminal 12D. Further, the control unit 108F calculates an estimated distance between the notification device, that is, the information sharing user terminal 12D, and the stolen vehicle, that is, the second vehicle 50E (first distance+second distance). The control unit 108F notifies the server 14D of the first distance, the second distance, the first distance+the second distance, and the second information via the information sharing user terminal 12D.

FIG. 33 is a block diagram showing a schematic configuration of the information sharing user terminal 12D (12C). In FIG. 21, the same reference numerals are given to components that are common to the components of the information sharing user terminal 12 shown in FIG. 5. The information sharing user terminal 12D (12C) includes the GPS reception unit (location information acquisition circuit) 121, the clock (clock circuit) 123, the BT wireless transmission and reception unit 124, the telecom transmission and reception unit 125, the advertising determination unit 127, a control unit 128E, and the antennas 122, 126, and 129. The GPS reception unit 121 acquires location information. The clock 123 acquires a time. The BT wireless transmission and reception unit 124 is capable of wireless communication conforming to the Bluetooth standard with the first vehicle 50F or the second vehicle 50E. The antenna 129 can be used for cellular communication.

The control unit 128E controls each unit of the device, and includes a CPU (not shown), a ROM storing a program for operating the CPU, and a RAM used in an operation of the CPU. The GPS reception unit 121, the clock 123, the BT wireless transmission and reception unit 124, the telecom transmission and reception unit 125, and the advertising determination unit 127 operate under the control of the control unit 128E.

If the BT wireless transmission and reception unit 124 receives the first distance, the second distance, the first distance+the second distance, and the second information via the antenna 126, the control unit 128E adds the time acquired from the clock 123 and the location information acquired from the GPS reception unit 121, and transmits the obtained information from the telecom transmission and reception unit 125 to the server 14D via the antenna 129. In response to the advertising packet of Bluetooth transmitted from the second vehicle 50E, the control unit 128E measures the estimated distance to the stolen vehicle, that is, the second vehicle 50E, adds the measurement result, the time acquired from the clock 123 when the advertising packet is received, and the location information acquired from the GPS reception unit 121, and transmits the obtained information from the telecom transmission and reception unit 125 to the server 14D via the antenna 129.

FIG. 34 is a diagram showing an example of server notification information transmitted to the server 14D from the telecom transmission and reception unit 125 of the information sharing user terminal 12C. As shown in FIG. 34, the server notification information generated in the telecom transmission and reception unit 125 includes a "type" and a "content". The "type" includes a "notification device ID", a "reception date and time", a "vehicle ID", "location information", "estimated distance information", an "emergency type", and an "occurrence date and time". The "notification device ID" is an ID of the information sharing user terminal 12D. The "reception date and time" is a date and time at which the notification device (information sharing user terminal 12D) receives emergency advertising information. The "vehicle ID" is a Bluetooth MAC address used when the second vehicle 50E (second vehicle ECU 10E) issues a notification. The "location information" is GPS location information possessed by the notification device. The "estimated distance information" is information on an estimated distance between the notification device and the stolen vehicle. The stolen vehicle is the second vehicle 50E. The "emergency type" is an emergency type notified by the second vehicle 50E. The "occurrence date and time" is an occurrence date and time notified by the second vehicle 50E. The "emergency type" and the "occurrence date and time" are transmitted from the second vehicle ECU 10E of the second vehicle 50E.

The server 14D confirms that the "notification device ID" and the "vehicle ID" of the received server notification information are IDs registered in advance, and issues the user notification.

FIG. 35 is a block diagram showing a schematic configuration of the server 14D. In FIG. 23, the same reference numerals are given to components that are common to the components of the server 14 shown in FIG. 7. The server 14D includes the network communication unit 141, the notification information determination unit 142, and a control unit 143C. FIG. 36 is a diagram showing an example of user notification information transmitted to the vehicle user terminal 11 from the network communication unit 141 of the server 14D. As shown in FIG. 11, the user notification information includes a "type" and a "content". The "type" includes a "reception date and time", "location information", "estimated distance information", an "emergency type", and an "occurrence date and time".

The "reception date and time" is a date and time at which the notification device receives emergency advertising information. The "location information" is GPS location information possessed by the notification device. The "estimated distance information" is information on an estimated distance between the notification device and the stolen vehicle. The stolen vehicle is the second vehicle 50E. The "emergency type" is an emergency type notified by the second vehicle 50E. The "occurrence date and time" is an occurrence date and time notified by the second vehicle 50E. The "emergency type" and the "occurrence date and time" are transmitted from the second vehicle ECU 10E of the second vehicle 50E.

An operation of the second vehicle ECU 10E is as described with reference to FIG. 12 in the first embodiment. The first vehicle ECU 10F, which relays information from the second vehicle 50E to the information sharing user terminal 12D, can also operate in the same manner as the second vehicle ECU 10E. That is, when the first vehicle ECU 10F is stolen, the operation shown in FIG. 12 is performed.

FIG. 37 is a sequence diagram for illustrating operations of the second vehicle ECU 10E, the vehicle user terminal 11, the information sharing user terminal 12C, and the server 14D when an abnormality occurs in the wireless communication system 3 according to the third embodiment. In FIG. 37, when an abnormality occurs in the second vehicle 50E (when the second vehicle 50E is stolen), the second vehicle ECU 10E starts the transmission of an emergency advertising (advertising packet of Bluetooth). In this case, even if the second vehicle ECU 10E transmits an emergency advertising, the emergency advertising is not received unless the information sharing user terminal 12C is present within a Bluetooth communication range of the second vehicle ECU 10E.

When the information sharing user terminal 12C enters the Bluetooth communication range of the second vehicle ECU 10E during movement of the stolen second vehicle 50E or due to the information sharing user terminal 12C in close proximity to the second vehicle 50E, the emergency advertising transmitted from the second vehicle ECU 10E is received by the information sharing user terminal 12C. In response to receiving the emergency advertising, the information sharing user terminal 12C measures an estimated distance between the notification device (information sharing user terminal 12C) and the second vehicle 50E which is a stolen vehicle. After measuring the estimated distance between the notification device and the second vehicle 50E, the information sharing user terminal 12C notifies the server 14D of information including the estimated distance to the second vehicle 50E. The server 14D notifies the vehicle user terminal 11 of the second vehicle 50E of the information notified from the information sharing user terminal 12C. The user 51 of the second vehicle 50E can confirm the information notified from the server 14D on the vehicle user terminal 11 and know that his or her vehicle, that is, the second vehicle 50E, is stolen. The second vehicle 50E may measure the estimated distance between the information sharing user terminal 12C and the second vehicle 50E, and notify the information sharing user terminal 12C of the result.

Figure 38:
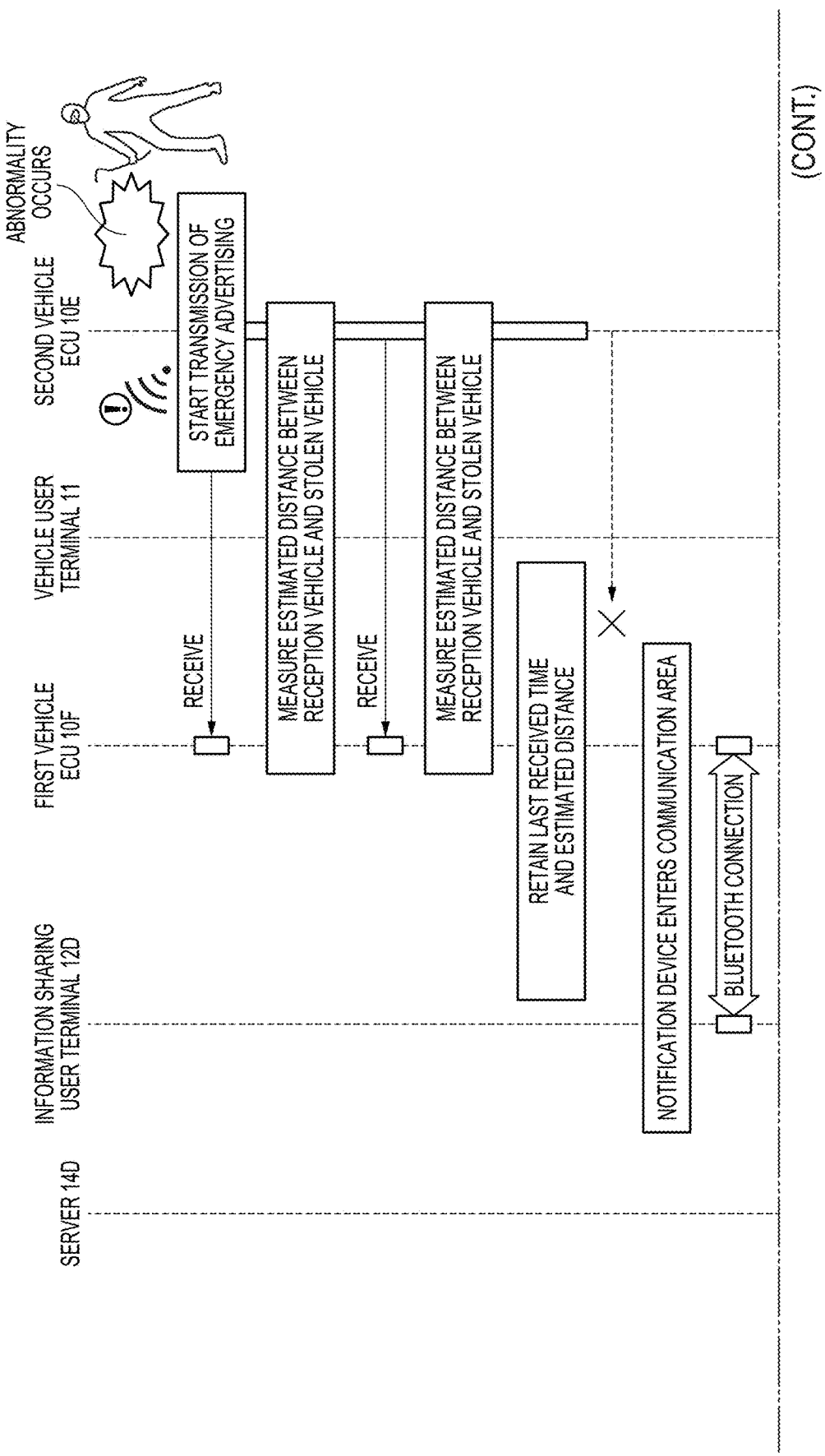
FIG. 38 is a sequence diagram for illustrating operations of the second vehicle ECU, the vehicle user terminal, the first vehicle ECU, the information sharing user terminal, and the server when an abnormality occurs in the wireless communication system according to the third embodiment.

FIG. 38 is a sequence diagram for illustrating operations of the second vehicle ECU 10E, the vehicle user terminal 11, the first vehicle ECU 10F, the information sharing user terminal 12D, and the server 14D when an abnormality occurs in the wireless communication system 3 according to the third embodiment. In FIG. 38, when the second vehicle 50E is stolen, the second vehicle ECU 10E starts the transmission of the emergency advertising (advertising packet of Bluetooth). In this case, if the first vehicle 50F enters the Bluetooth communication range of the second vehicle ECU 10E, the first vehicle ECU 10F of the first vehicle 50F receives the emergency advertising from the second vehicle ECU 10E.

In response to receiving the emergency advertising transmitted from the second vehicle ECU 10E of the second vehicle 50E, the first vehicle ECU 10F measures the estimated distance (second distance) between the first vehicle 50F, which is a reception vehicle, and the second vehicle 50E, which is the stolen vehicle. Since either the first vehicle 50F or the second vehicle 50E may be moving, the first vehicle ECU 10F repeatedly measures the distance. The first vehicle ECU 10F temporarily retains the time of measurement each time the distance is measured. Then, when the first vehicle ECU 10F cannot receive the emergency advertising, the first vehicle ECU 10F retains the last received time and estimated distance. If either the first vehicle 50F or the second vehicle 50E is moving, the first vehicle ECU 10F may move out of the Bluetooth communication range of the second vehicle ECU 10E, and thus, this case becomes a time of last reception. The second vehicle ECU 10E may measure the estimated distance between the first vehicle 50F and the second vehicle 50E, which is a stolen vehicle, and notify the first vehicle ECU 10F of the result.

If the information sharing user terminal 12D enters a Bluetooth communication range of the first vehicle ECU 10F, the information sharing user terminal 12D establishes the Bluetooth connection with the first vehicle ECU 10F. After establishing the Bluetooth connection with the first vehicle ECU 10F, the information sharing user terminal 12D measures the estimated distance (first distance) between the notification device, that is, the information sharing user terminal 12D, and the reception vehicle, that is, the first vehicle 50F. Next, the information sharing user terminal 12D calculates the estimated distance between the notification device, that is, the information sharing user terminal 12D, and the stolen vehicle, that is, the second vehicle 50E. That is, the first distance and the second distance are added. This calculation may be performed by the first vehicle ECU 10F and notified to the information sharing user terminal 12D.

The information sharing user terminal 12D notifies the server 14D of the information including the estimated distance to the stolen vehicle (second vehicle 50E). The server 14D notifies the vehicle user terminal 11 of the second vehicle 50E of the information notified from the information sharing user terminal 12D. The user 51 of the second vehicle 50E can confirm the information notified from the server 14D on the vehicle user terminal 11 and know that his or her vehicle, that is, the second vehicle 50E, is stolen.

The operation regarding the emergency notification of the second vehicle ECU 10E of the second vehicle 50E is the same as the operation regarding the emergency notification of the vehicle ECU 10 of the vehicle 50 according to the first embodiment shown in FIG. 14, and thus, a description thereof is omitted here. The first vehicle ECU 10F of the first vehicle 50F also performs the same operation as the operation regarding the emergency notification of the second vehicle ECU 10E.

Figure 39:
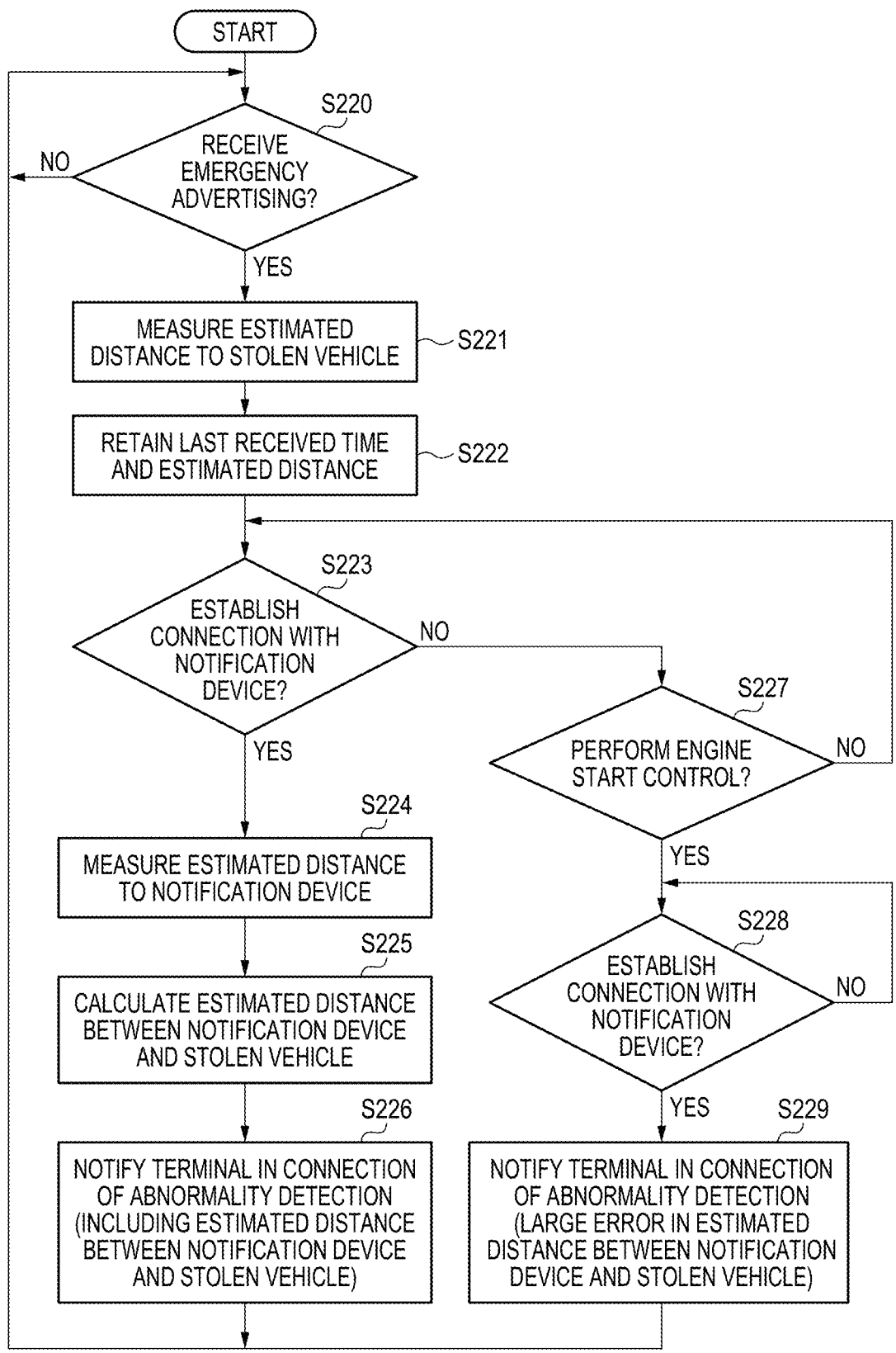
FIG. 39 is a flowchart for illustrating an operation regarding an emergency notification of the first vehicle ECU of the wireless communication system according to the third embodiment.

FIG. 39 is a flowchart showing an operation corresponding to the sequence diagram of FIG. 38. That is, FIG. 39 is a flowchart for illustrating the operation regarding the emergency notification of the first vehicle ECU 10F. An operation of the first vehicle ECU 10F is an operation of the control unit 108F, but the subject is not the control unit 108F but the first vehicle ECU 10F.

In FIG. 39, the first vehicle ECU 10F first determines whether the emergency advertising is received (step S220), and if the first vehicle ECU 10F determines that the emergency advertising is not received (if "NO" in step S220), the first vehicle ECU 10F repeats the present process until the first vehicle ECU 10F determines that the emergency advertising is received. If the first vehicle ECU 10F determines that the emergency advertising is received (if "YES" in step S220), the first vehicle ECU 10F measures the estimated distance to the stolen vehicle, that is, the second vehicle 50E (step S221).

After measuring the estimated distance to the stolen vehicle, the first vehicle ECU 10F retains the last received time and the estimated distance (step S222). Next, the first vehicle ECU 10F determines whether the connection is established with the notification device, that is, the information sharing user terminal 12D (step S223), and if the first vehicle ECU 10F determines that the connection is established with the notification device (if "YES" in step S223), the first vehicle ECU 10F measures the estimated distance to the notification device (step S224). After measuring the estimated distance to the notification device, the first vehicle ECU 10F calculates the estimated distance between the notification device and the stolen vehicle (step S225). That is, the first vehicle ECU 10F adds the estimated distance to the stolen vehicle and the estimated distance to the notification device.

After calculating the estimated distance between the notification device and the stolen vehicle, the first vehicle ECU 10F notifies the terminal in connection, that is, the information sharing user terminal 12D of the abnormality detection (step S226). This notification includes the estimated distance between the notification device, that is, the information sharing user terminal 12D and the stolen vehicle (second vehicle 50E). After performing the process in step S226, the first vehicle ECU 10F returns to the process in step S220.

On the other hand, if the first vehicle ECU 10F determines in the process of step S223 that the connection is not established with the notification device, that is, the information sharing user terminal 12D (if "NO" in step S223), the first vehicle ECU 10F determines whether the engine start control on the first vehicle 50F is performed (step S227). If the first vehicle ECU 10F determines that the engine start control on the first vehicle 50F is not performed (if "NO" in step S227), the first vehicle ECU 10F returns to step S223. If the first vehicle ECU 10F determines that the engine start control on the first vehicle 50F is performed (if "YES" in step S227), the first vehicle ECU 10F determines whether the Bluetooth connection is established with the notification device, that is, the information sharing user terminal 12D (step S228).

If the first vehicle ECU 10F determines that the Bluetooth connection is not established with the information sharing user terminal 12D (if "NO" in step S228), the first vehicle ECU 10F continues the present process until the first vehicle ECU 10F determines that the Bluetooth connection is established with the information sharing user terminal 12D. If the first vehicle ECU 10F determines that the Bluetooth connection is established with the information sharing user terminal 12D (if "YES" in step S228), the first vehicle ECU 10F notifies the terminal in connection, that is, the information sharing user terminal 12D of the abnormality detection (step S229). This notification includes the estimated distance between the notification device, that is, the information sharing user terminal 12D and the stolen vehicle (second vehicle 50E). In this case, the estimated distance has a large error. After performing the process in step S229, the first vehicle ECU 10F returns to the process in step S220.

Figure 40:
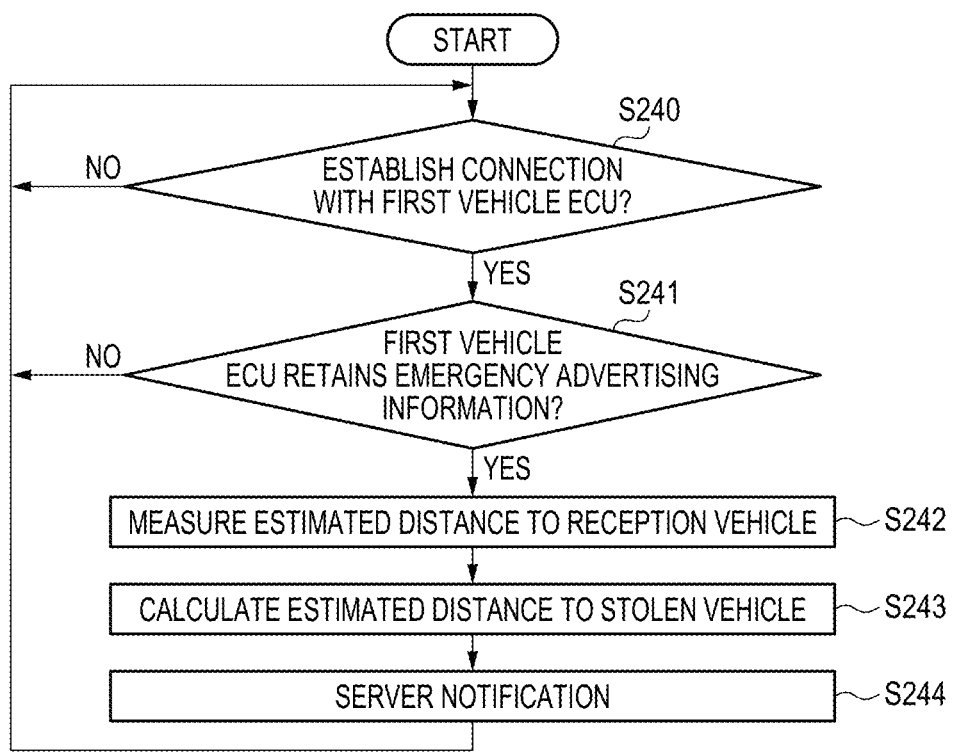
FIG. 40 is a flowchart for illustrating an operation regarding an emergency notification of the information sharing user terminal of the wireless communication system according to the third embodiment.

FIG. 40 is a flowchart for illustrating an operation regarding an emergency notification of the notification device, that is, the information sharing user terminal 12D. An operation of the information sharing user terminal 12D is an operation of the control unit 128E, but the subject is not the control unit 128E but the information sharing user terminal 12D. In FIG. 40, the information sharing user terminal 12D determines whether the connection is established with the first vehicle ECU 10F of the first vehicle 50F (step S240), and if the information sharing user terminal 12D determines that the connection is not established with the first vehicle ECU 10F (if "NO" in step S240), the information sharing user terminal 12D continues the present process until the information sharing user terminal 12D determines that the connection is established with the first vehicle ECU 10F.

If the information sharing user terminal 12D determines that the connection is established with the first vehicle ECU 10F (if "YES" in step S240), the information sharing user terminal 12D determines whether the first vehicle ECU 10F retains the emergency advertising information (step S241). If the information sharing user terminal 12D determines that the first vehicle ECU 10F does not retain the emergency advertising information (if "NO" in step S241), the information sharing user terminal 12D continues the present process until the information sharing user terminal 12D determines that the first vehicle ECU 10F retains the emergency advertising information.

If the information sharing user terminal 12D determines that the first vehicle ECU 10F retains the emergency advertising information (if "YES" in step S241), the information sharing user terminal 12D measures the estimated distance to the reception vehicle, that is, the first vehicle 50F (step S242). After measuring the estimated distance to the reception vehicle, the information sharing user terminal 12D calculates the estimated distance to the stolen vehicle, that is, the second vehicle 50E (step S243). After calculating the estimated distance to the stolen vehicle, the information sharing user terminal 12D notifies the server 14D of the information including the calculated estimated distance (step S244). After notifying the server 14D of the information including the estimated distance, the information sharing user terminal 12D returns to the process in step S240. Although the first vehicle ECU 10F and the information sharing user terminal 12D measure the distance between each other independently, either one may perform measurement and notify the other of the results. The calculation of the distances to the stolen vehicle, that is, the second vehicle 50E, is performed by the first vehicle ECU 10F and the information sharing user terminal 12D, respectively, and it is of course possible to notify the information sharing user terminal 12D of the result of the distance measurement performed by the first vehicle ECU 10F.

Figure 41:
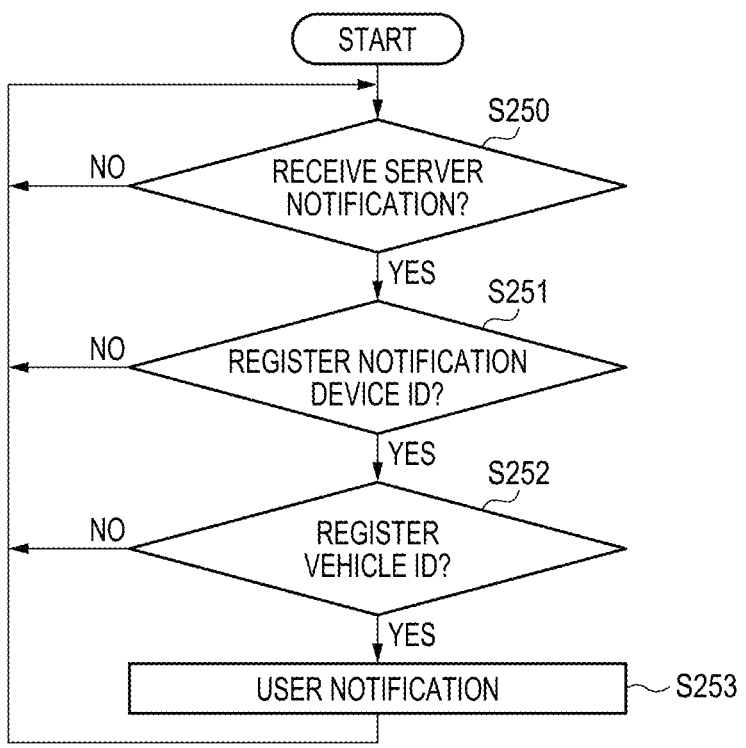
FIG. 41 is a flowchart for illustrating an operation regarding an emergency notification of the server of the wireless communication system according to the third embodiment.

FIG. 41 is a flowchart for illustrating an operation regarding emergency notification of the server 14D. An operation of the server 14D is an operation of the control unit 143C, but the subject is not the control unit 143C but the server 14D. In FIG. 41, the server 14D determines whether a server notification from the information sharing user terminal 12D is received (step S250), and if the server 14D determines that the server notification is not received (if "NO" in step S250), the server 14D continues the present process until the server 14D determines that the server notification is received. After determining that the server notification is received, the server 14D determines whether the notification device ID is registered (step S251), and if the server 14D determines that the notification device ID is not registered (if "NO" in step S251), the server 14D returns to the process in step S250.

If the server 14D determines that the notification device ID is registered (if "YES" in step S251), the server 14D determines whether the vehicle ID is registered (step S252), and if the server 14D determines that the vehicle ID is not registered (if "NO" in step S252), the server 14D returns to the process of step S250. On the other hand, if the server 14D determines that the vehicle ID is registered (if "YES" in step S252), the server 14D performs the user notification (step S253) and returns to the process in step S250.

Figure 42:
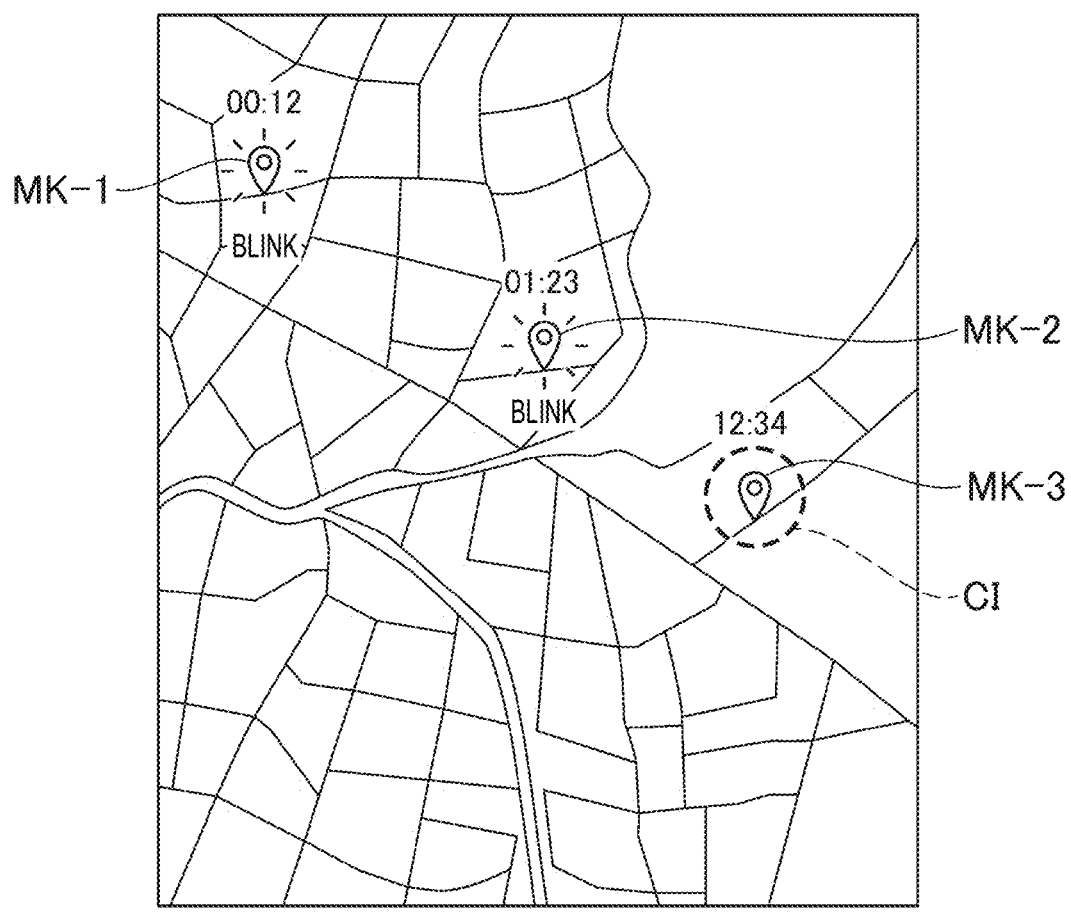
FIG. 42 is a diagram showing an example of a notification image to a user of the second vehicle of the wireless communication system according to the third embodiment.

FIG. 42 is a diagram showing an example of a notification image to the user 51 of the second vehicle 50E. In FIG. 42, marks MK-1 to MK-3 indicate locations, and a last time confirmed at each location is displayed directly above each mark MK. When the vehicle (second vehicle 50E) moves, an error in estimating the vehicle location is large, and thus, the marks MK are displayed, for example, in a blinking manner. A dashed circle CI surrounding the mark MK-3 indicates an error circle based on the estimated distance information.

As described above, in the wireless communication system 3 according to the third embodiment, if the second vehicle 50E detects an abnormality such as a theft, the second vehicle ECU 10E of the second vehicle 50E transmits the advertising packet of Bluetooth to which the emergency information is added, if the information sharing user terminal 12C receives this advertising packet, the distance to the second vehicle 50E is measured, the measurement result, and the emergency information, the time at which the emergency information is received, the location at which the emergency information is received, and the like are transmitted to the server 14D, and on the other hand, if the information sharing user terminal 12C is not present in the area where the advertising packet transmitted from the second vehicle ECU 10E of the second vehicle 50E can be received, and the first vehicle 50F that can receive the advertising packet is present, the first vehicle ECU 10F of the first vehicle 50F relays, and transmits the emergency information, the distance (first distance) to the information sharing user terminal 12D paired with the first vehicle ECU 10F, the distance (second distance) to the second vehicle 50E, which is a stolen vehicle, and the like to the server 14D via the information sharing user terminal 12D, and thus, the range of the area where the stolen vehicle is assumed to be present can be estimated, and the stolen vehicle can be easily found.

Fourth Embodiment

Next, a wireless communication system according to a fourth embodiment will be described.

In recent years, each driver of a car or a motorcycle owns a smartphone, which is suitable for identifying individual owners. Since the smartphone can communicate with a cloud server through mobile communication (4th generation mobile communication standard (4G)/long term evolution (LTE)/5th generation mobile communication standard (5G), and the like) it is possible to have a function of a vehicle key, such as periodically authenticating with a password or forcibly disabling use from the cloud server. Even if a smartphone with such a function is stolen, it is possible to construct a system that permanently prevents anyone other than an official owner from using the function of the vehicle key. That is, a theft detection method that prioritizes the smartphone of the official owner as an official owner authentication method is useful.

Hereinafter, a wireless communication system 4 according to the fourth embodiment will be described below with reference to FIGS. 43 to 57. The wireless communication system 4 according to the fourth embodiment basically includes a vehicle 50C and a vehicle ECU (wireless communication device) 10C shown in FIG. 43, a smartphone (second wireless communication terminal) 11C shown in FIG. 44, and an electronic key (first wireless communication terminal) 16 shown in FIG. 45. Both the smartphone 11C and the electronic key 16 can be used as keys for the vehicle 50C equipped with the vehicle ECU 10C. The vehicle ECU 10C, the smartphone 11C, and the electronic key 16 each have a Bluetooth (registered trademark) communication function, and Bluetooth communication is available between the smartphone 11C and the vehicle ECU 10C and between the electronic key 16 and the vehicle ECU 10C. The smartphone 11C has a cellular communication function or a WiFi (registered trademark) communication function in addition to the Bluetooth communication function. Identification information is given to the vehicle ECU 10C. The identification information can also be considered as identification information of the vehicle 50C. The identification information is information uniquely determined by the vehicle ECU, and may be, for example, a MAC address. The electronic key is also called Key FOB (or simply FOB).

The vehicle ECU 10C has a function of detecting that the vehicle is stolen if the smartphone 11C is not in close proximity to (that is, away from) the vehicle 50C for a certain period of time (for example, one week) and the vehicle is operated, and transitioning to a vehicle theft mode. Although the wireless communication system 4 according to the fourth embodiment is applied to the two-wheeled vehicle (motorcycle) 50C, the wireless communication system 4 can of course also be applied to a four-wheeled vehicle. Hereinafter, configurations of the vehicle ECU 10C, the smartphone 11C, and the electronic key 16 of the wireless communication system 4 according to the fourth embodiment will be sequentially described.

Figure 43:
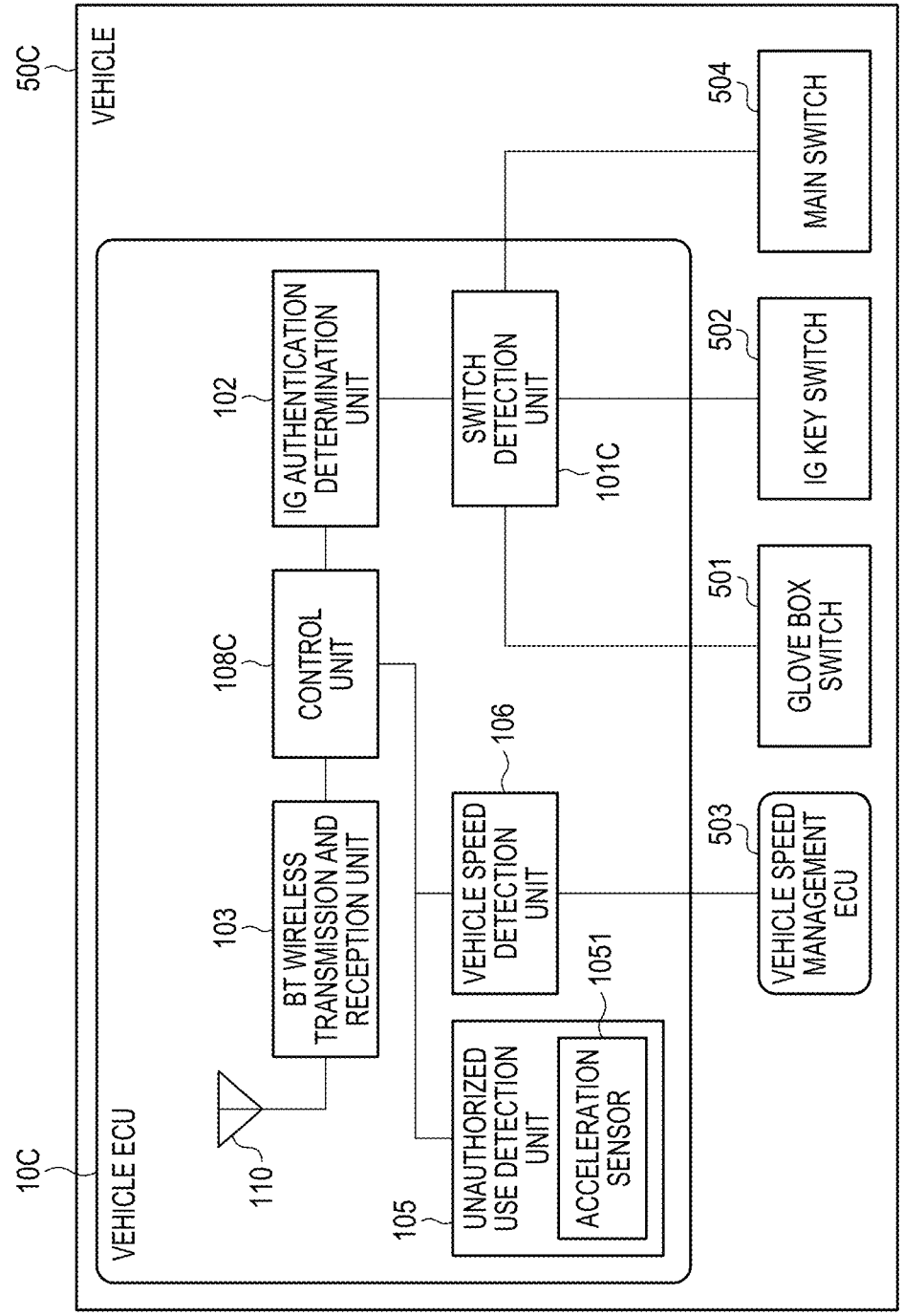
FIG. 43 is a block diagram showing a schematic configuration of a part of a vehicle and a schematic configuration of a vehicle ECU of a wireless communication system according to a fourth embodiment.

FIG. 43 is a block diagram showing a schematic configuration of a part of the vehicle 50C and a schematic configuration of the vehicle ECU 10C. In FIG. 43, the same reference numerals are given to components that are common to the components of the vehicle ECU 10 (see FIG. 2) of the wireless communication system 1 according to the first embodiment described above. In FIG. 43, the vehicle ECU 10C of the wireless communication system 4 according to the fourth embodiment includes a switch detection unit 101C, the IG authentication determination unit 102, the BT wireless transmission and reception unit (first wireless communication circuit) 103, the unauthorized use detection unit 105, the vehicle speed detection unit 106, a control unit 108C, and the antenna 110. The vehicle ECU 10C has one antenna 110, but may have a plurality thereof.

The switch detection unit 101C detects ON/OFF of the glove box switch 501 and the IG KEY switch 502, and detects ON/OFF of a main switch (operation unit) 504 provided in the vehicle 50C. The main switch 504 is a switch for starting an engine of the vehicle 50C. The BT wireless transmission and reception unit (first wireless communication circuit) 103 performs the wireless communication conforming to the Bluetooth standard (first wireless method) as described above.

The control unit 108C controls each unit of the device, and includes a CPU (not shown), a ROM storing a program for operating the CPU, and a RAM used in an operation of the CPU. The IG authentication determination unit 102, the BT wireless transmission and reception unit 103, the unauthorized use detection unit 105, and the vehicle speed detection unit 106 operate under the control of the control unit 108C. If an abnormality including a theft occurs in the vehicle 50C, the control unit 108C issues an emergency notification to the smartphone 11C of the vehicle user 51. When communicating with the smartphone 11C, the control unit 108C registers the smartphone 11C. Details of an operation of the control unit 108C will be described later.

Figure 44:
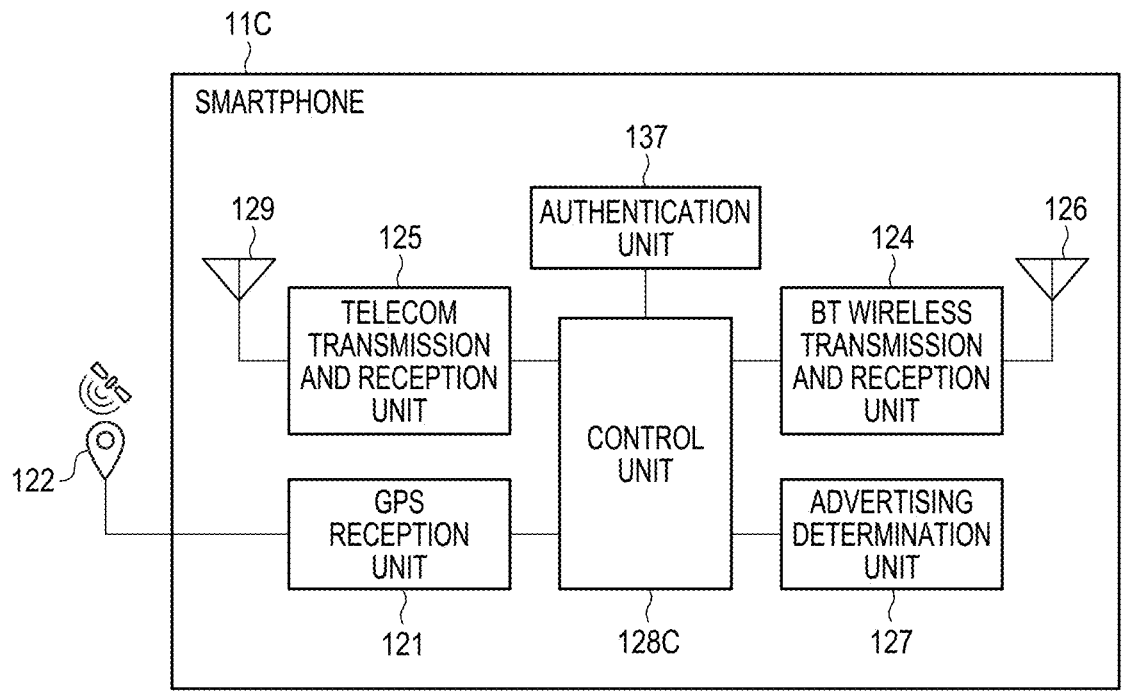
FIG. 44 is a block diagram showing a schematic configuration of a smartphone of the wireless communication system according to the fourth embodiment.

FIG. 44 is a block diagram showing a schematic configuration of the smartphone 11C. In FIG. 44, the same reference numerals are given to components that are common to the components of the information sharing user terminal (smartphone) 12 (see FIG. 5) of the wireless communication system 1 according to the first embodiment described above. As shown in FIG. 44, the smartphone 11C includes the GPS reception unit 121, the BT wireless transmission and reception unit 124, the telecom transmission and reception unit 125, the advertising determination unit 127, an authentication unit 137, the antennas 122, 126, and 129, and a control unit 128C. The smartphone 11C includes one antenna 126 and one antenna 129, but may include a plurality thereof.

The BT wireless transmission and reception unit (third wireless communication circuit) 124 performs the wireless communication conforming to the Bluetooth standard (first wireless method) as described above. The telecom transmission and reception unit (fourth wireless communication circuit) 125 performs wireless communication conforming to a cellular communication method (second wireless method) different from the Bluetooth standard communication method (first wireless method).

The authentication unit 137 authenticates the user of the smartphone 11C. The authentication unit 137 has at least one authentication function among password authentication, fingerprint authentication, and face authentication, and outputs an authentication result to the control unit 128C. The control unit 128C controls each unit of the device, and includes a CPU (not shown), a ROM storing a program for operating the CPU, and a RAM used in an operation of the CPU. The GPS reception unit 121, the BT wireless transmission and reception unit 124, the telecom transmission and reception unit 125, the advertising determination unit 127, and the authentication unit 137 operate under the control of the control unit 128C. When the control unit 128C communicates with the vehicle ECU 10C, the control unit 128C transmits information for registering the control unit 128C in the vehicle ECU 10C.

Figure 45:
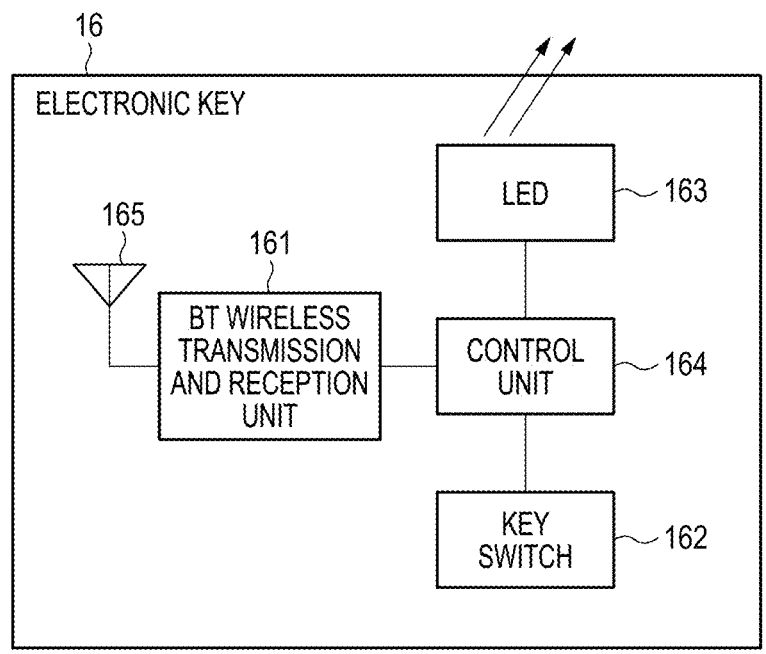
FIG. 45 is a block diagram showing a schematic configuration of a vehicle electronic key of the wireless communication system according to the fourth embodiment.

FIG. 45 is a block diagram showing a schematic configuration of the electronic key 16 of the vehicle 50C. In FIG. 45, the electronic key 16 includes a BT wireless transmission and reception unit 161, a key switch 162, a light emitting diode (LED) 163, a control unit 164, and an antenna 165. The BT wireless transmission and reception unit (second wireless communication circuit) 161 performs the wireless communication conforming to the Bluetooth standard (first wireless method) as described above. The antenna 165 for Bluetooth communication is connected to the BT wireless transmission and reception unit 161. The BT wireless transmission and reception unit 161 is controlled by the control unit 164. The key switch 162 is a switch that allows the vehicle 50C to be operated. A switch signal of the key switch 162 is taken into the control unit 164.

The LED 163 is an indicator that indicates an operating state of the key switch 162. The control unit 164 controls each unit of the device, and includes a CPU (not shown), a ROM storing a program for operating the CPU, and a RAM used in an operation of the CPU. The BT wireless transmission and reception unit 161 and the LED 163 operate under the control of the control unit 164. The control unit 164 receives a switch signal that allows the vehicle 50C to be operated from the key switch 162, and transmits a Bluetooth signal that allows the vehicle 50C to be operated from the BT wireless transmission and reception unit 161. The control unit 164 controls lighting of the LED 163 by receiving the switch signal from the key switch 162 that allows the vehicle 50C to be operated.

The electronic key 16 has one antenna 165, but may have a plurality thereof.

Next, operations of the vehicle ECU 10C and the smartphone 11C will be described.

The vehicle ECU 10C becomes operable when the BT wireless transmission and reception unit (first wireless communication circuit) 103 and the BT wireless transmission and reception unit (second wireless communication circuit) 161 of the electronic key 16 enter into a first communication state. The vehicle ECU 10C becomes operable when the BT wireless transmission and reception unit (first wireless communication circuit) 103 and the BT wireless transmission and reception unit (third wireless communication circuit) 124 of the smartphone 11C enter into a second communication state.

After the BT wireless transmission and reception unit (first wireless communication circuit) 103 of the vehicle 50C and the BT wireless transmission and reception unit (third wireless communication circuit) 124 of the smartphone 11C enter into the second communication state, if the BT wireless transmission and reception unit (first wireless communication circuit) 103 and the BT wireless transmission and reception unit (third wireless communication circuit) 124 are not in the second communication state for a predetermined time (for example, one week) or longer, and if the main switch (operation unit) 504 of the vehicle 50C detects a predetermined operation, the vehicle ECU 10C transmits an emergency advertising (packet including emergency information) from the BT wireless transmission and reception unit (first wireless communication circuit) 103 of the vehicle 50C. The process of transmitting the emergency advertising is as described in the wireless communication system 1 according to the first embodiment.

The process of transmitting the emergency advertising is performed even when the BT wireless transmission and reception unit (first wireless communication circuit) 103 and the BT wireless transmission and reception unit (second wireless communication circuit) 161 of the electronic key 16 (first wireless communication terminal) are in the first communication state. That is, even when the BT wireless transmission and reception unit (first wireless communication circuit) 103 and the BT wireless transmission and reception unit (second wireless communication circuit) 161 of the electronic key 16 (first wireless communication terminal) are in the first communication state, after the BT wireless transmission and reception unit (first wireless communication circuit) 103 and the BT wireless transmission and reception unit (third wireless communication circuit) 124 of the smartphone (second wireless communication terminal) 11C enter into the second communication state, if the BT wireless transmission and reception unit (first wireless communication circuit) 103 and the BT wireless transmission and reception unit (third wireless communication circuit) 124 are not in the second communication state for a predetermined time (for example, one week) or longer, and if the main switch (operation unit) 504 of the vehicle 50C detects a predetermined operation, the vehicle ECU 10C transmits an emergency advertising from the BT wireless transmission and reception unit (first wireless communication circuit) 103.

In response to receiving a signal to stop the telecom transmission and reception unit 125 entering into the second communication state, the control unit 128C of the smartphone 11C stops at least the BT wireless transmission and reception unit 124 entering into the second communication state. The control unit 128C operates the authentication unit 137 to perform authentication every time the smartphone 11C is used, and if the authentication is successful, the control unit 128C continues to cause at least the BT wireless transmission and reception unit 124 to enter into the second communication state, and if the authentication fails, the control unit 128C stops at least the BT wireless transmission and reception unit 124 entering into the second communication state. Although the communication state is divided into the first communication state and the second communication state, these states may be the same state.

Figure 46:
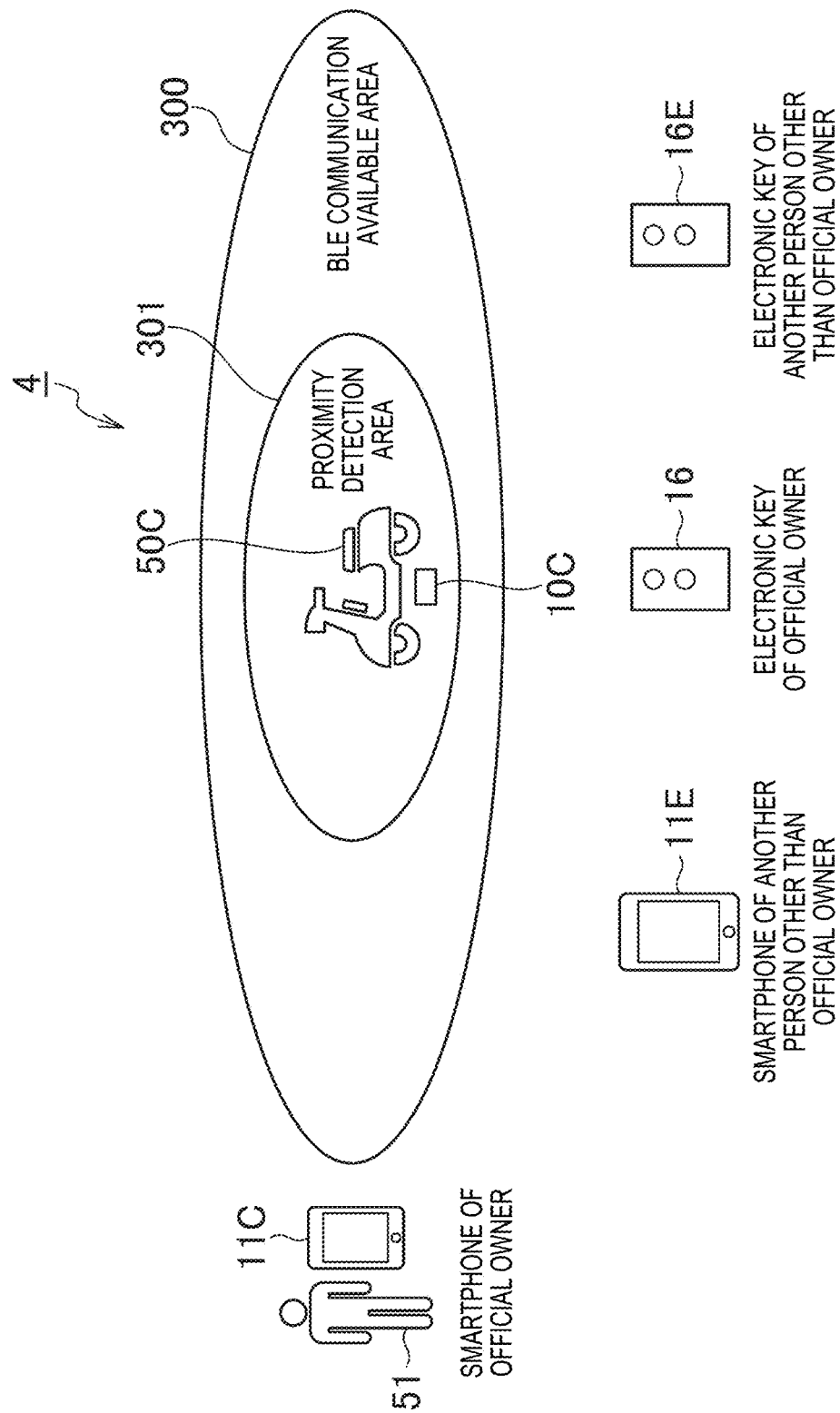
FIG. 46 is a diagram showing an aspect of using the wireless communication system according to the fourth embodiment.

FIG. 46 is a diagram showing an aspect of using the wireless communication system 4 according to the fourth embodiment. In FIG. 46, the wireless communication system 4 according to the fourth embodiment includes the vehicle 50C, the vehicle ECU 10C, the smartphone 11C, and the electronic key 16 which are described above. The vehicle 50C belongs to the vehicle user 51 who is an official owner, and is equipped with the vehicle ECU 10C. The smartphone 11C and the electronic key 16 belong to the vehicle user 51. In addition to the smartphone 11C and the electronic key 16 of the vehicle user 51, it is assumed that a smartphone 11E and an electronic key 16E of another person other than the vehicle user 51 are present. The Bluetooth communication available area (BLE communication available area) of the vehicle ECU 10C is indicated by a reference numeral 300, and a proximity detection area is indicated by a reference numeral 301.

Figure 47:
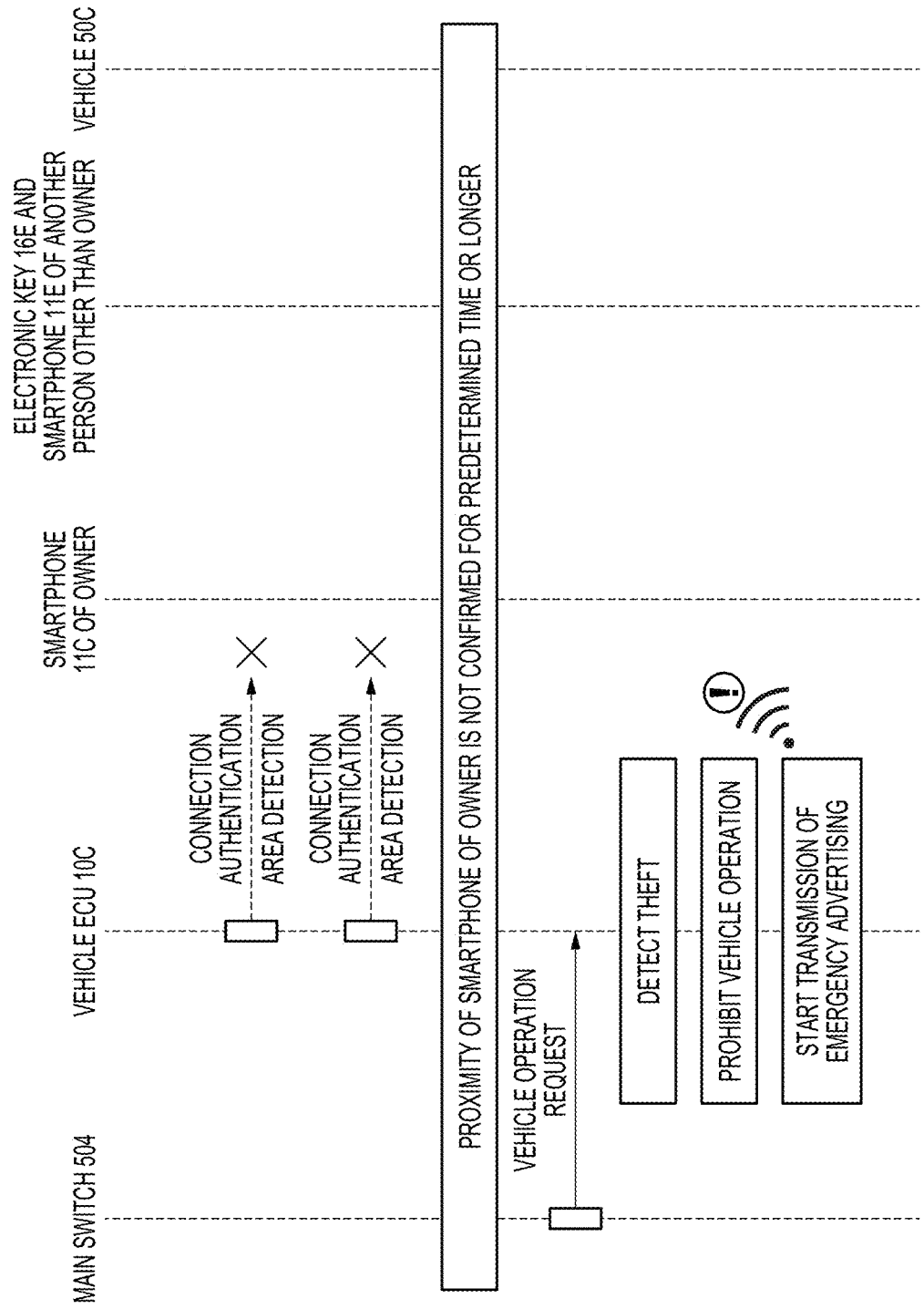
FIG. 47 is a sequence diagram showing an operation mainly of the vehicle ECU of the wireless communication system according to the fourth embodiment.
Figure 48:
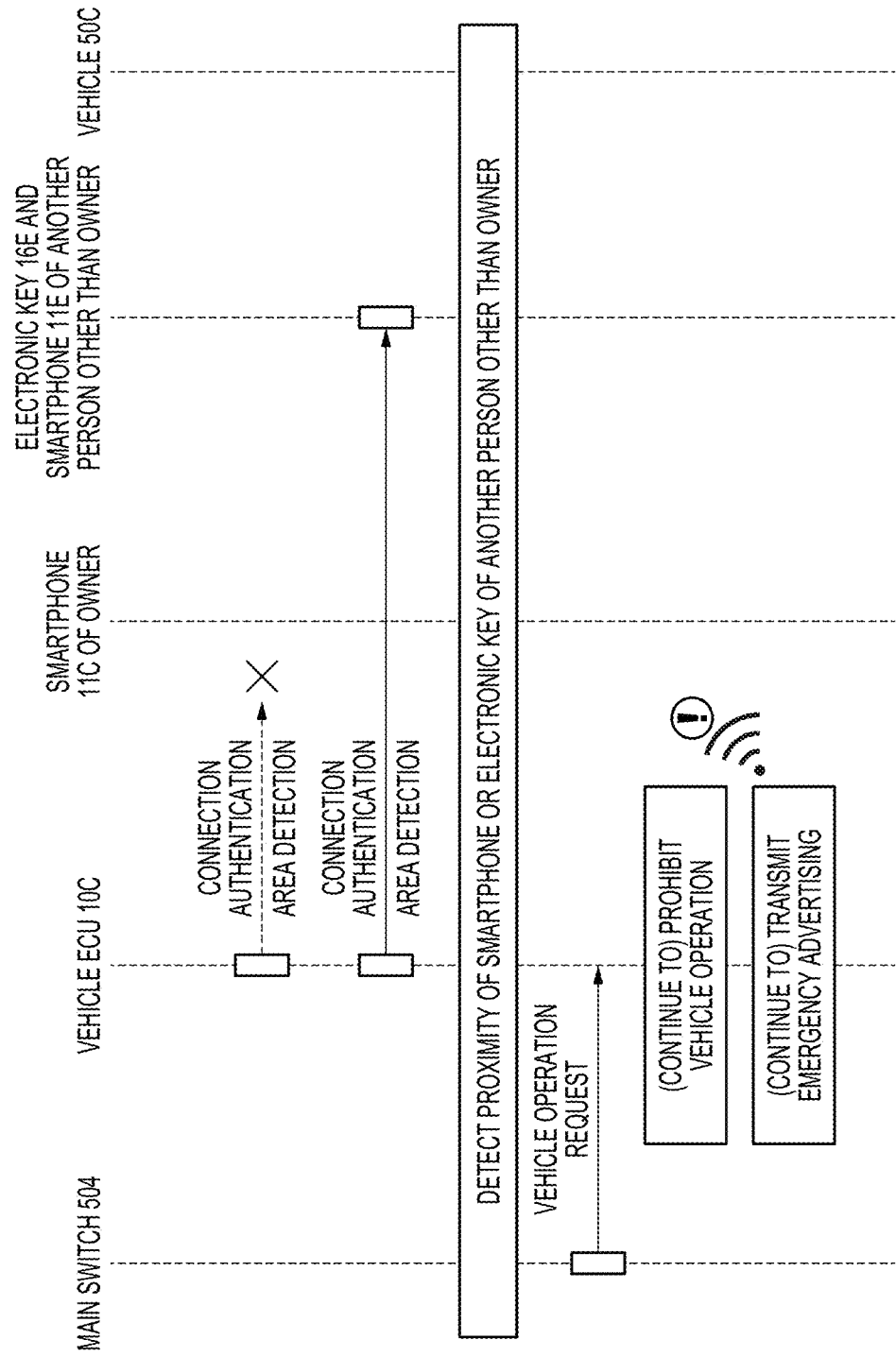
FIG. 48 is a sequence diagram showing an operation mainly of the vehicle ECU of the wireless communication system according to the fourth embodiment.
Figure 49:
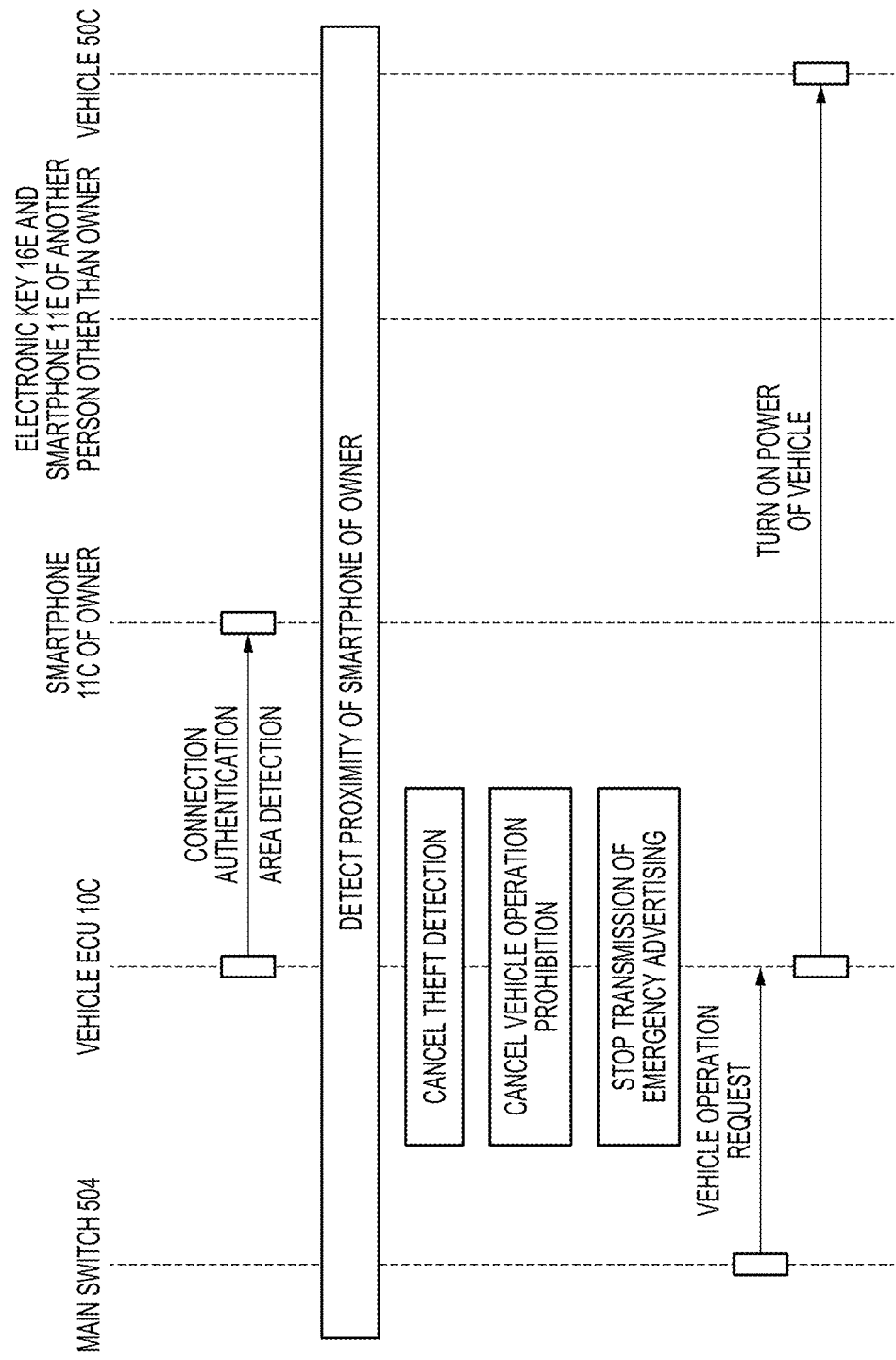
FIG. 49 is a sequence diagram showing an operation mainly of the vehicle ECU of the wireless communication system according to the fourth embodiment.

FIGS. 47 to 49 are sequence diagrams showing the operation mainly of the vehicle ECU 10C. In FIG. 47, the vehicle ECU 10C periodically performs connection authentication and area detection when the vehicle ECU 10C is not connected to the smartphone 11C or the electronic key 16. Then, if a vehicle operation request is output from the main switch 504 of the vehicle 50C while the proximity of the smartphone 11C of the vehicle user 51 is not confirmed for a predetermined time or longer, the vehicle ECU 10C detects a theft and prohibits a vehicle operation. Furthermore, the transmission of the emergency advertising is started.

In FIG. 48, the vehicle ECU 10C detects the proximity of the smartphone 11E or the electronic key 16E of another person other than the vehicle user 51 while performing the connection authentication and the area detection, and in this state, if the vehicle operation request is output from the main switch 504 of the vehicle 50C, the vehicle ECU 10C continues to prohibit the vehicle operation and continues the transmission of the emergency advertising.

In FIG. 49, when the vehicle ECU 10C detects the proximity of the smartphone 11C of the vehicle user 51 while performing the connection authentication and the area detection, the vehicle ECU 10C cancels the theft detection and also cancels vehicle operation prohibition. Furthermore, the transmission of the emergency advertising is stopped. Then, when the vehicle operation request is output from the main switch 504 of the vehicle 50C, the vehicle ECU 10C turns on power of the vehicle 50C.

Figure 50:
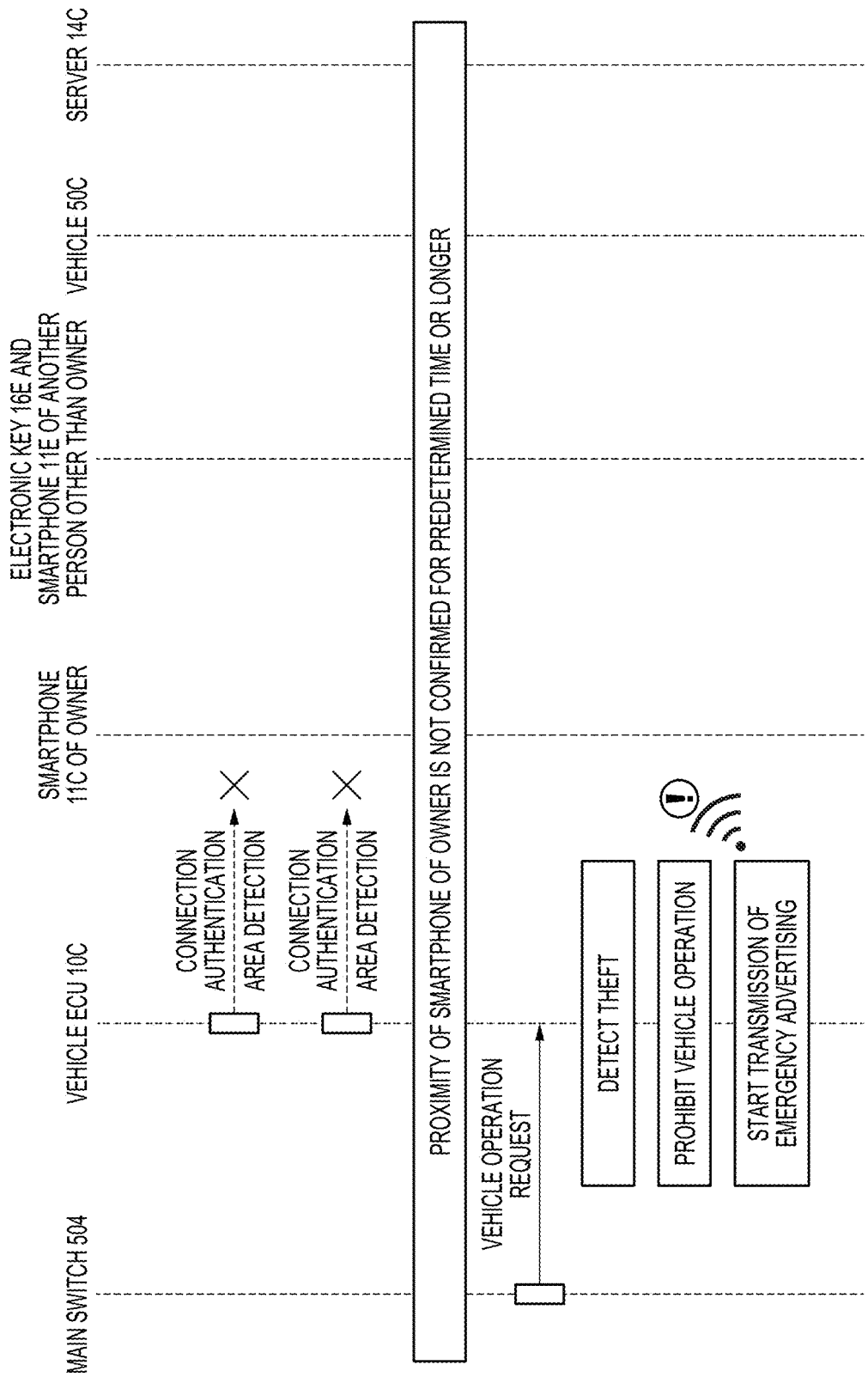
FIG. 50 is a sequence diagram showing an operation when a server is provided to improve security in the wireless communication system according to the fourth embodiment.
Figure 51:
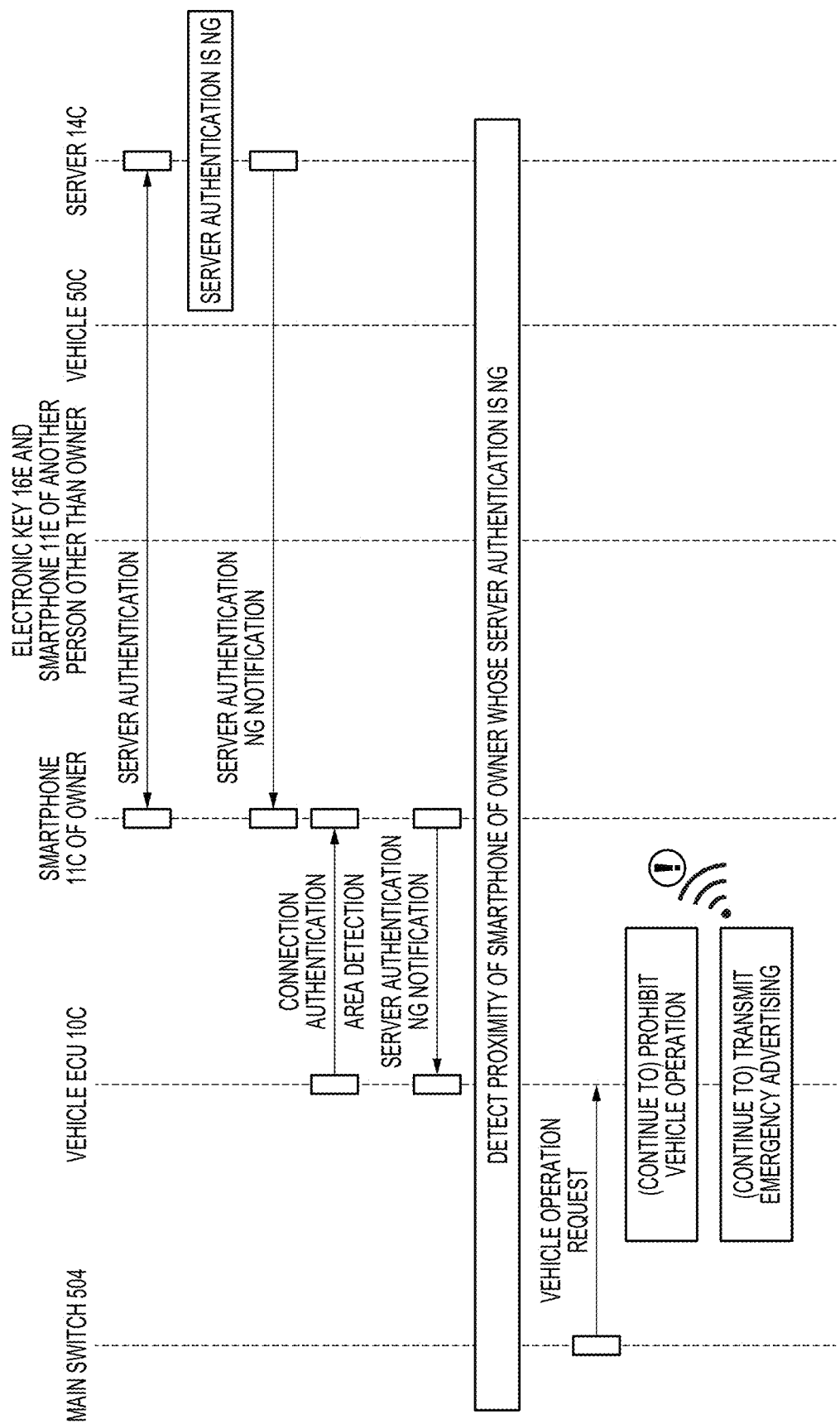
FIG. 51 is a sequence diagram showing an operation when the server is provided to improve the security in the wireless communication system according to the fourth embodiment.
Figure 52:
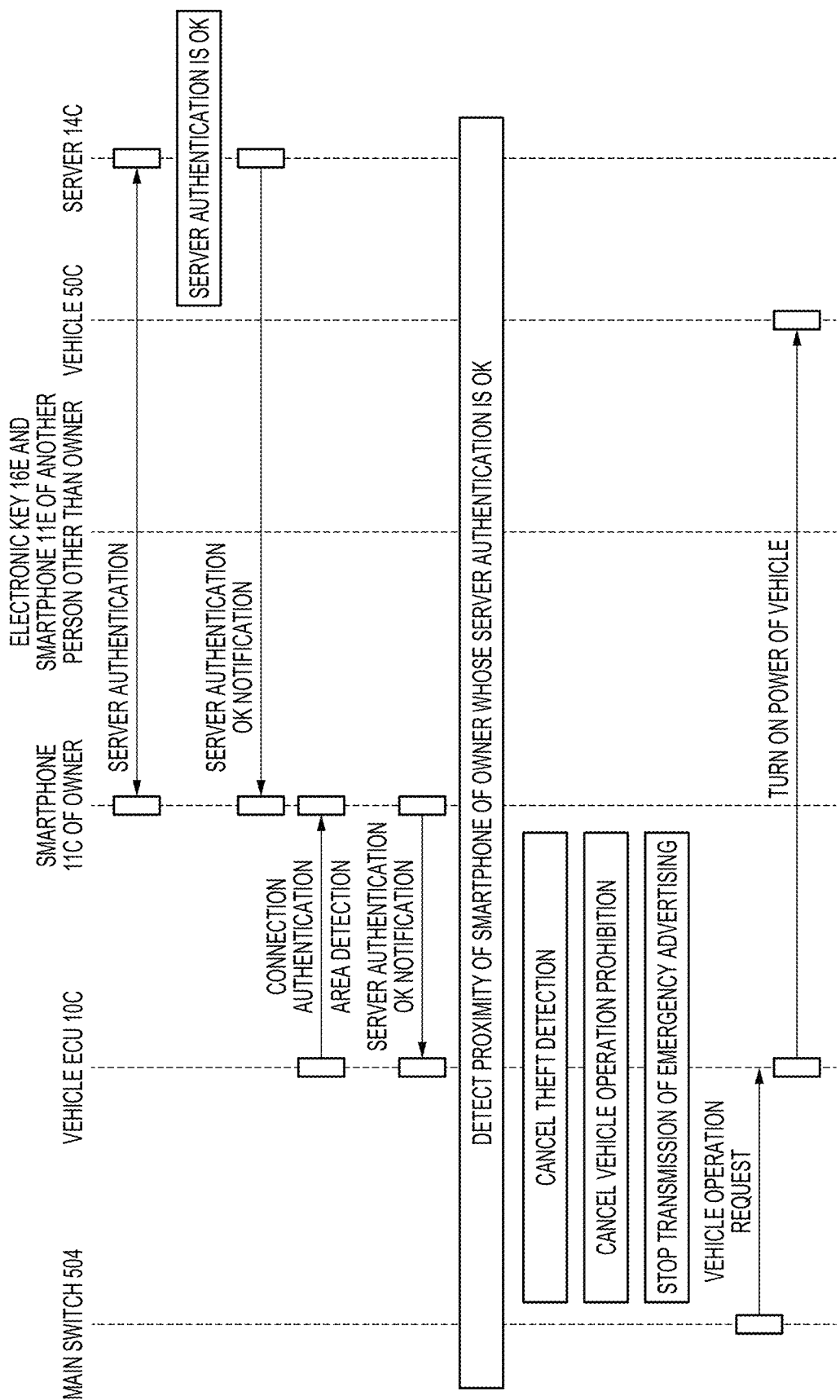
FIG. 52 is a sequence diagram showing an operation when the server is provided to improve the security in the wireless communication system according to the fourth embodiment.

FIGS. 50 to 52 are sequence diagrams showing operations when a server 14C having an authentication function is provided to achieve high security. The server 14C has an authentication function in addition to having the same function as the server 14 shown in FIG. 7. In FIG. 50, the vehicle ECU 10C periodically performs the connection authentication and the area detection, and when in a state where the proximity of the smartphone 11C of the vehicle user 51 is not confirmed for a predetermined time or longer, if the vehicle operation request is output from the main switch 504 of the vehicle 50C, the vehicle ECU 10C detects a theft and prohibits the vehicle operation. Furthermore, the transmission of the emergency advertising is started.

In FIG. 51, the smartphone 11C of the vehicle user 51 performs server authentication with the server 14C, and if the server authentication is NG, the server 14C notifies the smartphone 11C that the server authentication is NG. In response to receiving the server authentication NG notification, the smartphone 11C notifies the vehicle ECU 10C that the server authentication is NG. After receiving the server authentication NG notification, the vehicle ECU 10C detects the proximity of the smartphone 11C of the owner whose server authentication is NG, and in this state, when the vehicle operation request is output from the main switch 504 of the vehicle 50C, the vehicle ECU 10C continues to prohibit the vehicle operation and further continues the transmission of the emergency advertising.

In FIG. 52, the smartphone 11C of the vehicle user 51 performs the server authentication with the server 14C, and if the server authentication is OK, the server 14C notifies the smartphone 11C that the server authentication is OK. When the smartphone 11C receives the server authentication OK notification and the vehicle ECU 10C is connected to the smartphone 11C through the connection authentication and the area detection, the vehicle ECU 10C notifies the smartphone 11C that the server authentication is OK. When the vehicle ECU 10C detects the proximity of the smartphone 11C of the owner whose server authentication is OK while receiving the server authentication OK notification from the smartphone 11C, the vehicle ECU 10C cancels the theft detection and cancels the vehicle operation prohibition. Furthermore, the transmission of the emergency advertising is stopped. Then, when the vehicle operation request is output from the main switch 504 of the vehicle 50C, the vehicle ECU 10C turns on the power of the vehicle 50C.

Next, the operations of the vehicle ECU 10C and the smartphone 11C will be described.

Figure 53:
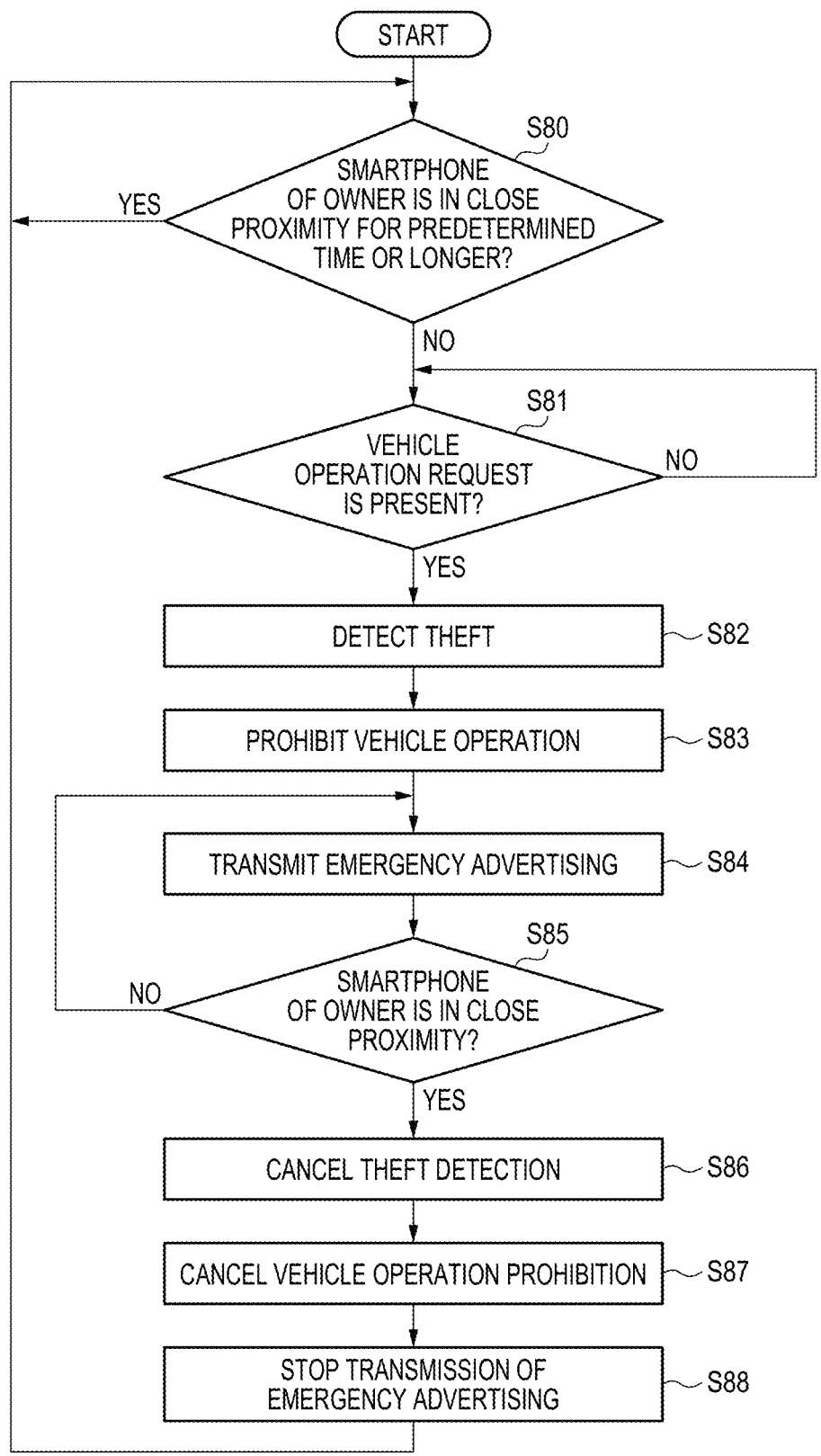
FIG. 53 is a flowchart for illustrating an operation of the vehicle ECU of the wireless communication system according to the fourth embodiment.

FIG. 53 is a flowchart for illustrating the operation of the vehicle ECU 10C. In FIG. 53, the vehicle ECU 10C first determines whether the smartphone 11C of the vehicle user 51 is in close proximity for a predetermined time (for example, one week) or longer (step S80), and if the vehicle ECU 10C determines that the smartphone 11C of the vehicle user 51 is not in close proximity for a predetermined time or longer (that is, if proximity is not confirmed, and if "NO" in step S80), the vehicle ECU 10C determines whether a vehicle operation request is present (step S81). If the vehicle ECU 10C determines that the smartphone 11C of the vehicle user 51 is in close proximity for a predetermined time or longer (that is, if proximity is confirmed, and if "YES" in step S80), the vehicle ECU 10C repeats the present process until the vehicle ECU 10C determines that the smartphone 11C of the vehicle user 51 is not in close proximity for a predetermined time or longer.

If the vehicle ECU 10C determines in step S81 that the vehicle operation request is not present (if "NO" in step S81), the vehicle ECU 10C repeats the present process until the vehicle ECU 10C determines that the vehicle operation request is present. If the vehicle ECU 10C determines that the vehicle operation request is present (if "YES" in step S81), the vehicle ECU 10C detects a theft (step S82), and then prohibits the vehicle operation (step S83). Furthermore, the emergency advertising is transmitted (step S84).

After transmitting the emergency advertising, the vehicle ECU 10C determines whether the smartphone 11C of the vehicle user 51 is in close proximity (step S85), and if the vehicle ECU 10C determines that the smartphone 11C is not in close proximity (if "NO" in step S85), the vehicle ECU 10C returns to the process in step S84 and continues to transmit the emergency advertising. If the vehicle ECU 10C determines that the smartphone 11C of the vehicle user 51 is in close proximity (if "YES" in step S85), the vehicle ECU 10C cancels the theft detection (step S86), then cancels the vehicle operation prohibition (step S87), and further stops the transmission of the emergency advertising (step S88). After stopping the transmission of the emergency advertising, the vehicle ECU 10C returns to the process in step S80.

Figure 54:
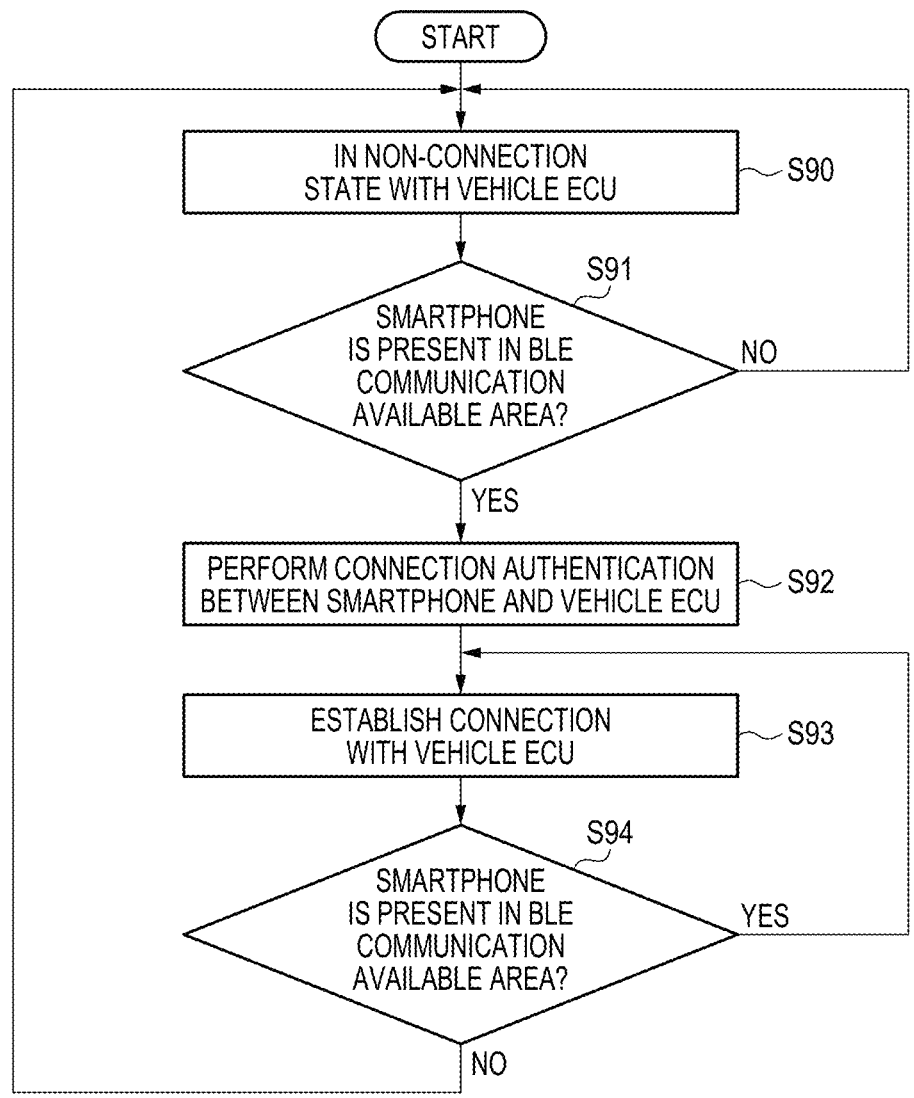
FIG. 54 is a flowchart for illustrating an operation of the smartphone of the wireless communication system according to the fourth embodiment.

FIG. 54 is a flowchart for illustrating the operation of the smartphone 11C. The operation of the smartphone 11C is an operation of the control unit 128C, but the subject is not the control unit 128C but the smartphone 11C. In FIG. 54, the smartphone 11C is not connected to the vehicle ECU 10C (step S90), and then determines whether the smartphone 11C is present in the BLE communication available area 300 (step S91). If the smartphone 11C determines that the smartphone 11C is not present in the BLE communication available area 300 (if "NO" in step S91), the smartphone 11C returns to the process in step S90, and if the smartphone 11C determines that the smartphone 11C is present in the BLE communication available area 300 (if "YES" in step S91), the smartphone 11C performs the connection authentication with the vehicle ECU 10C (step S92), and establishes connection with the vehicle ECU 10C (step S93). Next, the smartphone 11C determines whether itself (smartphone 11C) is present in the BLE communication available area 300 (step S94), and if the smartphone 11C determines that the smartphone 11C is present (if "YES" in step S94), the smartphone 11C returns to the process in step S93. If the smartphone 11C determines that itself (smartphone 11C) is not present in the BLE communication available area 300 (if "NO" in step S94), the smartphone 11C returns to the process in step S90.

Next, the operations of the vehicle ECU 10C, the smartphone 11C, and the server 14C in the case where the server 14C having the authentication function is provided to achieve high security will be described.

Figure 55:
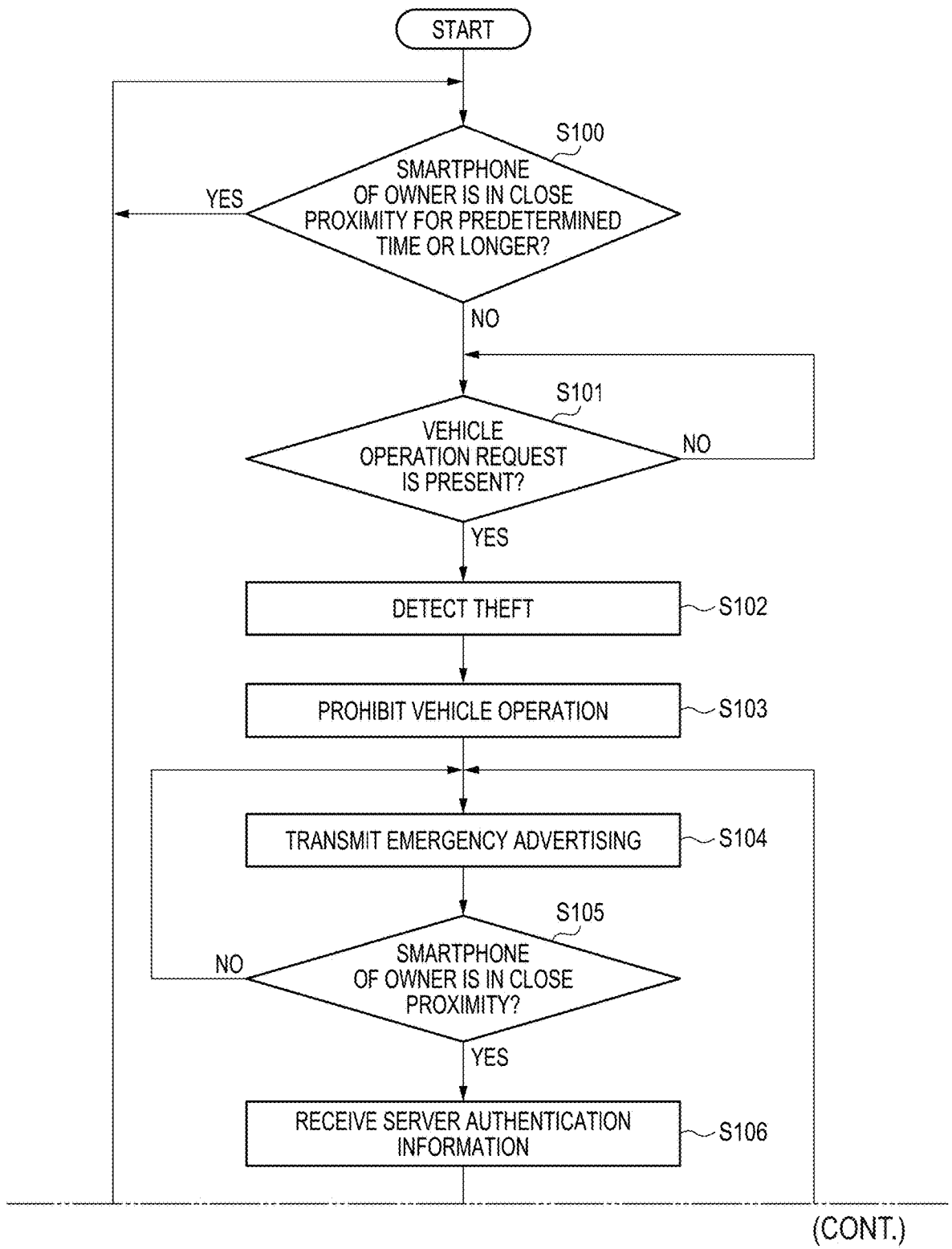
FIG. 55 is a flowchart for illustrating an operation of the vehicle ECU when the security is improved in the wireless communication system according to the fourth embodiment.

FIG. 55 is a flowchart for illustrating the operation of the vehicle ECU 10C when the server 14C having an authentication function is provided. The operation of the vehicle ECU 10C is the operation of the control unit 108C, but the subject is not the control unit 108C but the second vehicle ECU 10C. In FIG. 55, the vehicle ECU 10C first determines whether the smartphone 11C of the vehicle user 51 is in close proximity for a predetermined time or longer (step S100), and if the vehicle ECU 10C determines that the smartphone 11C of the vehicle user 51 is not in close proximity for a predetermined time or longer (that is, if proximity is not confirmed, and if "NO" in step S100), the vehicle ECU 10C determines whether a vehicle operation request is present (step S101). If the vehicle ECU 10C determines that the smartphone 11C of the vehicle user 51 is in close proximity for a predetermined time or longer (that is, if proximity is confirmed, and if "YES" in step S100), the vehicle ECU 10C repeats the present process until the vehicle ECU 10C determines that the smartphone 11C of the vehicle user 51 is not in close proximity for a predetermined time or longer.

If the vehicle ECU 10C determines in step S101 that the vehicle operation request is not present (if "NO" in step S101), the vehicle ECU 10C repeats the present process until the vehicle ECU 10C determines that the vehicle operation request is present. If the vehicle ECU 10C determines that the vehicle operation request is present (if "YES" in step S101), the vehicle ECU 10C detects a theft (step S102), and then prohibits the vehicle operation (step S103). Furthermore, the emergency advertising is transmitted (step S104).

After transmitting the emergency advertising, the vehicle ECU 10C determines whether the smartphone 11C of the vehicle user 51 is in close proximity (step S105), and if the vehicle ECU 10C determines that the smartphone 11C is not in close proximity (if "NO" in step S105), the vehicle ECU 10C returns to the process in step S104 and continues to transmit the emergency advertising. If the vehicle ECU 10C determines that the smartphone 11C of the vehicle user 51 is in close proximity (if "YES" in step S105), the vehicle ECU 10C receives server authentication information (step S106), and determines whether the server authentication is OK (step S107).

If the vehicle ECU 10C determines that the server authentication is not OK (that is, the server authentication is NG) (if "NO" in step S107), the vehicle ECU 10C returns to the process in step S104. If the vehicle ECU 10C determines that the server authentication is OK (if "YES" in step S107), the vehicle ECU 10C cancels the theft detection (step S108), and then cancels the vehicle operation prohibition (step S109). Furthermore, the transmission of the emergency advertising is stopped (step S110). After stopping the transmission of the emergency advertising, the vehicle ECU 10C returns to the process in step S100.

Figure 56:
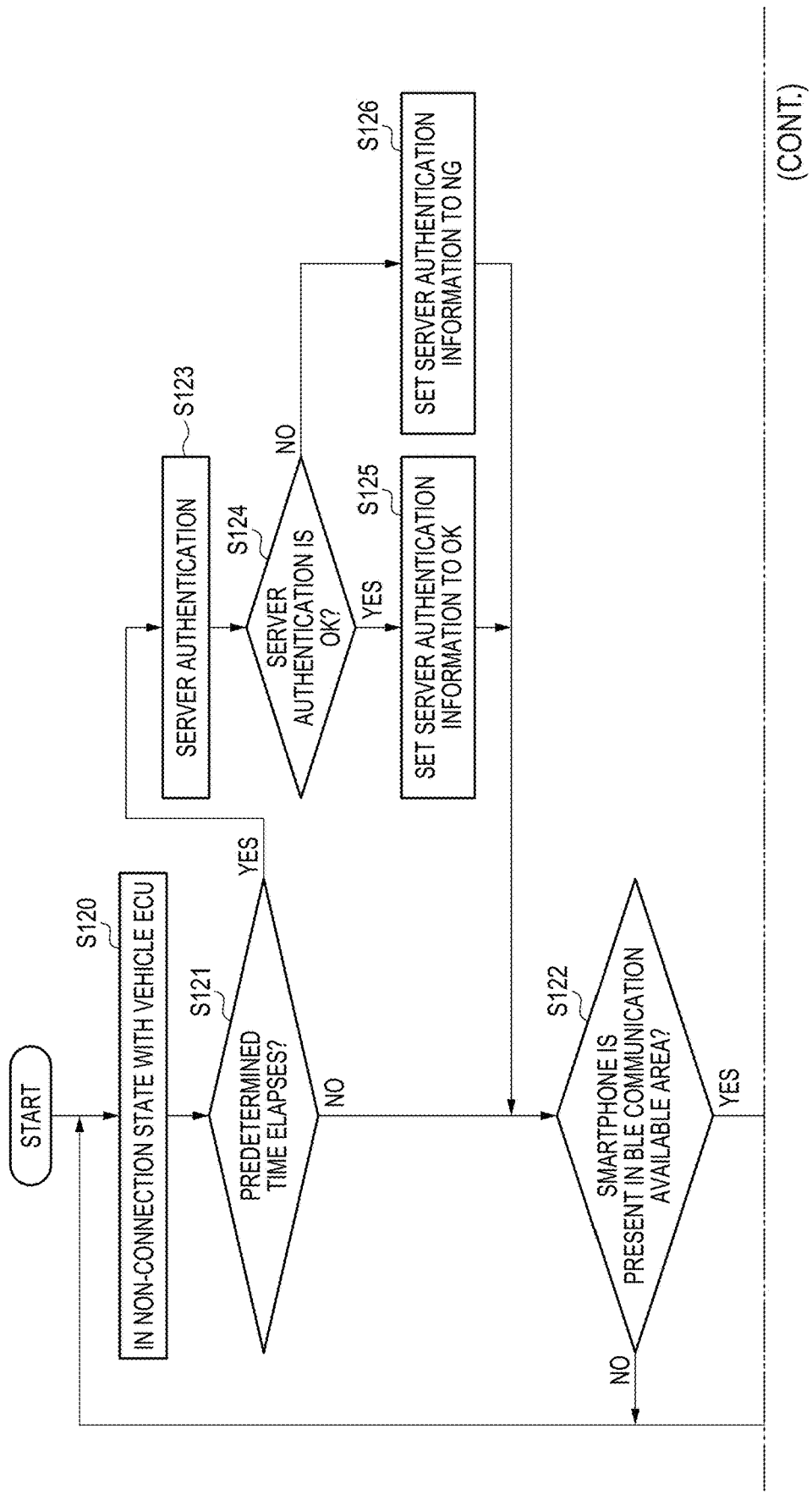
FIG. 56 is a flowchart for illustrating an operation of the smartphone when the security is improved in the wireless communication system according to the fourth embodiment.

FIG. 56 is a flowchart for illustrating the operation of the smartphone 11C when the server 14C having the authentication function is provided. The operation of the smartphone 11C is an operation of the control unit 128C, but the subject is not the control unit 128C but the smartphone 11C. In FIG. 56, the smartphone 11C is not contacted to the vehicle ECU 10C (step S120), and then determines whether a predetermined time elapses (step S121). If the smartphone 11C determines that the predetermined time does not elapse (if "NO" in step S121), the smartphone 11C determines whether itself (smartphone 11C) is present in the BLE communication available area 300 (step S122). If the smartphone 11C determines that the smartphone 11C is not present in the BLE communication available area 300 (if "NO" in step S122), the smartphone 11C returns to the process in step S120, and if the smartphone 11C determines that the smartphone 11C is present in the BLE communication available area 300 (if "YES" in step S122), the smartphone 11C performs the connection authentication with the vehicle ECU 10C (step S127).

On the other hand, if the smartphone 11C determines in step S121 that the predetermined time elapses (if "YES" in step S121), the smartphone 11C performs the server authentication (step S123), and determines whether the server authentication is OK (step S124). If the smartphone 11C determines that the server authentication is OK (if "YES" in step S124), the smartphone 11C sets the server authentication information to OK (step S125), and if the smartphone 11C does not determine that the server authentication is OK (if "NO" in step S124), the smartphone 11C sets the server authentication information to NG (step S126). After performing the process in step S125 or the process in step S126, the smartphone 11C performs the process in step S122.

After performing the connection authentication with the vehicle ECU 10C in step S127, the smartphone 11C is in the connection state with the vehicle ECU 10C (step S128). Next, the smartphone 11C determines whether a predetermined time elapses (step S129), and if the smartphone 11C determines that the predetermined time does not elapse (if "NO" in step S129), the smartphone 11C determines whether the smartphone 11C is present in the BLE communication available area 300 (step S130). If the smartphone 11C determines that the smartphone 11C is not present in the BLE communication available area 300 (if "NO" in step S130), the smartphone 11C returns to the process in step S120, and if the smartphone 11C determines that the smartphone 11C is present in the BLE communication available area 300 (if "YES" in step S130), the smartphone 11C performs the process in step S128.

On the other hand, if the smartphone 11C determines in step S129 that the predetermined time elapses (if "YES" in step S129), the smartphone 11C performs the server authentication (step S131), and determines whether the server authentication is OK (step S132). If the smartphone 11C determines that the server authentication is OK (if "YES" in step S132), the smartphone 11C sets the server authentication information to OK (step S133), and if the smartphone 11C does not determine that the server authentication is OK (if "NO" in step S132), the smartphone 11C sets the server authentication information to NG (step S134). After performing the process in step S133 or the process in step S134, the smartphone 11C performs the process in step S130.

Figure 57:
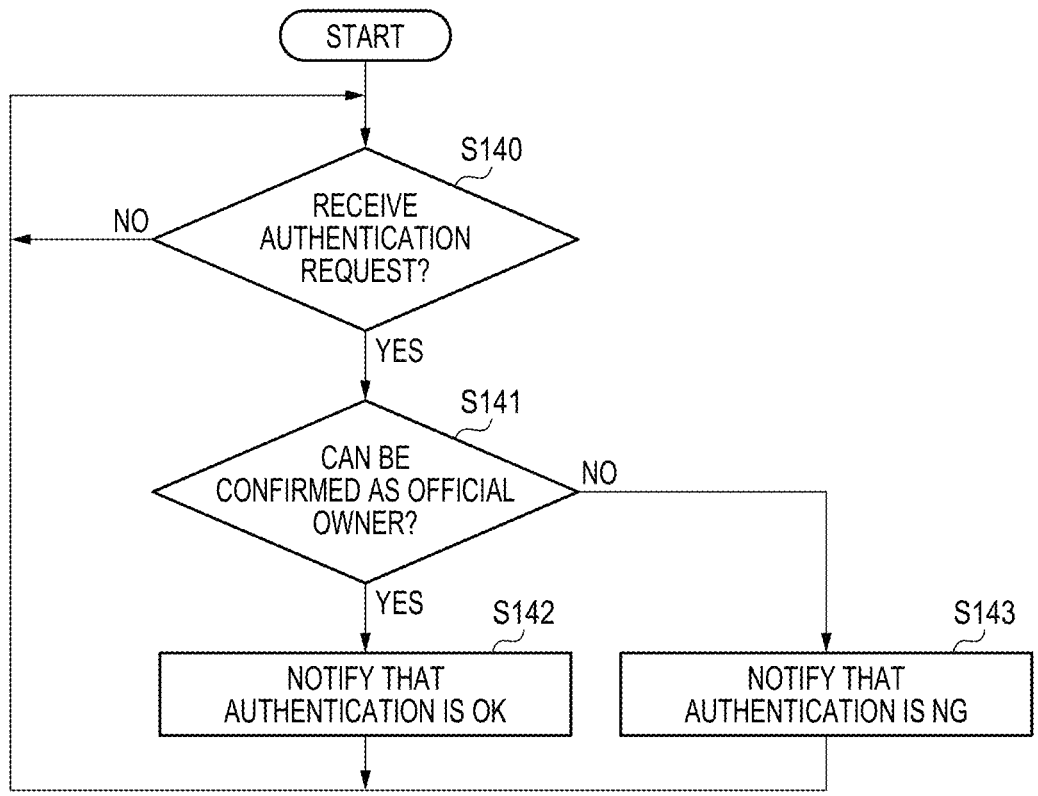
FIG. 57 is a flowchart for illustrating an operation of the server when the security is improved in the wireless communication system according to the fourth embodiment.

FIG. 57 is a flowchart for illustrating the operation of the server 14C when the server 14C having the authentication function is provided. Since a configuration diagram of the server 14C is not shown, the subject will be the server 14C as it is. However, except for having the authentication function, the server 14C has the same configuration as the server 14 shown in FIG. 7. In FIG. 57, the server 14C determines whether an authentication request is received (step S140), and if the server 14C determines that the authentication request is not received (if "NO" in step S140), the server 14C repeats the present process until the server 14C determines that the authentication request is received. If the server 14C determines that the authentication request is received (if "YES" in step S140), the server 14C determines whether the user can be confirmed as the official owner (step S141), and if the server 14C determines that the user can be confirmed as the official owner (if "YES" in step S141), the server 14C notifies that the authentication is OK (step S142), and if the server 14C determines that the user cannot be confirmed as the official owner (if "NO" in step S141), the server 14C notifies that the authentication is NG (step S143). After performing the process in step S142 or the process in step S143, the server 14C performs the process in step S140.

As described above, in the wireless communication system 4 according to the fourth embodiment, when the vehicle 50C and the smartphone 11C are in the second communication state, the vehicle 50C can operate, and then if the vehicle 50C and the smartphone 11C are not in the second communication state for a predetermined time or longer, and if the main switch 504 of the vehicle 50C detects a predetermined operation, the emergency advertising is transmitted from the vehicle 50C, and thus, the smartphone 11C can be used as a key that can receive the emergency information from the vehicle 50C. By enabling the smartphone 11C to be used as a key for the vehicle 50C, it is possible to popularize a smartphone that can be used as a key for the vehicle 50C.

Fifth Embodiment

Next, a wireless communication system according to a fifth embodiment will be described.

The wireless communication system according to the fifth embodiment sets the vehicle to an alert mode when the vehicle is powered off while the smartphone of the official owner is present in the vicinity of the vehicle ECU, measures a distance between the smartphone and the vehicle ECU by ranging technology using Bluetooth (registered trademark) communication in the alert mode, and causes the vehicle ECU to transition from the alert mode to the vehicle theft mode when the vehicle is operated without the smartphone present in the vicinity of the vehicle.

Hereinafter, the wireless communication system according to the fifth embodiment will be described below with reference to FIGS. 58 to 66.

Figure 58:
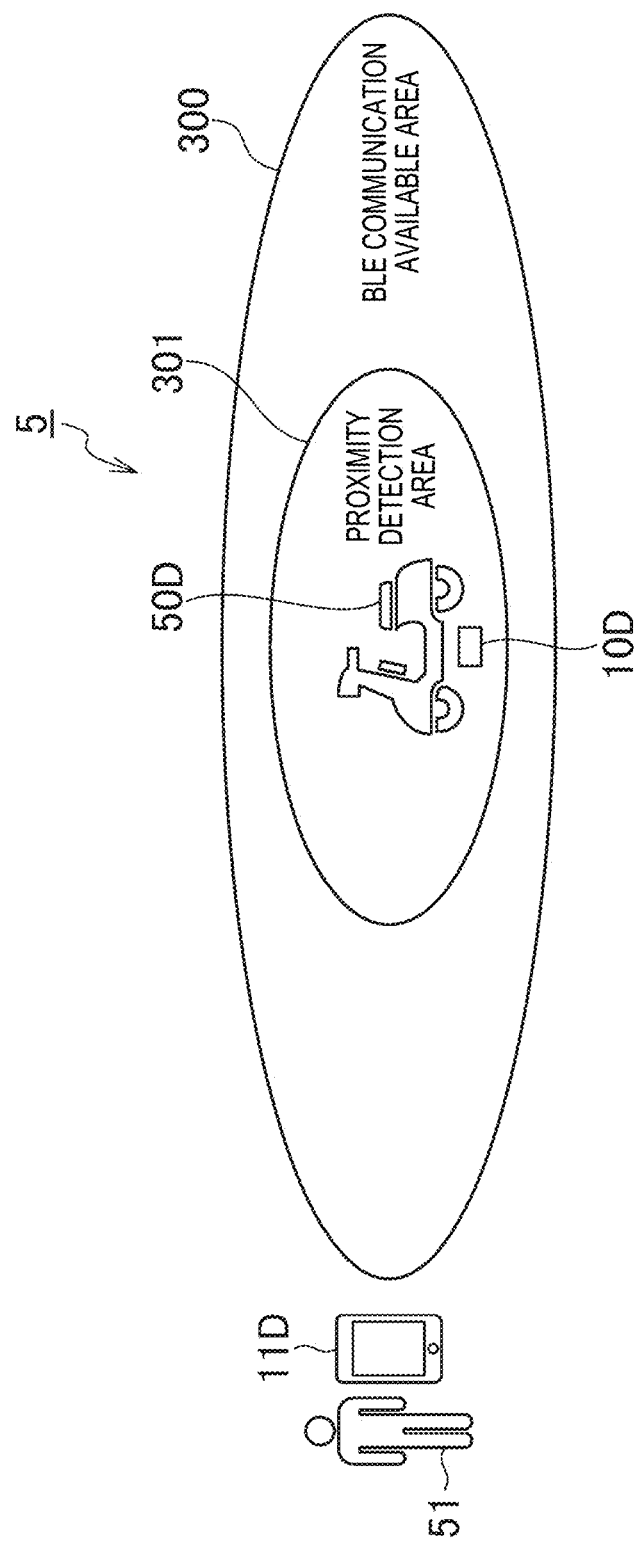
FIG. 58 is a diagram showing an aspect of using a wireless communication system according to a fifth embodiment.

FIG. 58 is a diagram showing an aspect of using a wireless communication system 5 according to the fifth embodiment. The wireless communication system 5 according to the fifth embodiment shown in FIG. 58 has a basic configuration of a vehicle 50D, a vehicle ECU (wireless communication device) 10D, and a smartphone (wireless communication terminal) 11D. The vehicle 50D and the smartphone 11D belong to the vehicle user 51 who is an official owner. The vehicle ECU 10D is mounted on the vehicle 50D. Identification information is given to the vehicle ECU 10D. The identification information can also be considered as identification information of the vehicle 50D. The identification information is information uniquely determined by the vehicle ECU, and may be, for example, a MAC address.

The vehicle ECU 10D and the smartphone 11D each have a Bluetooth communication function, and the Bluetooth communication is available between the vehicle ECU 10D and the smartphone 11D. The smartphone 11D has a cellular communication function or a WiFi (registered trademark) communication function in addition to the Bluetooth communication function. The Bluetooth communication available area (BLE communication available area) 300 is an area where the Bluetooth communication is available. The proximity detection area 301 within the Bluetooth communication available area 300 is an area in the vicinity of the vehicle 50D described above. The Bluetooth communication available area 300 has a diameter of about 1 km, and the proximity detection area 301 has a diameter of about 2 m.

As described above, the vehicle ECU 10D sets the vehicle 50D to the alert mode when the vehicle 50D is powered off while the smartphone 11D of the vehicle user 51 of the vehicle 50D is in the vicinity of the vehicle ECU 10D. In the alert mode, a distance between the smartphone 11D and the vehicle ECU 10D is measured by ranging technology using the Bluetooth communication and/or UWB, and the vehicle ECU 10D is transitioned from the alert mode to the vehicle theft mode when the vehicle 50D is operated while the smartphone 11D is not present in the vicinity of the vehicle 50D.

Figure 59:
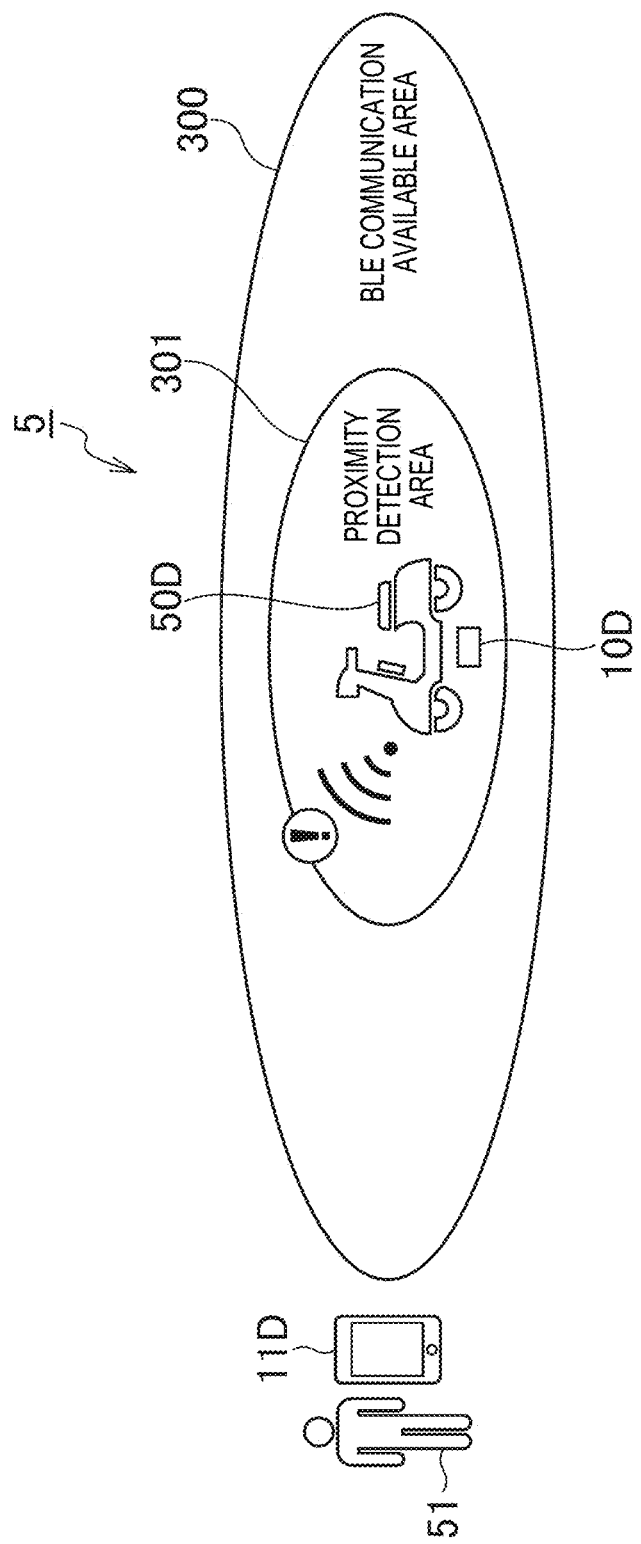
FIG. 59 is a diagram showing a case where a smartphone of a vehicle user is present outside a BLE communication available area of a vehicle ECU in the wireless communication system according to the fifth embodiment.
Figure 60:
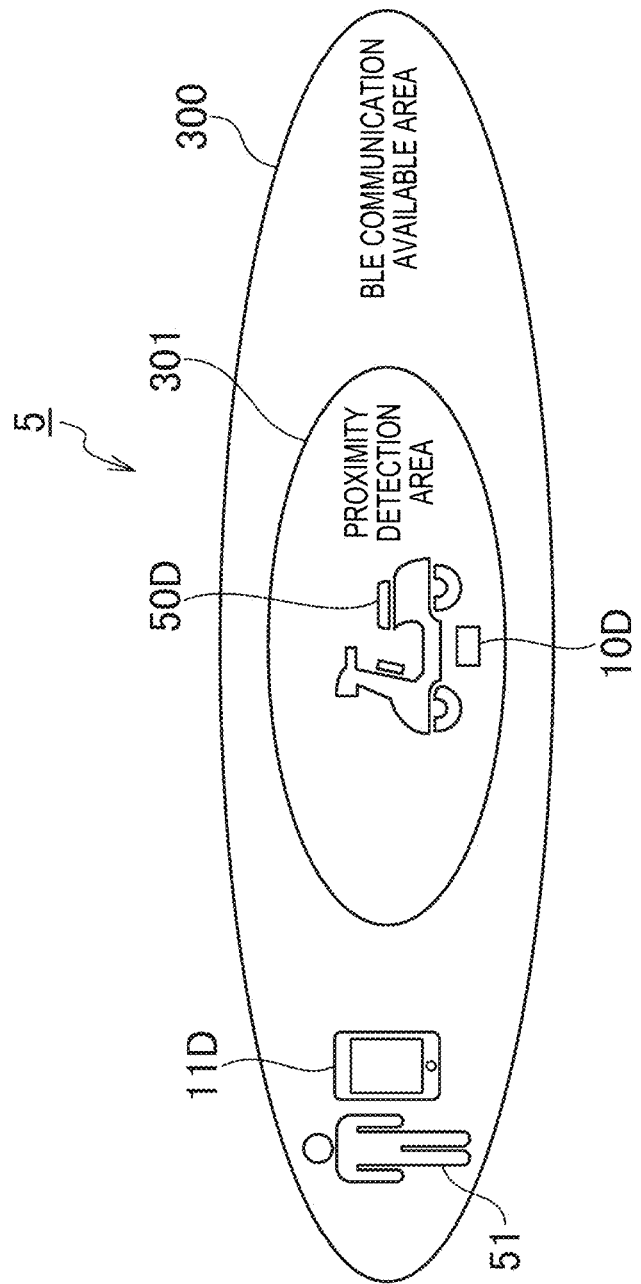
FIG. 60 is a diagram showing a case where the smartphone of the vehicle user is present in the BLE communication available area of the vehicle ECU in the wireless communication system according to the fifth embodiment.

FIG. 59 is a diagram showing a case where the smartphone 11D of the vehicle user 51 is present outside the Bluetooth communication available area 300 of the vehicle ECU 10D. FIG. 60 is a diagram showing a case where the smartphone 11D of the vehicle user 51 is present within the Bluetooth communication available area 300 of the vehicle ECU 10D.

Although the wireless communication system 5 according to the fifth embodiment is applied to the two-wheeled vehicle (motorcycle) 50D, the wireless communication system 5 can of course also be applied to a four-wheeled vehicle. Hereinafter, configurations of the vehicle ECU 10D and the smartphone 11D of the wireless communication system 5 according to the fifth embodiment will be sequentially described.

Figure 61:
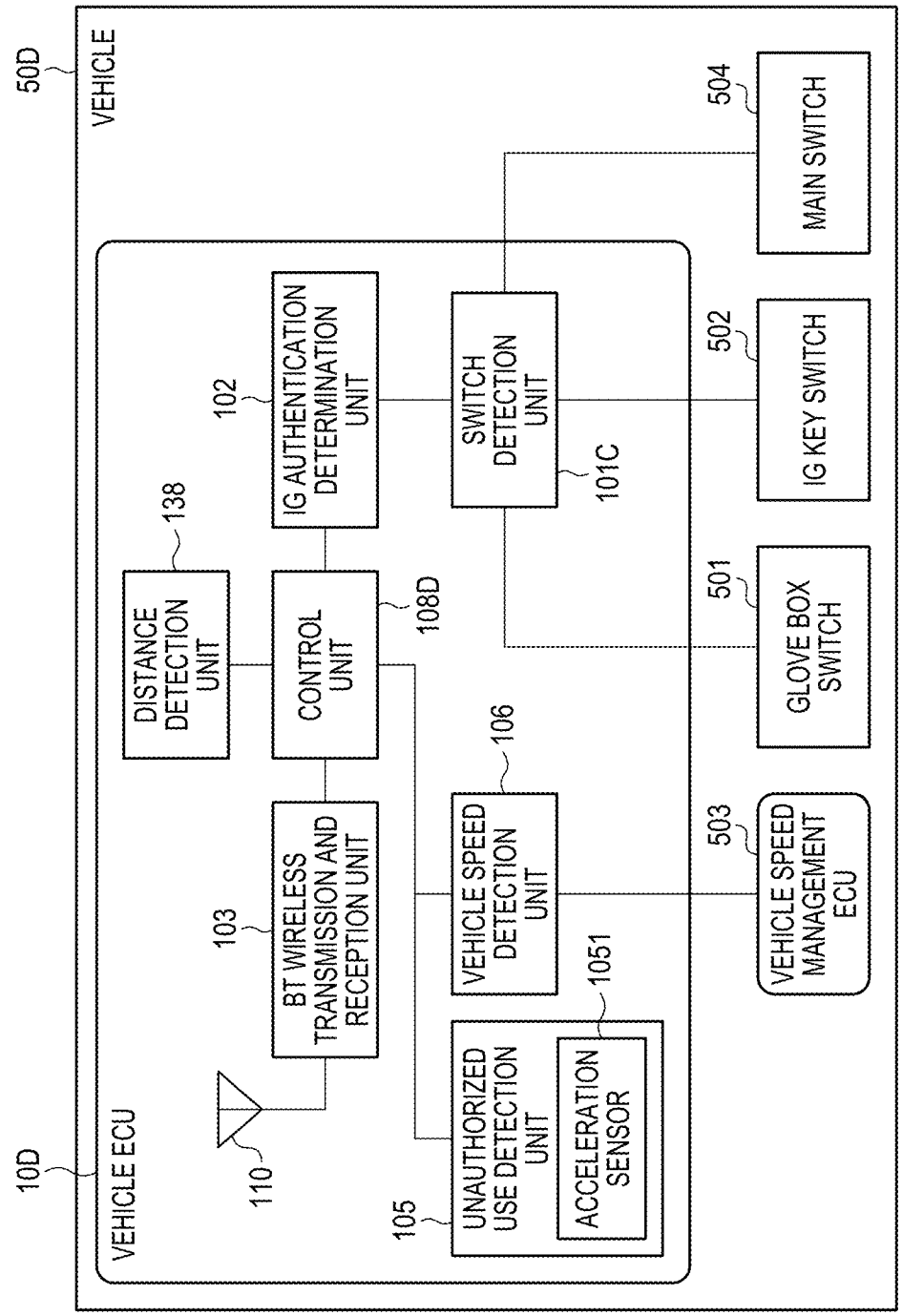
FIG. 61 is a block diagram showing a schematic configuration of a part of a vehicle and a schematic configuration of the vehicle ECU of the wireless communication system according to the fifth embodiment.

FIG. 61 is a block diagram showing a schematic configuration of a part of the vehicle 50D and a schematic configuration of the vehicle ECU 10D. In FIG. 61, the same reference numerals are given to components that are common to the components of the vehicle ECU 10 (see FIG. 2) of the wireless communication system 1 according to the first embodiment described above and the vehicle ECU 10C (see FIG. 43) of the wireless communication system 4 according to the fourth embodiment described above. The vehicle ECU 10D of the wireless communication system 5 according to the fifth embodiment includes the switch detection unit 101C, the IG authentication determination unit 102, the BT wireless transmission and reception unit (first wireless communication circuit) 103, the unauthorized use detection unit (unauthorized use detection circuit) 105, the vehicle speed detection unit 106, a distance detection unit 138, a control unit 108D, and the antenna 110. The vehicle ECU 10D has one antenna 110, but may have a plurality thereof.

The BT wireless transmission and reception unit (first wireless communication circuit) 103 performs the wireless communication conforming to the Bluetooth standard (first wireless method) as described above. The distance detection unit 138 measures a distance between the vehicle 50D and the smartphone 11D using Bluetooth communication and/or UWB ranging technology, and outputs the result to the control unit 108D. A GPS reception unit (not shown) may be mounted on the vehicle 50D (or the vehicle ECU 10D), and the distance may be determined to the GPS reception unit 121 (see FIG. 62) of the smartphone 11D.

The control unit 108D controls each unit of the device, and includes a CPU (not shown), a ROM storing a program for operating the CPU, and a RAM used in an operation of the CPU. The IG authentication determination unit 102, the BT wireless transmission and reception unit 103, the unauthorized use detection unit 105, the vehicle speed detection unit 106, and the distance detection unit 138 operate under the control of the control unit 108D. When the acceleration sensor 1051 detects a predetermined acceleration, the unauthorized use detection unit 105 detects the unauthorized use.

If the unauthorized use detection unit 105 detects the unauthorized use, and if the vehicle 50D and the smartphone 11D are at a predetermined distance (if the smartphone 11D is in the Bluetooth communication available area 300), the control unit 108D transmits emergency information to the smartphone 11D. The emergency information is transmitted from the BT wireless transmission and reception unit 103 of the vehicle ECU 10D. The emergency information transmitted from the BT wireless transmission and reception unit 103 is received by the BT wireless transmission and reception unit 124 (see FIG. 62) of the smartphone 11D.

If the unauthorized use detection unit 105 detects the unauthorized use, and if the vehicle 50D and the smartphone 11D are not at a predetermined distance (if the smartphone 11D is not in the Bluetooth communication available area 300), the control unit 108D transmits an advertising packet of Bluetooth including the emergency information. The advertising packet of Bluetooth including the emergency information is transmitted from the BT wireless transmission and reception unit 103 of the vehicle ECU 10D.

If the unauthorized use detection unit 105 detects the unauthorized use, the control unit 108D does not transmit the emergency information. That is, the emergency information is not transmitted from the BT wireless transmission and reception unit 103.

Here, the predetermined distance described above is a distance of the Bluetooth communication available area 300 (about 1 km in diameter), and is defined as the first distance. A distance of the proximity detection area 301 (approximately 2 m in diameter) is defined as the second distance (<first distance). If the vehicle 50D and the smartphone 11D are not at the second distance, and if a predetermined operation is performed by the main switch 504, the unauthorized use detection unit 105 detects unauthorized use.

A case where the BT wireless transmission and reception unit 103 of the vehicle 50D (actually the BT wireless transmission and reception unit 103 of the vehicle ECU 10D) and the BT wireless transmission and reception unit 124 of the smartphone 11D (see FIG. 62) are in a predetermined communication state is defined as the case where the vehicle 50D and the smartphone 11D are at a predetermined distance, and a case where the BT wireless transmission and reception unit 103 of the vehicle 50D (actually the BT wireless transmission and reception unit 103 of the vehicle ECU 10D) and the BT wireless transmission and reception unit 124 of the smartphone 11D are not in a predetermined communication state is defined as the case where the vehicle 50D and the smartphone 11D are not at a predetermined distance.

If the unauthorized use detection unit 105 of the vehicle 50D (actually the unauthorized use detection unit 105 of the vehicle ECU 10D) detects the unauthorized use, and if the BT wireless transmission and reception unit 103 of the vehicle 50D (actually the BT wireless transmission and reception unit 103 of the vehicle ECU 10D) and the BT wireless transmission and reception unit 124 of the smartphone 11D are not in a predetermined communication state, the BT wireless transmission and reception unit 103 transmits an advertising packet of Bluetooth including the identification information of the vehicle 50D and the emergency information.

Figure 62:
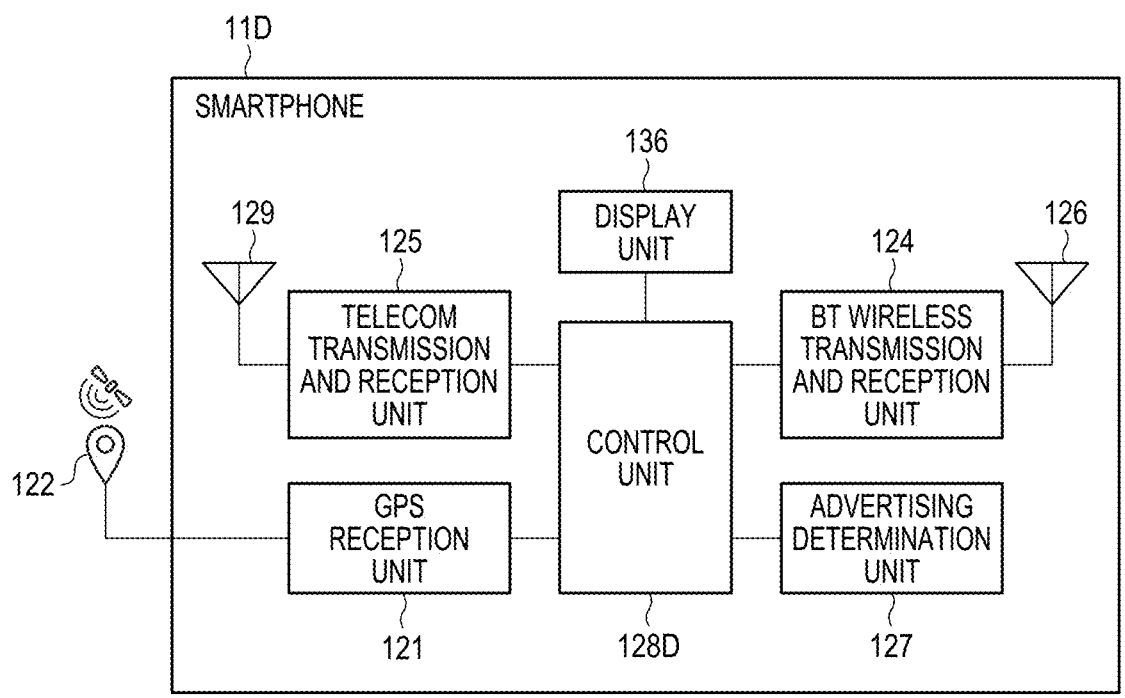
FIG. 62 is a block diagram showing a schematic configuration of the smartphone of the wireless communication system according to the fifth embodiment.

FIG. 62 is a block diagram showing a schematic configuration of the smartphone 11D. In FIG. 44, the same reference numerals are given to components that are common to the components of the information sharing user terminal (smartphone) 12 (see FIG. 5) of the wireless communication system 1 according to the first embodiment described above. The smartphone 11D includes the GPS reception unit 121, the BT wireless transmission and reception unit 124, the telecom transmission and reception unit 125, the advertising determination unit 127, a display unit 136, the antennas 122, 126, and 129, and a control unit 128D. The smartphone 11D includes one antenna 126 and one antenna 129, but may include a plurality thereof.

The BT wireless transmission and reception unit (second wireless communication circuit) 124 performs the wireless communication conforming to the Bluetooth standard (first wireless method) as described above. The telecom transmission and reception unit 125 performs wireless communication conforming to a cellular communication method (second wireless method) different from the Bluetooth standard communication method (first wireless method). The display unit 136 displays information corresponding to the emergency information. The control unit 128D controls each unit of the device, and includes a CPU (not shown), a ROM storing a program for operating the CPU, and a RAM used in an operation of the CPU. The GPS reception unit 121, the BT wireless transmission and reception unit 124, the telecom transmission and reception unit 125, the advertising determination unit 127, and the display unit 136 operate under the control of the control unit 128D. When the control unit 128D communicates with the vehicle ECU 10D, the control unit 128D transmits information for registering the control unit 128D in the vehicle ECU 10D.

In addition to using Bluetooth, WiFi or cellular may be used for communication between the vehicle ECU 10D and the smartphone 11D.

Next, operations of the vehicle ECU 10D and the smartphone 11D will be described.

Figure 63:
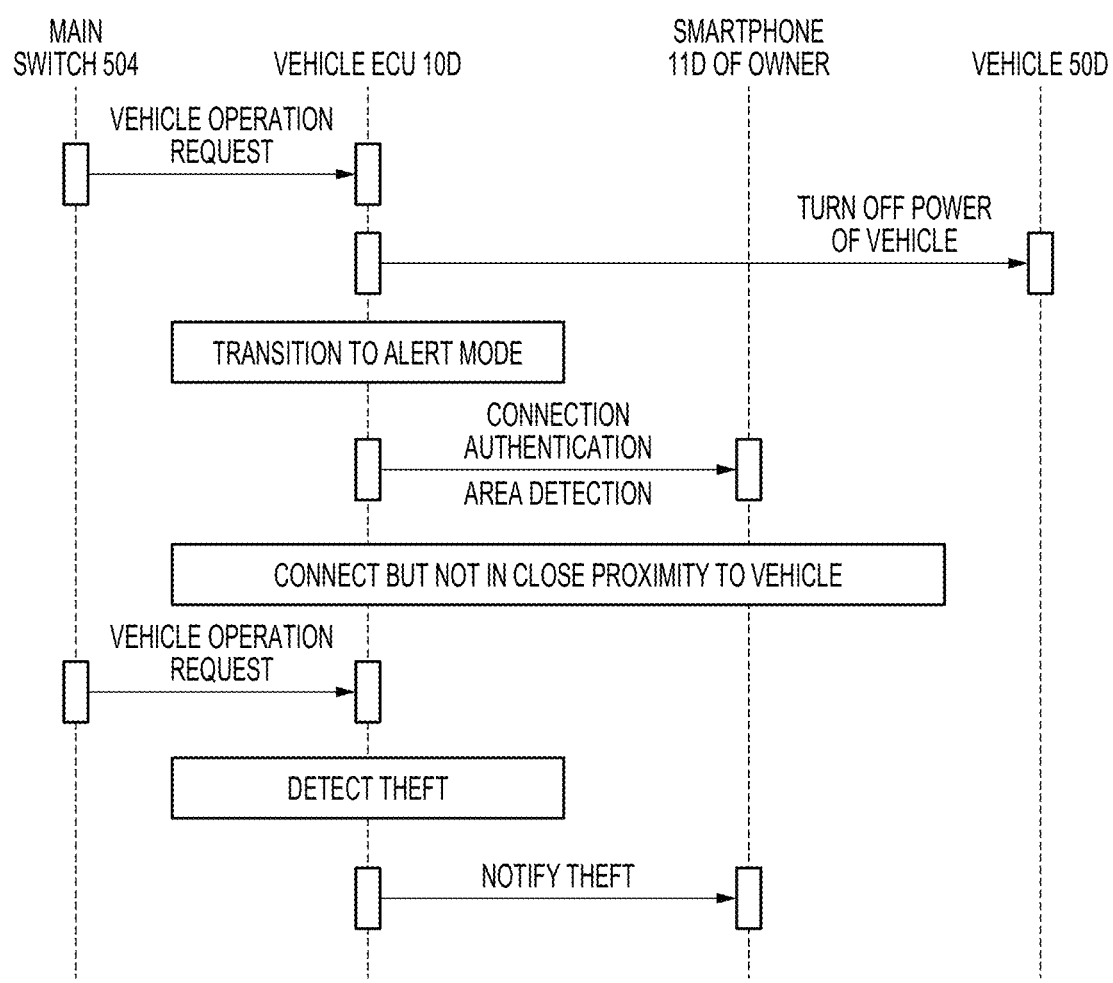
FIG. 63 is a sequence diagram showing an operation mainly of the vehicle ECU in the wireless communication system according to the fifth embodiment.
Figure 64:
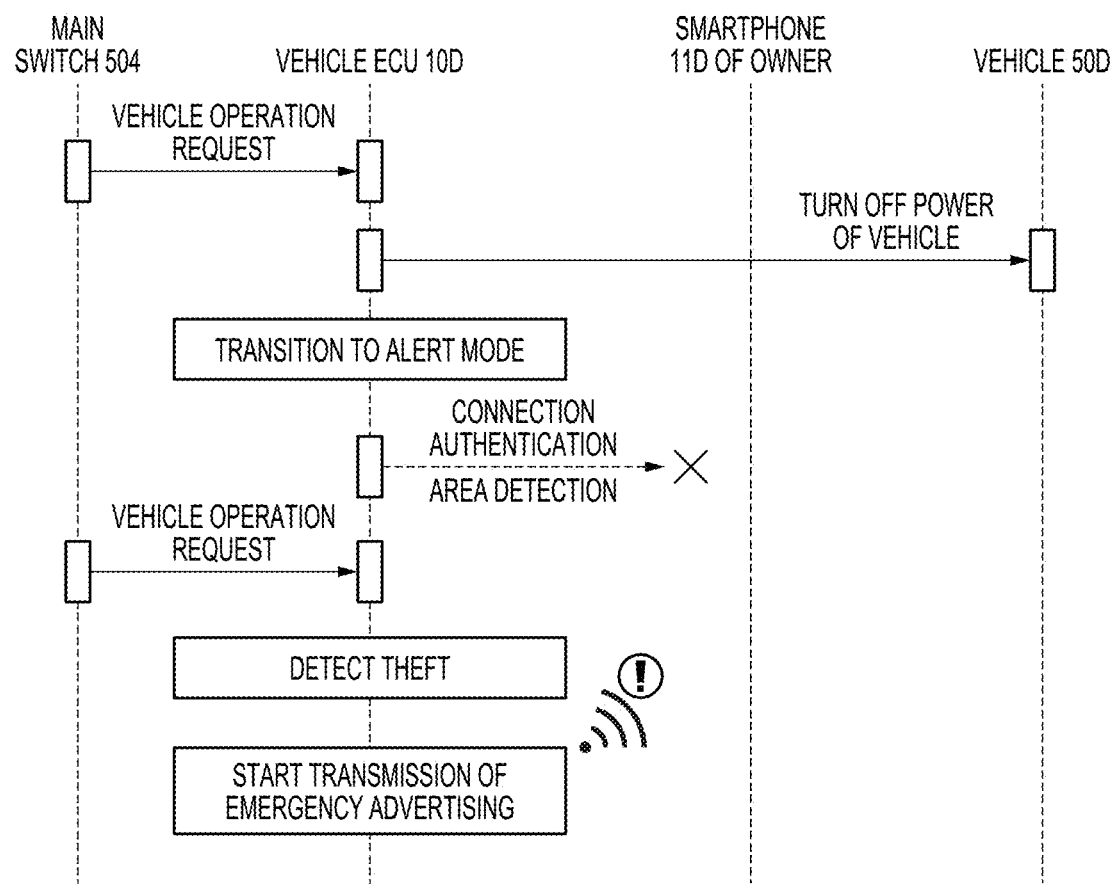
FIG. 64 is a sequence diagram showing an operation mainly of the vehicle ECU in the wireless communication system according to the fifth embodiment.

FIGS. 63 and 64 are sequence diagrams mainly showing the operation of the vehicle ECU 10D. In FIG. 63, in response to receiving the vehicle operation request from the main switch 504 of the vehicle 50D, the vehicle ECU 10D turns off the vehicle power of the vehicle 50D and transitions to the alert mode. When the vehicle ECU 10D transitions to the alert mode, the vehicle ECU 10D performs the connection authentication and the area detection in order to connect to the smartphone 11D of the vehicle user 51. In this case, the smartphone 11D is connected but not in close proximity to the vehicle 50D (that is, the smartphone 11D is not present within the proximity detection area 301). In response to receiving the vehicle operation request from the main switch 504 of the vehicle 50D in this state, the vehicle ECU 10D detects a theft and notifies the smartphone 11D of the vehicle user 51 of the theft.

In FIG. 64, in response to receiving the vehicle operation request from the main switch 504 of the vehicle 50D, the vehicle ECU 10D turns off the vehicle power of the vehicle 50D and transitions to the alert mode. When the vehicle ECU 10D transitions to the alert mode, the vehicle ECU 10D performs the connection authentication and the area detection in order to connect to the smartphone 11D of the vehicle user 51. In this case, the smartphone 11D cannot be connected (that is, the smartphone 11D is not present within the BLE communication available area 300). In response to receiving the vehicle operation request from the main switch 504 of the vehicle 50D in this state, the vehicle ECU 10D detects a theft and starts the transmission of the emergency advertising.

Figure 65:
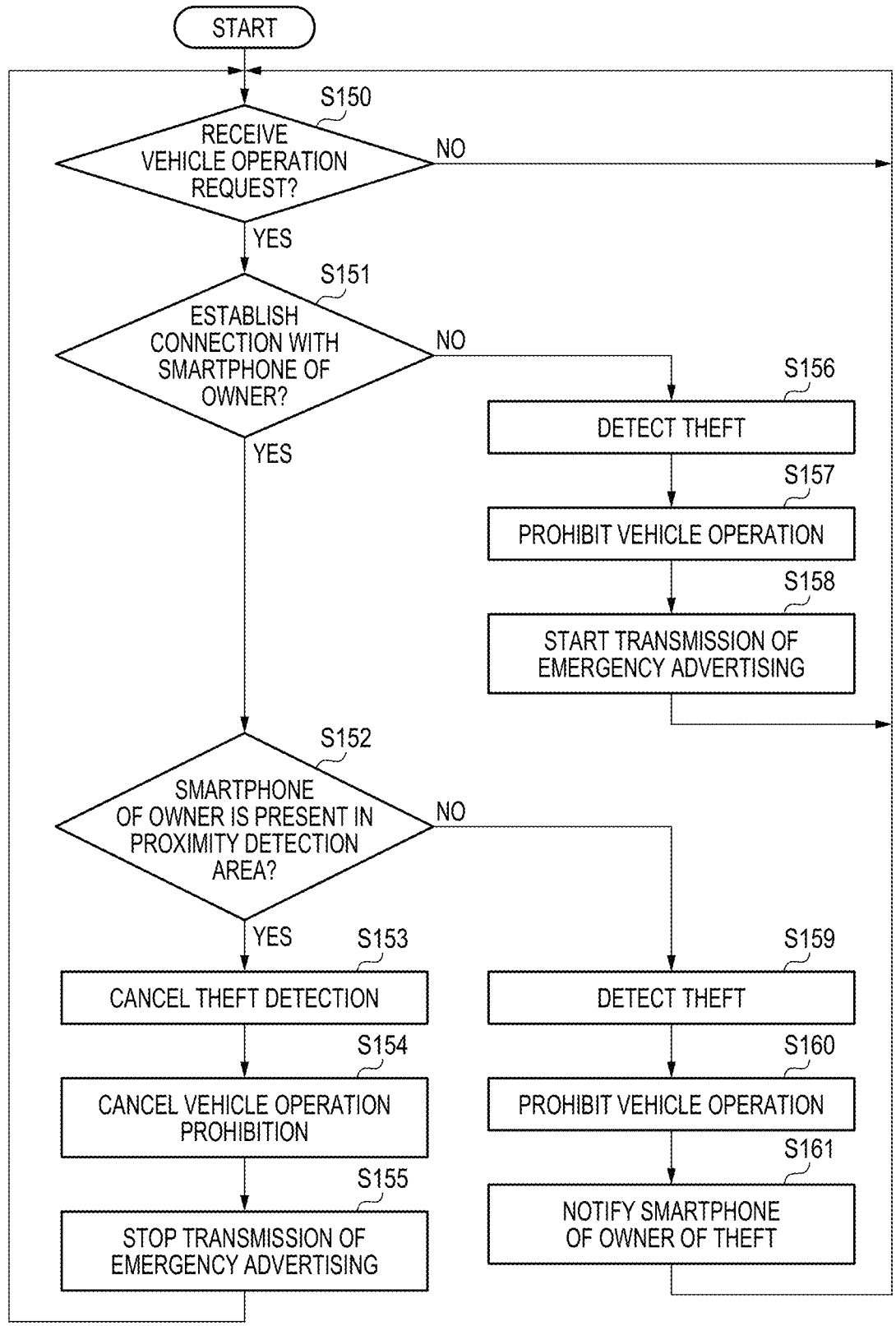
FIG. 65 is a flowchart for illustrating an operation of the vehicle ECU in the wireless communication system according to the fifth embodiment.

FIG. 65 is a flowchart for illustrating the operation of the vehicle ECU 10D. The operation of the vehicle ECU 10D is an operation of the control unit 108D, but the subject is not the control unit 108D but the second vehicle ECU 10D. In FIG. 65, the vehicle ECU 10D determines whether the vehicle operation request is received (step S150), and if the vehicle ECU 10D determines that the vehicle operation request is not received (if "NO" in step S150), the vehicle ECU 10D repeats the present process until the vehicle ECU 10D determines that the vehicle operation request is received. If the vehicle ECU 10D determines that the vehicle operation request is received (if "YES" in step S150), the vehicle ECU 10D determines whether the connection is established with the smartphone 11D of the owner (vehicle user 51) (step S151). If the vehicle ECU 10D determines that the connection is established with the smartphone 11D of the owner (if "YES" in step S151), the vehicle ECU 10D determines whether the smartphone 11D of the owner is present in the proximity detection area 301 (step S152). If the vehicle ECU 10D determines that the smartphone 11D of the owner is present in the proximity detection area 301 (if "YES" in step S152), the vehicle ECU 10D cancels the theft detection (step S153), and then cancels the vehicle operation prohibition (step S154). Furthermore, the transmission of the emergency advertising is stopped (step S155). Then, the vehicle ECU 10D returns to the process in step S150.

On the other hand, if the vehicle ECU 10D determines in step S151 that the connection is not established with the smartphone 11D of the owner (if "NO" in step S151), the vehicle ECU 10D detects a theft (step S156), and then prohibits the vehicle operation (step S157). Furthermore, the transmission of the emergency advertising is started (step S158). Then, the vehicle ECU 10D returns to the process in step S150.

If the vehicle ECU 10D determines in step S152 that the smartphone 11D of the owner is not present in the proximity detection area 301 (if "NO" in step S152), the vehicle ECU 10D detects a theft (step S159), and then prohibits the vehicle operation (step S160). Furthermore, the smartphone 11D of the owner is notified of the theft (step S161). Then, the vehicle ECU 10D returns to the process in step S150.

Figure 66:
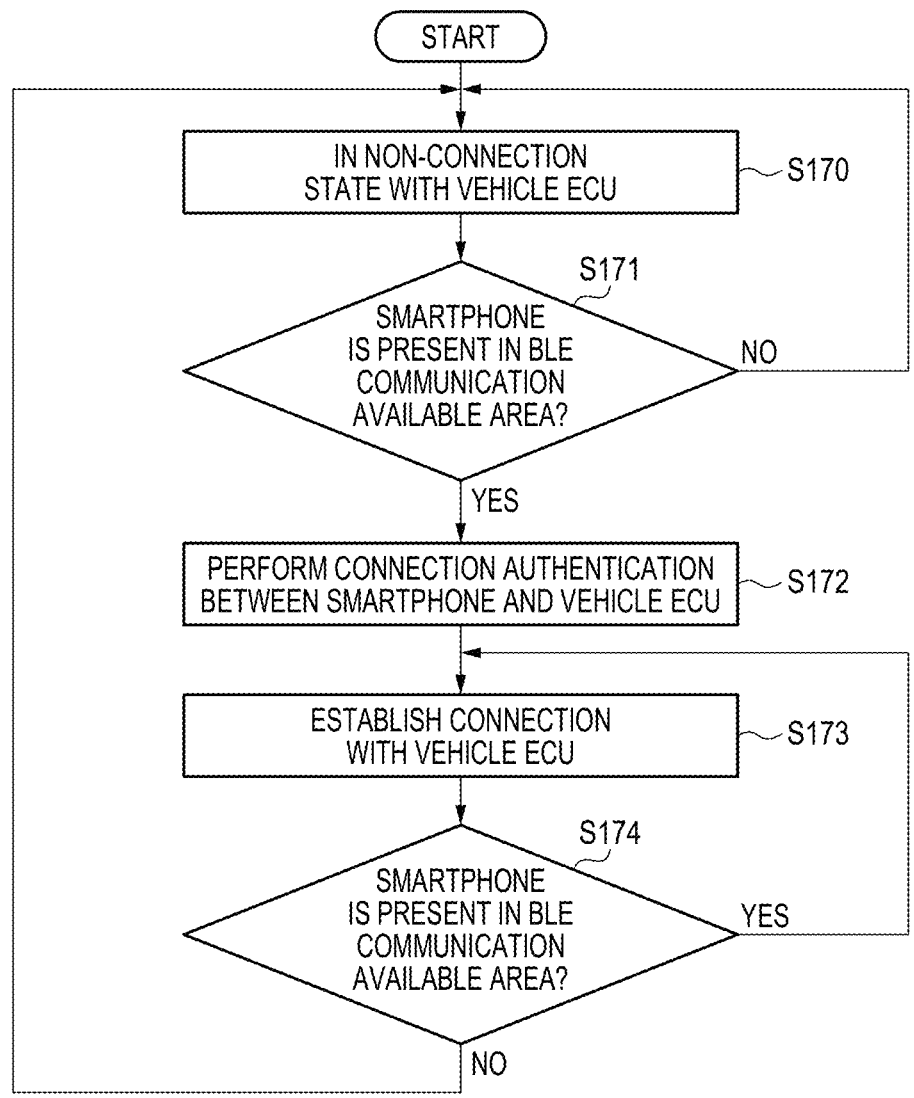
FIG. 66 is a flowchart for illustrating an operation of the smartphone of the wireless communication system according to the fifth embodiment.

FIG. 66 is a flowchart for illustrating the operation of the smartphone 11D. The operation of the smartphone 11D is an operation of the control unit 128D, but the subject is not the control unit 128D but the smartphone 11D. In FIG. 66, the smartphone 11D is first not connected to the vehicle ECU 10D (step S170). Next, the smartphone 11D determines whether itself (smartphone 11D) is present in the BLE communication available area 300 (step S171). If the smartphone 11D determines that the smartphone 11D is not present in the BLE communication available area 300 (if "NO" in step S171), the smartphone 11D returns to the process in step S170, and if the smartphone 11D determines that the smartphone 11D is present in the BLE communication available area 300 (if "YES" in step S171), the smartphone 11D performs the connection authentication with the vehicle ECU 10D (step S172). After performing the connection authentication with the vehicle ECU 10D, the smartphone 11D is in the connection state with the vehicle ECU 10D (step S173). Next, the smartphone 11D determines whether the smartphone 11D is present in the BLE communication available area 300 (step S174), and if the smartphone 11D determines that the smartphone 11D is present in the BLE communication available area 300 (if "YES" in step S174), the smartphone 11D continues the process in step S173. If the smartphone 11D determines that the smartphone 11D is not present in the BLE communication available area 300 (if "NO" in step S174), the smartphone 11D returns to the process in step S170.

As described above, in the wireless communication system 5 according to the fifth embodiment, if the unauthorized use of the vehicle 50D is detected, and if the smartphone 11D is at a predetermined distance from the vehicle 50D (that is, if the smartphone 11D is in the BLE communication available area 300), the emergency information is transmitted from vehicle ECU 10D of vehicle 50D to smartphone 11D, and if the unauthorized use of the vehicle 50D is detected, and if the smartphone 11D is not at a predetermined distance from the vehicle 50D (that is, if the smartphone 11D is not in the BLE communication available area 300), the advertising packet of Bluetooth including the emergency information is transmitted from the vehicle ECU 10D of the vehicle 50D, and thus, if the smartphone 11D is within a predetermined distance from the vehicle 50D, the smartphone 11D can receive the emergency information directly from the vehicle 50D, and if the smartphone 11D is not within a predetermined distance from the vehicle 50D, the smartphone 11D can indirectly receive the advertising packet of Bluetooth from the vehicle 50D via cellular communication, WiFi, or the like.

Therefore, the user 51 of the smartphone 11D can be notified of an abnormality in the vehicle 50D without using the telematics service in the vehicle 50D. Since there is no need to have a communication line or a GPS function to use the telematics service, costs can be reduced. In particular, by using a communication method conforming to the Bluetooth standard for the communication between the vehicle 51D and the smartphone 11D, the communication between the vehicle 51D and the smartphone 11D can be performed at a low cost. Accordingly, it is possible to notify an abnormality including a theft in the vehicle 50D at a low cost and with low power consumption.

If the unauthorized use detection unit 105 of the vehicle 50D does not detect the unauthorized use, the BT wireless transmission and reception unit 103 does not transmit the emergency information, and thus, false alarms can be prevented.

By using the acceleration sensor 1051 in the unauthorized use detection unit 105 of the vehicle 50D, it is possible to detect an impact applied to the vehicle 50D with high sensitivity.

Since the information corresponding to the emergency information is displayed on the display unit 136 of the smartphone 11D, the user 51 of the smartphone 11D can visually confirm the information corresponding to the emergency information.

Although the present invention has been described in detail with reference to a specific embodiment, it is obvious to those skilled in the art that various changes and modifications can be made without departing from the spirit and scope of the present invention.

The present application also discloses a wireless communication system and a wireless communication device described in [A-1] to [A-22] below.

[A-1]

A wireless communication system, including:
- a vehicle including an unauthorized use detection circuit and a first antenna; and
- a wireless communication terminal including a second antenna configured to establish wireless communication conforming to a Bluetooth (registered trademark) standard with the first antenna, and a third antenna, in which
- if the unauthorized use detection circuit of the vehicle does not detect unauthorized use, the first antenna does not transmit an advertising packet of Bluetooth including identification information of the vehicle and emergency information,
- if the unauthorized use detection circuit of the vehicle detects the unauthorized use, the first antenna transmits the advertising packet of Bluetooth including the identification information of the vehicle and the emergency information, and
- if the wireless communication terminal receives the advertising packet of Bluetooth including the identification information of the vehicle and the emergency information via the second antenna, the wireless communication terminal transmits the identification information of the vehicle and the emergency information via the third antenna.

[A-2]

The wireless communication system according to [A-1], in which
- the unauthorized use detection circuit includes an acceleration sensor, and
- if the acceleration sensor detects a predetermined acceleration, the unauthorized use is detected.

[A-3]

The wireless communication system according to [A-1] or [A-2], in which
- the wireless communication terminal further includes a first location information detection circuit configured to detect a first latitude and longitude, and a first clock configured to acquire a first time,
- if the wireless communication terminal receives the advertising packet of Bluetooth including the identification information of the vehicle and the emergency information via the second antenna, the wireless communication terminal transmits the identification information of the vehicle, the emergency information, the first latitude and longitude, and the first time via the third antenna.

[A-4]

The wireless communication system according to any one of [A-1] to [A-3], in which
- the vehicle further includes a second clock configured to acquire a second time,
- if the unauthorized use detection circuit of the vehicle detects the unauthorized use, the first antenna transmits the advertising packet of Bluetooth including the identification information of the vehicle, the emergency information, and the second time, and
- if the wireless communication terminal receives the advertising packet of Bluetooth including the identification information of the vehicle, the emergency information, and the second time via the second antenna, the wireless communication terminal transmits the identification information of the vehicle, the emergency information, and the second time via the third antenna.

[A-5]

The wireless communication system according to [A-4], in which
- the vehicle further includes a second location information detection circuit configured to detect a second latitude and longitude,
- if the unauthorized use detection circuit of the vehicle detects the unauthorized use, the first antenna transmits the advertising packet of Bluetooth including the identification information of the vehicle, the emergency information, the second time, and the second latitude and longitude, and
- if the wireless communication terminal receives the advertising packet of Bluetooth including the identification information of the vehicle, the emergency information, the second time, and the second latitude and longitude via the second antenna, the wireless communication terminal transmits the identification information of the vehicle, the emergency information, the second time, and the second latitude and longitude via the third antenna.

[A-6]

The wireless communication system according to any one of [A-1] to [A-5], in which
- if the unauthorized use detection circuit of the vehicle detects the unauthorized use, the first antenna transmits the advertising packet of Bluetooth including the identification information of the vehicle and the emergency information twice or more.

[A-7]

The wireless communication system according to any one of [A-1] to [A-6], in which
- the advertising packet of Bluetooth including the identification information of the vehicle and the emergency information is defined as a first advertising packet,
- the vehicle is configured to transmit the first advertising packet from the first antenna twice or more,
- the vehicle is configured to transmit the second advertising packet of Bluetooth, which does not include the emergency information, from the first antenna twice or more, and
- a first electric field strength of a radio wave with which the first advertising packet is transmitted from the first antenna is greater than a second electric field strength of a radio wave with which the second advertising packet is transmitted from the first antenna.

[A-8]

The wireless communication system according to any one of [A-1] to [A-7], in which
- the advertising packet of Bluetooth including the identification information of the vehicle and the emergency information is defined as a first advertising packet,
- the vehicle is configured to transmit the first advertising packet from the first antenna twice or more,
- the vehicle is configured to transmit the second advertising packet of Bluetooth, which does not include the emergency information, from the first antenna twice or more, and
- a first transmission interval of the first advertising packet is shorter than a second transmission interval of the second advertising packet.

[A-9]

The wireless communication system according to any one of [A-1] to [A-8], in which
- the advertising packet of Bluetooth including the identification information of the vehicle and the emergency information is defined as a first advertising packet,
- the vehicle is configured to transmit the first advertising packet from the first antenna twice or more,
- the vehicle is configured to transmit the second advertising packet of Bluetooth, which does not include the emergency information, from the first antenna twice or more,
- the vehicle includes a battery, and
- if a voltage of the battery becomes lower than a predetermined value, a first transmission interval of the first advertising packet is shorter than a second transmission interval of the second advertising packet.

[A-10]

The wireless communication system according to [A-9], in which
- if the voltage of the battery becomes lower than the predetermined value, transmission of the second advertising packet is stopped.

[A-11]

The wireless communication system according to any one of [A-1] to [A-10], further including:
- a server configured to wirelessly communicate with the third antenna of the wireless communication terminal, in which
- the server retains the identification information of the vehicle and the emergency information transmitted from the third antenna, and
- the held identification information and emergency information of the vehicle can be transmitted to the outside.

[A-12]

A wireless communication device mountable on a vehicle, including:
- an unauthorized use detection circuit; and
- a first antenna, in which
- the first antenna configured to establish wireless communication conforming to a Bluetooth (registered trademark) standard with a second antenna of a wireless communication terminal, and the wireless communication terminal includes a third antenna, if the unauthorized use detection circuit of the wireless communication device does not detect unauthorized use, the first antenna does not transmit an advertising packet of Bluetooth including identification information of the wireless communication device and emergency information, if the unauthorized use detection circuit of the wireless communication device detects the unauthorized use, the first antenna transmits the advertising packet of Bluetooth including the identification information of the wireless communication device and the emergency information, and if the wireless communication terminal receives the advertising packet of Bluetooth including the identification information of the wireless communication device and the emergency information via the second antenna, the wireless communication terminal transmits the identification information of the wireless communication device and the emergency information via the third antenna.

[A-13]
The wireless communication device according to [A-12], in which
the unauthorized use detection circuit includes an acceleration sensor, and
if the acceleration sensor detects a predetermined acceleration, the unauthorized use is detected.

[A-14]
The wireless communication device according to [A-12] or [A-13], in which
the wireless communication terminal further includes a first location information detection circuit configured to detect a first latitude and longitude, and a first clock configured to acquire a first time,
if the wireless communication terminal receives the advertising packet of Bluetooth including the identification information of the wireless communication device and the emergency information via the second antenna, the wireless communication terminal transmits the identification information of the wireless communication device, the emergency information, the first latitude and longitude, and the first time via the third antenna.

[A-15]
The wireless communication device according to any one of [A-12] to [A-14], in which
the wireless communication device further includes a second clock configured to acquire a second time,
if the unauthorized use detection circuit of the wireless communication device detects the unauthorized use, the first antenna transmits the advertising packet of Bluetooth including the identification information of the wireless communication device, the emergency information, and the second time, and
if the wireless communication terminal receives the advertising packet of Bluetooth including the identification information of the wireless communication device, the emergency information, and the second time via the second antenna, the wireless communication terminal transmits the identification information of the wireless communication device, the emergency information, and the second time via the third antenna.

[A-16]
The wireless communication device according to [A-15], further including:
a second location information detection circuit configured to detect a second latitude and longitude, in which
if the unauthorized use detection circuit of the wireless communication device detects the unauthorized use, the first antenna transmits the advertising packet of Bluetooth including the identification information of the wireless communication device, the emergency information, the second time, and the second latitude and longitude, and
if the wireless communication terminal receives the advertising packet of Bluetooth including the identification information of the wireless communication device, the emergency information, the second time, and the second latitude and longitude via the second antenna, the wireless communication terminal transmits the identification information of the wireless communication device, the emergency information, the second time, and the second latitude and longitude via the third antenna.

[A-17]
The wireless communication device according to any one of [A-12] to [A-16], in which
if the unauthorized use detection circuit of the wireless communication device detects the unauthorized use, the first antenna transmits the advertising packet of Bluetooth including the identification information of the wireless communication device and the emergency information twice or more.

[A-18]
The wireless communication device according to any one of [A-12] to [A-17], in which
the advertising packet of Bluetooth including the identification information of the wireless communication device and the emergency information is defined as a first advertising packet,
the wireless communication device is configured to transmit the first advertising packet from the first antenna twice or more,
the wireless communication device is configured to transmit the second advertising packet of Bluetooth, which does not include the emergency information, from the first antenna twice or more, and
a first electric field strength of a radio wave with which the first advertising packet is transmitted from the first antenna is greater than a second electric field strength of a radio wave with which the second advertising packet is transmitted from the first antenna.

[A-19]
The wireless communication device according to any one of [A-12] to [A-18], in which
the advertising packet of Bluetooth including the identification information of the wireless communication device and the emergency information is defined as a first advertising packet,
the wireless communication device is configured to transmit the first advertising packet from the first antenna twice or more,
the wireless communication device is configured to transmit the second advertising packet of Bluetooth, which does not include the emergency information, from the first antenna twice or more, and
a first transmission interval of the first advertising packet is shorter than a second transmission interval of the second advertising packet.

[A-20]

The wireless communication device according to any one of [A-12] to [A-19], in which
the advertising packet of Bluetooth including the identification information of the wireless communication device and the emergency information is defined as a first advertising packet,
the wireless communication device is configured to transmit the first advertising packet from the first antenna twice or more,
the wireless communication device is configured to transmit the second advertising packet of Bluetooth, which does not include the emergency information, from the first antenna twice or more,
the vehicle includes a battery, and
if a voltage of the battery becomes lower than a predetermined value, a first transmission interval of the first advertising packet is shorter than a second transmission interval of the second advertising packet.

[A-21]

The wireless communication device according to [A-20], in which
if the voltage of the battery becomes lower than the predetermined value, transmission of the second advertising packet is stopped.

[A-22]

The wireless communication device according to any one of [A-12] to [A-21], further including:
a server configured to wirelessly communicate with the third antenna of the wireless communication terminal, in which
the server retains the identification information of the wireless communication device and the emergency information transmitted from the third antenna, and
the held identification information of the wireless communication device and emergency information can be transmitted to the outside.

The present application also discloses a wireless communication system and a wireless communication device described in [B-1] to [B-20] below.

[B-1]

A wireless communication system, including:
a vehicle including an operation unit and a first wireless communication circuit conforming to a first wireless method;
a first wireless communication terminal which includes a second wireless communication circuit conforming to the first wireless method and available to communicate with the first wireless communication circuit; and
a second wireless communication terminal which includes a third wireless communication circuit conforming to the first wireless method and available to communicate with the first wireless communication circuit, and a fourth wireless communication circuit conforming to a second wireless method different from the first wireless method, in which
when the first wireless communication circuit of the vehicle and the second wireless communication circuit of the first wireless communication terminal are in a first communication state, the vehicle becomes operable,
when the first wireless communication circuit of the vehicle and the third wireless communication circuit of the second wireless communication terminal are in a second communication state, the vehicle becomes operable, and
after the first wireless communication circuit of the vehicle and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit of the vehicle transmits a packet including emergency information.

[B-2]

The wireless communication system according to [B-1], in which
even when the first wireless communication circuit of the vehicle and the second wireless communication circuit of the first wireless communication terminal are in the first communication state, after the first wireless communication circuit of the vehicle and the third wireless communication circuit of the second wireless communication terminal enter into the second communication state, if the first wireless communication circuit and the third wireless communication circuit do not enter into the second communication state for the predetermined time or longer, and if the operation unit of the vehicle detects the predetermined operation, the first wireless communication circuit of the vehicle transmits the packet including the emergency information.

[B-3]

The wireless communication system according to [B-1] or [B-2], in which
the first wireless communication terminal does not include a wireless communication circuit conforming to the second wireless method.

[B-4]

The wireless communication system according to any one of [B-1] to [B-3], in which
the second wireless communication terminal is configured to stop at least the third wireless communication circuit from entering into the second communication state via the fourth wireless communication circuit.

[B-5]

The wireless communication system according to any one of [B-1] to [B-4], in which
the first wireless method is Bluetooth (registered trademark).

[B-6]

The wireless communication system according to any one of [B-1] to [B-5], in which
the second wireless method is cellular.

[B-7]

The wireless communication system according to any one of [B-1] to [B-6], in which
the second wireless communication terminal has at least one authentication function of password authentication, fingerprint authentication, and face authentication.

[B-8]

The wireless communication system according to [B-7], in which
in the authentication function of the second wireless communication terminal, if the authentication is successful, at least the third wireless communication circuit continues to be in the second communication state, and if the authentication fails, at least the third wireless communication circuit stops entering into the second communication state.

[B-9]

The wireless communication system according to any one of [B-1] to [B-8], in which
  at least the second wireless communication terminal is registerable in the vehicle.

[B-10]

The wireless communication system according to any one of [B-1] to [B-9], in which
  the first communication state and the second communication state are the same.

[B-11]

A wireless communication device mountable on a vehicle including an operation unit, including:
  a first wireless communication circuit conforming to a first wireless method, in which
  communication with a first wireless communication terminal is available, the first wireless communication terminal which includes a second wireless communication circuit conforming to the first wireless method and available to communicate with the first wireless communication circuit,
  communication with a second wireless communication terminal is available, the second wireless communication terminal which includes a third wireless communication circuit conforming to the first wireless method and available to communicate with the first wireless communication circuit, and a fourth wireless communication circuit conforming to a second wireless method different from the first wireless method,
  when the first wireless communication circuit and the second wireless communication circuit of the first wireless communication terminal are in a first communication state, the vehicle becomes operable,
  when the first wireless communication circuit and the third wireless communication circuit of the second wireless communication terminal are in a second communication state, the vehicle becomes operable, and
  after the first wireless communication circuit and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit transmits a packet including emergency information.

[B-12]

The wireless communication device according to [B-11], in which
  even when the first wireless communication circuit and the second wireless communication circuit of the first wireless communication terminal are in the first communication state, after the first wireless communication circuit and the third wireless communication circuit of the second wireless communication terminal enter into the second communication state, if the first wireless communication circuit and the third wireless communication circuit do not enter into the second communication state for the predetermined time or longer, and if the operation unit of the vehicle detects the predetermined operation, the first wireless communication circuit transmits the packet including the emergency information.

[B-13]

The wireless communication device according to [B-11] or [B-12], in which
  the first wireless communication terminal does not include a wireless communication circuit conforming to the second wireless method.

[B-14]

The wireless communication device according to any one of [B-11] to [B-13], in which
  the second wireless communication terminal is configured to stop at least the third wireless communication circuit from entering into the second communication state via the fourth wireless communication circuit.

[B-15]

The wireless communication device according to any one of [B-11] to [B-14], in which
  the first wireless method is Bluetooth (registered trademark).

[B-16]

The wireless communication device according to any one of [B-11] to [B-15], in which
  the second wireless method is cellular.

[B-17]

The wireless communication device according to any one of [B-11] to [B-16], in which
  the second wireless communication terminal has at least one authentication function of password authentication, fingerprint authentication, and face authentication.

[B-18]

The wireless communication device according to [B-17], in which
  in the authentication function of the second wireless communication terminal, if the authentication is successful, at least the third wireless communication circuit continues to be in the second communication state, and if the authentication fails, at least the third wireless communication circuit stops entering into the second communication state.

[B-19]

The wireless communication device according to any one of [B-11] to [B-18], in which
  at least the second wireless communication terminal is registerable in the wireless communication device.

[B-20]

The wireless communication device according to any one of [B-11] to [B-19], in which
  the first communication state and the second communication state are the same.

The present application also discloses a wireless communication system and a wireless communication device described in [C-1] to [C-20] below.

[C-1]

A wireless communication system, including:
  a vehicle including an unauthorized use detection circuit and a first wireless communication circuit; and
  a wireless communication terminal including a second wireless communication circuit available to wirelessly communicate with the first wireless communication circuit, in which
  if the unauthorized use detection circuit of the vehicle detects unauthorized use, and if the vehicle and the wireless communication terminal are at a predetermined distance, the first wireless communication circuit transmits emergency information to the second wireless communication circuit, and
  if the unauthorized use detection circuit of the vehicle detects the unauthorized use, and if the vehicle and the wireless communication terminal are not at the predetermined distance, the first wireless communication circuit transmits an advertising packet of Bluetooth (registered trademark) including the emergency information.

[C-2]

The wireless communication system according to [C-1], in which
the predetermined distance is defined as a first distance, the vehicle includes an operation unit, and if the vehicle and the wireless communication terminal are not at a second distance, and if a predetermined operation is performed by the operation unit, the unauthorized use detection circuit detects the unauthorized use.

[C-3]

The wireless communication system according to [C-2], in which
the first distance is greater than the second distance.

[C-4]

The wireless communication system according to any one of [C-1] to [C-3], in which
the first wireless communication circuit of the vehicle and the second wireless communication circuit of the wireless communication terminal conform to a Bluetooth standard.

[C-5]

The wireless communication system according to [C-4], in which
a distance between the vehicle and the wireless communication terminal is obtained by measurement using Bluetooth communication and/or UWB ranging technology.

[C-6]

The wireless communication system according to any one of [C-1] to [C-5], in which
a case where the first wireless communication circuit of the vehicle and the second wireless communication circuit of the wireless communication terminal are in a predetermined communication state is defined as the case where the vehicle and the wireless communication terminal are at the predetermined distance, and
a case where the first wireless communication circuit of the vehicle and the second wireless communication circuit of the wireless communication terminal are not in the predetermined communication state is defined as the case where the vehicle and the wireless communication terminal are not at the predetermined distance.

[C-7]

The wireless communication system according to any one of [C-1] to [C-6], in which
if the unauthorized use detection circuit of the vehicle does not detect the unauthorized use, the first wireless communication circuit does not transmit the emergency information.

[C-8]

The wireless communication system according to any one of [C-1] to [C-7], in which
if the unauthorized use detection circuit of the vehicle detects the unauthorized use, and if the first wireless communication circuit of the vehicle and the second wireless communication circuit of the wireless communication terminal are not in the predetermined communication state, the first wireless communication circuit transmits an advertising packet of Bluetooth including identification information of the vehicle and the emergency information.

[C-9]

The wireless communication system according to any one of [C-1] to [C-8], in which
the unauthorized use detection circuit of the vehicle includes an acceleration sensor, and
if the acceleration sensor detects a predetermined acceleration, the unauthorized use is detected.

[C-10]

The wireless communication system according to any one of [C-1] to [C-8], in which
the wireless communication terminal includes at least a display circuit, and the display circuit is configured to display information corresponding to the emergency information.

[C-11]

A wireless communication device, including:
an unauthorized use detection circuit; and
a first wireless communication circuit, in which
the wireless communication device is mountable on a vehicle and is available to communicate with a wireless communication terminal including a second wireless communication circuit available to wirelessly communicate with the first wireless communication circuit,
if the unauthorized use detection circuit detects unauthorized use, and if the vehicle and the wireless communication terminal are at a predetermined distance, the first wireless communication circuit transmits emergency information to the second wireless communication circuit, and
if the unauthorized use detection circuit detects the unauthorized use, and if the vehicle and the wireless communication terminal are not at the predetermined distance, the first wireless communication circuit transmits an advertising packet of Bluetooth (registered trademark) including the emergency information.

[C-12]

The wireless communication device according to [C-11], in which
the predetermined distance is defined as a first distance, the vehicle includes an operation unit, and if the vehicle and the wireless communication terminal are not at a second distance, and if a predetermined operation is performed by the operation unit, the unauthorized use detection circuit detects the unauthorized use.

[C-13]

The wireless communication device according to [C-12], in which
the first distance is greater than the second distance.

[C-14]

The wireless communication device according to any one of [C-11] to [C-13], in which
the first wireless communication circuit and the second wireless communication circuit of the wireless communication terminal conform to a Bluetooth standard.

[C-15]

The wireless communication device according to [C-14], in which
a distance between the vehicle and the wireless communication terminal is obtained by measurement using Bluetooth communication and/or UWB ranging technology.

[C-16]

The wireless communication device according to any one of [C-11] to [C-15], in which
a case where the first wireless communication circuit and the second wireless communication circuit of the wireless communication terminal are in a predetermined communication state is defined as the case where the vehicle and the wireless communication terminal are at the predetermined distance, and a case where the first wireless communication circuit and the second wireless communication circuit of the wireless communication terminal are not in the predetermined communication state is defined as the case where the vehicle and the wireless communication terminal are not at the predetermined distance.

[C-17]
The wireless communication device according to any one of [C-11] to [C-16], in which
if the unauthorized use detection circuit does not detect the unauthorized use, the first wireless communication circuit does not transmit the emergency information.

[C-18]
The wireless communication device according to any one of [C-11] to [C-17], in which
if the unauthorized use detection circuit detects the unauthorized use, and if the first wireless communication circuit and the second wireless communication circuit of the wireless communication terminal are not in the predetermined communication state, the first wireless communication circuit transmits an advertising packet of Bluetooth including identification information of the vehicle and the emergency information.

[C-19]
The wireless communication device according to any one of [C-11] to [C-18], in which
the unauthorized use detection circuit includes an acceleration sensor, and
if the acceleration sensor detects a predetermined acceleration, the unauthorized use is detected.

[C-20]
The wireless communication device according to any one of [C-11] to [C-18], in which
the wireless communication terminal includes at least a display circuit, and the display circuit is configured to display information corresponding to the emergency information.

The present application also discloses a wireless communication system and a wireless communication device described in [D-1] to [D-20] below.

[D-1]
A wireless communication system, including:
a first vehicle including an unauthorized use detection circuit and a first antenna; and
a second vehicle including a second antenna, in which
if the unauthorized use detection circuit of the first vehicle detects unauthorized use, the first antenna transmits an advertising packet of Bluetooth (registered trademark) including identification information of the first vehicle and emergency information, and
if the second vehicle receives the advertising packet of Bluetooth including the identification information of the first vehicle and the emergency information via the second antenna, the second antenna transmits the predetermined packet of Bluetooth including the identification information of the first vehicle and the emergency information.

[D-2]
The wireless communication system according to [D-1], in which
the advertising packet is defined as a first advertising packet, and
the predetermined packet is defined as a second advertising packet.

[D-3]
The wireless communication system according to [D-1] or [D-2], further including:
a wireless communication terminal including a fourth antenna and a third antenna capable of wireless communication conforming to a Bluetooth standard with the second antenna of the second vehicle, in which
if the wireless communication terminal receives the predetermined packet of Bluetooth including the identification information of the first vehicle and the emergency information via the third antenna, the wireless communication terminal transmits the identification information of the first vehicle and the emergency information via the fourth antenna.

[D-4]
The wireless communication system according to any one of [D-1] to [D-3], in which
the second vehicle includes a memory circuit configured to store at least the identification information of the first vehicle.

[D-5]
The wireless communication system according to any one of [D-1] to [D-4], in which
the second antenna of the second vehicle transmits the predetermined packet of Bluetooth including the identification information of the first vehicle and the emergency information twice or more.

[D-6]
The wireless communication system according to any one of [D-1] to [D-5], in which
the unauthorized use detection circuit of the first vehicle includes an acceleration sensor, and
if the acceleration sensor detects a predetermined acceleration, the unauthorized use is detected.

[D-7]
The wireless communication system according to [D-3], in which
the fourth antenna of the wireless communication terminal can be used for cellular communication.

[D-8]
The wireless communication system according to [D-3] or [D-7], in which
the wireless communication terminal further includes a first location information detection circuit configured to detect a first latitude and longitude, and a first clock configured to acquire a first time,
if the wireless communication terminal receives the predetermined packet of Bluetooth including the identification information of the first vehicle and the emergency information via the third antenna, the wireless communication terminal transmits the identification information of the first vehicle, the emergency information, the first latitude and longitude, and the first time via the fourth antenna.

[D-9]
The wireless communication system according to [D-3], [D-7], or [D-8], in which
the second vehicle further includes a second clock configured to acquire a second time,
if the second vehicle receives the advertising packet of Bluetooth including the identification information of the first vehicle and the emergency information via the second antenna, the second antenna transmits the predetermined packet of Bluetooth including the identification information of the first vehicle, the emergency information, and the second time, and if the wireless communication terminal receives the predetermined packet of Bluetooth including the identification information of the first vehicle, the emergency information, and the second time via the third antenna, the wireless communication terminal transmits the identification information of the first vehicle, the emergency information, and the second time via the fourth antenna.

[D-10]

The wireless communication system according to [D-9], in which
- the second vehicle further includes a second location information detection circuit configured to acquire a second latitude and longitude,
- if the second vehicle receives the advertising packet of Bluetooth including the identification information of the first vehicle and the emergency information via the second antenna, the second antenna transmits the predetermined packet of Bluetooth including the identification information of the first vehicle, the emergency information, the second time, and the second latitude and longitude, and
- if the wireless communication terminal receives the predetermined packet of Bluetooth including the identification information of the first vehicle, the emergency information, the second time, and the second latitude and longitude via the third antenna, the wireless communication terminal transmits the identification information of the first vehicle, the emergency information, the second time, and the second latitude and longitude via the fourth antenna.

[D-11]

A wireless communication device mountable on a second vehicle, in which
- a wireless communication system includes a first vehicle including an unauthorized use detection circuit and a first antenna, and the second vehicle including a second antenna,
- if the unauthorized use detection circuit of the first vehicle detects unauthorized use, the first antenna transmits an advertising packet of Bluetooth (registered trademark) including identification information of the first vehicle and emergency information, and
- if the wireless communication device of the second vehicle receives the advertising packet of Bluetooth including the identification information of the first vehicle and the emergency information via the second antenna, the second antenna transmits the predetermined packet of Bluetooth including the identification information of the first vehicle and the emergency information.

[D-12]

The wireless communication device according to [D-11], in which
- the advertising packet is defined as a first advertising packet, and
- the predetermined packet is defined as a second advertising packet.

[D-13]

The wireless communication device according to [D-11] or [D-12], in which
- communication with a wireless communication terminal via the second antenna is available, the wireless communication terminal including a fourth antenna and a third antenna capable of wireless communication conforming to a Bluetooth standard with the second antenna of the second vehicle, and
- if the wireless communication terminal receives the predetermined packet of Bluetooth including the identification information of the first vehicle and the emergency information via the third antenna, the wireless communication terminal transmits the identification information of the first vehicle and the emergency information via the fourth antenna.

[D-14]

The wireless communication device according to any one of [D-11] to [D-13], further including:
- a memory circuit configured to store at least the identification information of the first vehicle.

[D-15]

The wireless communication device according to any one of [D-11] to [D-14], in which
- the second antenna of the second vehicle transmits the predetermined packet of Bluetooth including the identification information of the first vehicle and the emergency information twice or more.

[D-16]

The wireless communication device according to any one of [D-11] to [D-15], in which
- the unauthorized use detection circuit of the first vehicle includes an acceleration sensor, and
- if the acceleration sensor detects a predetermined acceleration, the unauthorized use is detected.

[D-17]

The wireless communication device according to [D-13], in which
- the fourth antenna of the wireless communication terminal can be used for cellular communication.

[D-18]

The wireless communication device according to [D-13] or [D-17], in which
- the wireless communication terminal further includes a first location information detection circuit configured to detect a first latitude and longitude, and a first clock configured to acquire a first time,
- if the wireless communication terminal receives the predetermined packet of Bluetooth including the identification information of the first vehicle and the emergency information via the third antenna, the wireless communication terminal transmits the identification information of the first vehicle, the emergency information, the first latitude and longitude, and the first time via the fourth antenna.

[D-19]

The wireless communication device according to [D-13], [D-17], or [D-18], further including:
- a second clock configured to acquire a second time, in which
- if the wireless communication device receives the advertising packet of Bluetooth including the identification information of the first vehicle and the emergency information via the second antenna, the second antenna transmits the predetermined packet of Bluetooth including the identification information of the first vehicle, the emergency information, and the second time, and
- if the wireless communication terminal receives the predetermined packet of Bluetooth including the identification information of the first vehicle, the emergency information, and the second time via the third antenna, the wireless communication terminal transmits the identification information, the emergency information, and the second time of the first vehicle via the fourth antenna.

[D-20]

The wireless communication device according to [D-19], further including:
a second location information detection circuit configured to acquire a second latitude and longitude, in which
if the wireless communication device receives the advertising packet of Bluetooth including the identification information of the first vehicle and the emergency information via the second antenna, the second antenna transmits the predetermined packet of Bluetooth including the identification information of the first vehicle, the emergency information, the second time, and the second latitude and longitude, and
if the wireless communication terminal receives the predetermined packet of Bluetooth including the identification information of the first vehicle, the emergency information, the second time, and the second latitude and longitude via the third antenna, the wireless communication terminal transmits the identification information of the first vehicle, the emergency information, the second time, and the second latitude and longitude via the fourth antenna.

INDUSTRIAL APPLICABILITY

The wireless communication system according to the present disclosure is useful for low-cost vehicles such as a scooter.

REFERENCE SIGNS LIST 1 to 5 wireless communication system
10, 10C, 10D vehicle ECU
10A, 10F first vehicle ECU
10B, 10E second vehicle ECU
11 vehicle user terminal
11C, 11D, 11E smartphone
12, 12B, 12C, 12D information sharing user terminal
13 bicycle parking lot Bluetooth unit
14, 14B, 14C, 14D server
15 telecom base station
16, 16E electronic key
50, 50C, 50D vehicle
50A, 50F first vehicle
50B, 50E second vehicle
51 vehicle user (official owner)
52 information sharing user
53 cloud
101, 101C switch detection unit
102 IG authentication determination unit
103, 124, 131, 161 BT wireless transmission and reception unit
104, 121 GPS reception unit
105 unauthorized use detection unit
106 vehicle speed detection unit
107, 123 clock
108, 108A, 108B, 108C, 108D, 108E, 108F, 128, 128B, 128C, 128D, 128E, 135, 143, 143B, 143C, 164 control unit
109 memory
110, 111, 122, 126, 129, 132, 165 antenna
112 advertising detection unit
125 telecom transmission and reception unit
127, 134 advertising determination unit
133, 141 network communication unit
136 display unit
137 authentication unit
138 distance detection unit
142 notification information determination unit
162 key switch
163 LED
298 communication range of normal advertising
299 communication range of emergency advertising
300 Bluetooth communication available area (BLE communication available area)
301 proximity detection area
501 glove box switch
502 IG KEY switch
503 vehicle speed management ECU
504 main switch
1051 acceleration sensor

What is claimed is:

1. A wireless communication system, comprising:
a vehicle including an operation unit and a first wireless communication circuit conforming to a first wireless method;
a first wireless communication terminal including a second wireless communication circuit conforming to the first wireless method and available to communicate with the first wireless communication circuit; and
a second wireless communication terminal including a third wireless communication circuit conforming to the first wireless method and available to communicate with the first wireless communication circuit, and a fourth wireless communication circuit conforming to a second wireless method different from the first wireless method, wherein
when the first wireless communication circuit of the vehicle and the second wireless communication circuit of the first wireless communication terminal are in a first communication state, the vehicle becomes operable,
when the first wireless communication circuit of the vehicle and the third wireless communication circuit of the second wireless communication terminal are in a second communication state, the vehicle becomes operable, and
after the first wireless communication circuit of the vehicle and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit of the vehicle transmits a packet including emergency information.

2. The wireless communication system according to claim 1, wherein
even when the first wireless communication circuit of the vehicle and the second wireless communication circuit of the first wireless communication terminal are in the first communication state, after the first wireless communication circuit of the vehicle and the third wireless communication circuit of the second wireless communication terminal enter into the second communication state, if the first wireless communication circuit and the third wireless communication circuit do not enter into the second communication state for the predetermined time or longer, and if the operation unit of the vehicle detects the predetermined operation, the first wireless communication circuit of the vehicle transmits the packet including the emergency information.

3. The wireless communication system according to claim 1, wherein
the first wireless communication terminal does not include a wireless communication circuit conforming to the second wireless method.

4. The wireless communication system according to claim 1, wherein
the second wireless communication terminal is configured to stop at least the third wireless communication circuit from entering into the second communication state via the fourth wireless communication circuit.

5. The wireless communication system according to claim 1, wherein
the first wireless method is Bluetooth (registered trademark).

6. The wireless communication system according to claim 1, wherein
the second wireless method is cellular.

7. The wireless communication system according to claim 1, wherein
the second wireless communication terminal has at least one authentication function of password authentication, fingerprint authentication, and face authentication.

8. The wireless communication system according to claim 7, wherein
in the authentication function of the second wireless communication terminal, if the authentication is successful, at least the third wireless communication circuit continues to be in the second communication state, and if the authentication fails, at least the third wireless communication circuit stops entering into the second communication state.

9. The wireless communication system according to claim 1, wherein
at least the second wireless communication terminal is registerable in the vehicle.

10. The wireless communication system according to claim 1, wherein
the first communication state and the second communication state are the same.

11. A wireless communication device mountable on a vehicle including an operation unit, comprising:
a first wireless communication circuit conforming to a first wireless method, wherein
the wireless communication device is able to be communicated with a first wireless communication terminal, the first wireless communication terminal including a second wireless communication circuit conforming to the first wireless method and available to communicate with the first wireless communication circuit,
the wireless communication device is able to be communicated with a second wireless communication terminal, the second wireless communication terminal including a third wireless communication circuit conforming to the first wireless method and available to communicate with the first wireless communication circuit, and a fourth wireless communication circuit conforming to a second wireless method different from the first wireless method,
when the first wireless communication circuit and the second wireless communication circuit of the first wireless communication terminal are in a first communication state, the vehicle becomes operable,
when the first wireless communication circuit and the third wireless communication circuit of the second wireless communication terminal are in a second communication state, the vehicle becomes operable, and after the first wireless communication circuit and the third wireless communication circuit of the second wireless communication terminal are in the second communication state, if the first wireless communication circuit and the third wireless communication circuit do not enter into the second communication state for a predetermined time or longer, and if the operation unit of the vehicle detects a predetermined operation, the first wireless communication circuit transmits a packet including emergency information.

12. The wireless communication device according to claim 11, wherein
even when the first wireless communication circuit and the second wireless communication circuit of the first wireless communication terminal are in the first communication state, after the first wireless communication circuit and the third wireless communication circuit of the second wireless communication terminal enter into the second communication state, if the first wireless communication circuit and the third wireless communication circuit do not enter into the second communication state for the predetermined time or longer, and if the operation unit of the vehicle detects the predetermined operation, the first wireless communication circuit transmits the packet including the emergency information.

13. The wireless communication device according to claim 11, wherein
the first wireless communication terminal does not include a wireless communication circuit conforming to the second wireless method.

14. The wireless communication device according to claim 11, wherein
the second wireless communication terminal is configured to stop at least the third wireless communication circuit from entering into the second communication state via the fourth wireless communication circuit.

15. The wireless communication device according to claim 11, wherein
the first wireless method is Bluetooth (registered trademark).

16. The wireless communication device according to claim 11, wherein
the second wireless method is cellular.

17. The wireless communication device according to claim 11, wherein
the second wireless communication terminal has at least one authentication function of password authentication, fingerprint authentication, and face authentication.

18. The wireless communication device according to claim 17, wherein
in the authentication function of the second wireless communication terminal, if the authentication is successful, at least the third wireless communication circuit continues to be in the second communication state, and if the authentication fails, at least the third wireless communication circuit stops entering into the second communication state.

19. The wireless communication device according to claim 11, wherein
at least the second wireless communication terminal is registerable in the wireless communication device.

20. The wireless communication device according to claim 11, wherein the first communication state and the second communication state are the same.

\* \* \* \* \*